(12) United States Patent
Montgomery et al.

(10) Patent No.: US 8,344,956 B2
(45) Date of Patent: Jan. 1, 2013

(54) METHODS FOR REDUCING NEAR-FIELD RADIATION AND SPECIFIC ABSORPTION RATE (SAR) VALUES IN COMMUNICATIONS DEVICES

(75) Inventors: Mark T. Montgomery, Melbourne Beach, FL (US); Frank M. Caimi, Vero Beach, FL (US); Paul A. Tornatta, Jr., Melbourne, FL (US); Mark W. Kishler, Rockledge, FL (US); Li Chen, Melbourne, FL (US)

(73) Assignee: SkyCross, Inc., Viera, FL (US)

( * ) Notice: Subject to any disclaimer, the term of this patent is extended or adjusted under 35 U.S.C. 154(b) by 364 days.

(21) Appl. No.: 12/786,032

(22) Filed: May 24, 2010

(65) Prior Publication Data

US 2011/0021139 A1     Jan. 27, 2011

Related U.S. Application Data

(63) Continuation-in-part of application No. 12/750,196, filed on Mar. 30, 2010, now Pat. No. 8,164,538, which is a continuation of application No. 12/099,320, filed on Apr. 8, 2008, now Pat. No. 7,688,273, which is a continuation-in-part of application No. 11/769,565, filed on Jun. 27, 2007, now Pat. No. 7,688,275.

(60) Provisional application No. 61/181,176, filed on May 26, 2009, provisional application No. 60/916,655, filed on May 8, 2007, provisional application No. 60/925,394, filed on Apr. 20, 2007.

(51) Int. Cl.
*H01Q 1/24* (2006.01)

(52) U.S. Cl. ........ 343/702; 343/820; 343/844; 342/159; 455/575.1; 455/575.5

(58) Field of Classification Search .................. 343/702, 343/820, 844; 342/159; 455/41.1, 90, 575.1, 455/575.5
See application file for complete search history.

(56) References Cited

U.S. PATENT DOCUMENTS 2,947,987 A     8/1960 Dodington
(Continued)

FOREIGN PATENT DOCUMENTS

CN         1645671 A     7/2005
(Continued)

OTHER PUBLICATIONS

Office Action for China Patent Application No. 200880020727.9, dated May 22, 2012.
(Continued)

*Primary Examiner* — Tho G Phan
(74) *Attorney, Agent, or Firm* — Rajesh Vallabh; Foley Hoag LLP

(57) ABSTRACT

A method is provided for reducing near-field radiation and specific absorption rate (SAR) values in a communications device. The communications device includes a multimode antenna structure transmitting and receiving electromagnetic signals and circuitry for processing signals communicated to and from the antenna structure. The method includes adjusting the relative phase between signals fed to neighboring antenna ports of the antenna structure such that a signal fed to the one antenna port has a different phase than a signal fed to the neighboring antenna port to provide antenna pattern control and to increase gain in a selected direction toward a receive point. The method features using a transmit power lower than the transmit power used in a non-pattern control operation of the antenna structure such that the communications device obtains generally equivalent wireless link performance with the receive point using reduced transmit power compared to the non-pattern control operation, thereby reducing the specific absorption rate.

22 Claims, 69 Drawing Sheets

U.S. PATENT DOCUMENTS

| | | | |
|---|---|---|---|
| 3,646,559 A | 2/1972 | Wiley | |
| 5,047,787 A | 9/1991 | Hogberg | |
| 5,079,562 A | 1/1992 | Yarsunas et al. | |
| 5,189,434 A | 2/1993 | Bell | |
| 5,463,406 A | 10/1995 | Vannatta et al. | |
| 5,617,102 A | 4/1997 | Prater | |
| 5,973,634 A * | 10/1999 | Kare | 342/25 A |
| 6,069,590 A | 5/2000 | Thompson, Jr. et al. | |
| 6,483,463 B2 | 11/2002 | Kadambi et al. | |
| 6,501,427 B1 | 12/2002 | Lilly et al. | |
| 6,509,883 B1 | 1/2003 | Foti et al. | |
| 6,573,869 B2 | 6/2003 | Moore | |
| 6,876,337 B2 | 4/2005 | Larry | |
| 6,897,808 B1 | 5/2005 | Murch et al. | |
| 6,930,642 B2 | 8/2005 | Kossiavas et al. | |
| 7,187,945 B2 | 3/2007 | Ranta et al. | |
| 7,251,499 B2 | 7/2007 | Ella et al. | |
| 7,340,277 B2 | 3/2008 | Nakamura et al. | |
| 7,688,273 B2 | 3/2010 | Montgomery et al. | |
| 7,804,451 B2 * | 9/2010 | Glocker et al. | 343/702 |
| 8,208,980 B2 * | 6/2012 | Wong et al. | 455/575.5 |
| 2002/0055336 A1 * | 5/2002 | Hong | 455/90 |
| 2005/0179607 A1 | 8/2005 | Gorsuch et al. | |
| 2005/0200535 A1 | 9/2005 | Elkobi et al. | |
| 2006/0050009 A1 | 3/2006 | Ho et al. | |
| 2006/0055605 A1 * | 3/2006 | Peled et al. | 343/702 |
| 2006/0109192 A1 | 5/2006 | Weigand | |
| 2007/0060089 A1 | 3/2007 | Owen et al. | |
| 2008/0258991 A1 | 10/2008 | Montgomery et al. | |
| 2008/0278405 A1 | 11/2008 | Montgomery et al. | |
| 2009/0213011 A1 | 8/2009 | Tsai et al. | |
| 2010/0231464 A1 * | 9/2010 | Huang et al. | 343/702 |

FOREIGN PATENT DOCUMENTS

| | | |
|---|---|---|
| EP | 0847101 A2 | 6/1998 |
| FR | 2616015 A1 | 12/1988 |
| JP | 52-106659 A | 9/1977 |
| JP | 2001-094335 A | 4/2001 |
| JP | 2003-152429 A | 5/2003 |
| JP | 2005-020206 A | 1/2005 |
| JP | 2007-013643 A | 1/2007 |
| TW | 553507 Y | 9/2003 |
| TW | 251957 B | 3/2006 |
| TW | I255588 B | 5/2006 |
| WO | 8910012 A1 | 10/1989 |
| WO | WO-01-31735 A1 | 5/2001 |
| WO | 2007/042614 A1 | 4/2007 |

OTHER PUBLICATIONS

Bach Andersen, J. and Henrik Hass Rasmussen, "Decoupling and Descattering Networks for Antennas," IEEE Transactions on Antennas and Propagation, Nov. 1976.

Diallo, A., C. Luxey, P. Le Thuc, R. Staraj, and G. Kossiavas, "Efficient Two-Port Antenna System for GSM=DCS=UMTS Multimode Mobile Phones," Electronics Letters, Mar. 29, 2007 vol. 43 No. 7.

Diallo, A., C. Luxey, P. Le Thuc, R. Staraj, and G. Kossiavas, "Enhanced Diversity Antennas for UMTS Handsets," Proc. 'EuCAP 2006' Nice, France, Nov. 6-10, 2006 (ESa SP-626, Oct. 2006), pp. 1-5, GloMo 1998.

Diallo, A. and C. Luxey, "Estimation of the Diversity Performance of Several Two-Antenna Systems in Different Propagation Environments."

Diallo, A., C. Luxey, P. Le Thuc, R. Staraj, G. Kossiavas, M. Franzen, P.S. Kildal, "Evaluation of the Performances of Several Four-Antenna Systems in a Reverberation Chamber."

Diallo, A., C. Luxey, P. Le Thuc, R. Staraj, G. Kossiavas, M. Franzen, P.S. Kildal, "MIMO Performance of Enhanced UMTS Four-Antenna Structures for Mobile Phones in the Presence of the User's Head."

Diallo, A., C. Luxey, P. Le Thuc, R. Staraj, G. Kossiavas, M. Franzén, P.S. Kildal, "Reverberation Chamber Evaluation of Multi-Antenna Handsets Having Low Mutual Coupling and High Efficiencies."

Diallo, Aliou, Cyril Luxey, Philippe Le Thuc, Robert Staraj, and Georges Kossiavas, "Study and Reduction of the Mutual Coupling Between Two Mobile Phone PIFAs Operating in the DCS1800 and UMTS Bands," IEEE Transactions on Antennas and Propagation, vol. 54, No. 11, Nov. 2006.

Dossche, S., S. Blanch and J. Romeu, "Three Different Ways to Decorrelate Two Closely Spaced Monopoles for MIMO Applications," IEEE 2005.

Foltz, H.D. J.S. McLean, E. Guzmzn, and G.E. Crook, "Multielement Top-loaded Vertical Antennas with Mutually Isolated Input Ports," University of Texas, Pan American, Electrical Engineering, pp. 1-24, GloMo 1998.

Ko, Samuel C. K. and Ross D. Murch, "Compact Integrated Diversity Antenna for Wireless Communications," IEEE Transactions on Antennas and Propagation, vol. 49, No. 6, Jun. 2001.

Lau, Buon Kiong, Jørgen Bach Andersen, Gerhard Kristensson, and Andreas F. Molisch, "Impact of Matching Network on Bandwidth of Compact Antenna Arrays," IEEE Transactions on Antennas and Propagation, vol. 54, No. 11, Nov. 2006.

Ranvier, S., C. Luxey, P. Suvikunnas, R. Staraj, and P. Vainikainen, "Capacity Enhancement by Increasing Both Mutual Coupling and Efficiency: a Novel Approach."

Ranvier, S., C. Luxey, R. Staraj, P. Vainikainen, and C. Icheln, "Mutual Coupling Reduction for Patch Antenna Array."

Stjernman, A., "Antenna Mutual Coupling Effects on Correlation, Efficiency and Shannon Capacity in MIMO Wireless Systems," EuCAP 2006—European Conference on Antennas & Propagation, Nov. 6, 2006.

Wallace, Jon W. and Michael A. Jensen, "The Capacity of MIMO Wireless Systems with Mutual Coupling."

Wallace, Jon W. and Michael A. Jensen, "Mutual Coupling in MIMO Wireless Systems: A Rigorous Network Theory Analysis."

Wallace, Jon W. and Michael A. Jensen, "Termination-Dependent Diversity Performance of Coupled Antennas: Network Theory Analysis," IEEE Transactions on Antennas and Propagation, vol. 52, No. 1, Jan. 2004.

PCT International Search Report and Written Opinion for International Application No. PCT/US2010/035961, Date of Mailing: Dec. 29, 2010.

Sakuda et al. "A Method of Decoupling in Two folded Antennas," Transactions of the Institute of Electronics and Communication Engineers of Japan, Section E (English) Japan, vol. E60, No. 8, Aug. 1977, pp. 422-423.

European Search Report for EP08746192, dated Nov. 4, 2011.

Office Action for Japan Patent Application No. 2010-504260, dated Sep. 11, 2012.

* cited by examiner

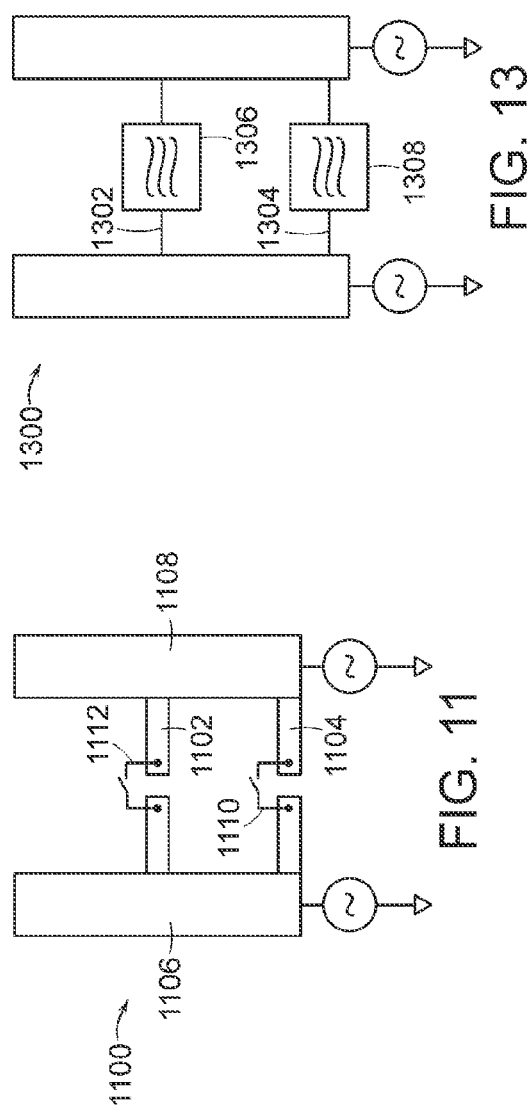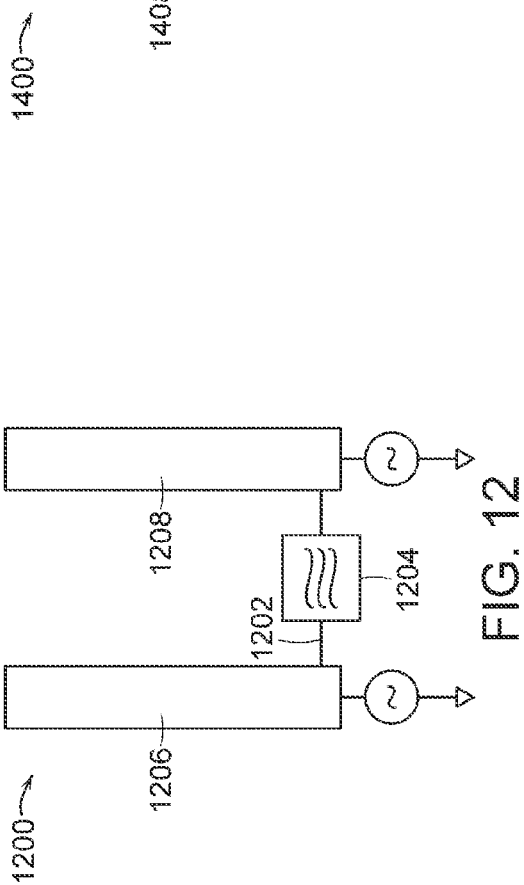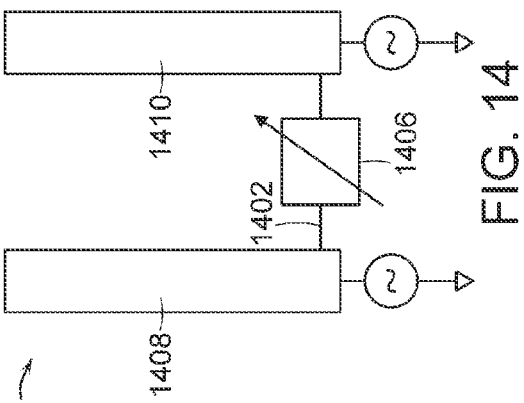

METHODS FOR REDUCING NEAR-FIELD RADIATION AND SPECIFIC ABSORPTION RATE (SAR) VALUES IN COMMUNICATIONS DEVICES

CROSS REFERENCE TO RELATED APPLICATIONS

This application is a continuation-in-part of U.S. patent application Ser. No. 12/750,196 filed Mar. 30, 2010 entitled Multimode Antenna Structure, which is a continuation of U.S. patent application Ser. No. 12/099,320 filed Apr. 8, 2008, entitled Multimode Antenna Structure (issued as U.S. Pat. No. 7,688,273), which is a continuation-in-part of U.S. patent application Ser. No. 11/769,565 filed Jun. 27, 2007 entitled Multimode Antenna Structure (issued as U.S. Pat. No. 7,688,275), which is based on U.S. Provisional Patent Application No. 60/925,394 filed on Apr. 20, 2007 entitled Multimode Antenna Structure, and U.S. Provisional Patent Application No. 60/916,655 filed on May 8, 2007 also entitled Multimode Antenna Structure. This application is also based on U.S. Provisional Patent Application No. 61/181,176 filed on May 26, 2009 also entitled Multimode Antenna Structure. Each of the above-identified applications is incorporated by reference herein.

BACKGROUND

The present invention relates generally to wireless communications devices and, more particularly, to methods for reducing near-field radiation and specific absorption rate (SAR) values in such devices.

Many communications devices have multiple antennas that are packaged close together (e.g., less than a quarter of a wavelength apart) and that can operate simultaneously within the same frequency band. Common examples of such communications devices include portable communications products such as cellular handsets, personal digital assistants (PDAs), and wireless networking devices or data cards for personal computers (PCs). Many system architectures (such as Multiple Input Multiple Output (MIMO)) and standard protocols for mobile wireless communications devices (such as 802.11n for wireless LAN, and 3G data communications such as 802.16e (WiMAX), HSDPA, and 1xEVDO) require multiple antennas operating simultaneously.

BRIEF SUMMARY OF EMBODIMENTS OF THE INVENTION

In accordance with one or more embodiments, a method is provided for reducing near-field radiation and specific absorption rate (SAR) values in a communications device. The communications device includes a multimode antenna structure transmitting and receiving electromagnetic signals and circuitry for processing signals communicated to and from the antenna structure. The antenna structure comprises: a plurality of antenna ports operatively coupled to the circuitry; a plurality of antenna elements, each operatively coupled to a different one of the antenna ports; and one or more connecting elements electrically connecting the antenna elements at a location on each antenna element that is spaced apart from an antenna port coupled thereto to form a single radiating structure and such that electrical currents on one antenna element flow to a connected neighboring antenna element and generally bypass the antenna port coupled to the neighboring antenna element, the electrical currents flowing through the one antenna element and the neighboring antenna element being generally equal in magnitude, such that an antenna mode excited by one antenna port is generally electrically isolated from a mode excited by another antenna port at a given desired signal frequency range and the antenna structure generates diverse antenna patterns. The method includes adjusting the relative phase between signals fed to neighboring antenna ports of the antenna structure such that a signal fed to the one antenna port has a different phase than a signal fed to the neighboring antenna port to provide antenna pattern control and to increase gain in a selected direction toward a receive point. The method features using a transmit power lower than the transmit power used in a non-pattern control operation of the antenna structure such that the communications device obtains generally equivalent wireless link performance with the receive point using reduced transmit power compared to the non-pattern control operation, thereby reducing the specific absorption rate.

In accordance with one or more further embodiments, a method is provided for reducing near-field radiation and specific absorption rate (SAR) values in a communications device. The communications device includes an antenna array for transmitting and receiving electromagnetic signals and circuitry for processing signals communicated to and from the antenna array. The antenna array comprises a plurality of radiating elements each having an antenna port operatively coupled to the circuitry. The method includes adjusting the relative phase between signals fed to the antenna ports of the antenna array such that a signal fed to one antenna port has a different phase than a signal fed to another antenna port to provide antenna pattern control and to increase gain in a selected direction toward a receive point. The method features using a transmit power lower than the transmit power used in a non-pattern control operation of the antenna array such that the communications device obtains generally equivalent wireless link performance with the receive point using reduced transmit power compared to the non-pattern control operation, thereby reducing the specific absorption rate.

BRIEF DESCRIPTION OF THE DRAWINGS

FIG. 11 illustrates an antenna structure including connecting elements having switches in accordance with one or more embodiments of the invention.

FIG. 12 illustrates an antenna structure having a connecting element with a filter coupled thereto in accordance with one or more embodiments of the invention.

FIG. 13 illustrates an antenna structure having two connecting elements with filters coupled thereto in accordance with one or more embodiments of the invention.

FIG. 14 illustrates an antenna structure having a tunable connecting element in accordance with one or more embodiments of the invention.

DETAILED DESCRIPTION

In accordance with various embodiments of the invention, multimode antenna structures are provided for transmitting and receiving electromagnetic signals in communications devices. The communications devices include circuitry for processing signals communicated to and from an antenna structure. The antenna structure includes a plurality of antenna ports operatively coupled to the circuitry and a plurality of antenna elements, each operatively coupled to a different antenna port. The antenna structure also includes one or more connecting elements electrically connecting the antenna elements such that an antenna mode excited by one antenna port is generally electrically isolated from a mode excited by another antenna port at a given signal frequency range. In addition, the antenna patterns created by the ports exhibit well-defined pattern diversity with low correlation.

Antenna structures in accordance with various embodiments of the invention are particularly useful in communications devices that require multiple antennas to be packaged close together (e.g., less than a quarter of a wavelength apart), including in devices where more than one antenna is used simultaneously and particularly within the same frequency band. Common examples of such devices in which the antenna structures can be used include portable communications products such as cellular handsets, PDAs, and wireless networking devices or data cards for PCs. The antenna structures are also particularly useful with system architectures such as MIMO and standard protocols for mobile wireless communications devices (such as 802.11n for wireless LAN, and 3G data communications such as 802.16e (WiMAX), HSDPA and 1xEVDO) that require multiple antennas operating simultaneously.

Figure 1A:
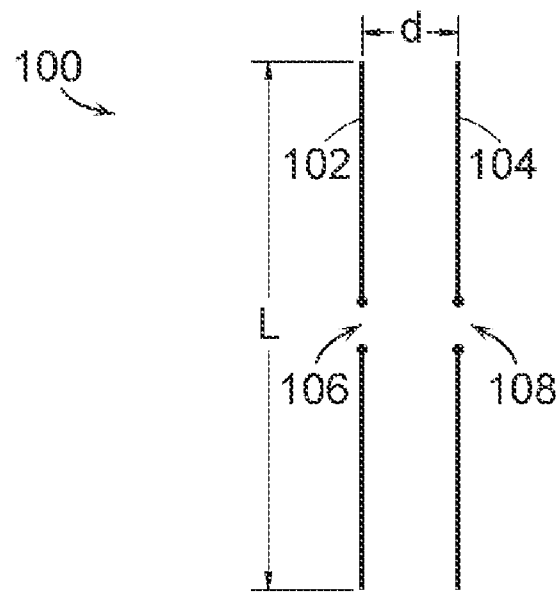
FIG. 1A illustrates an antenna structure with two parallel dipoles.
Figure 1B:
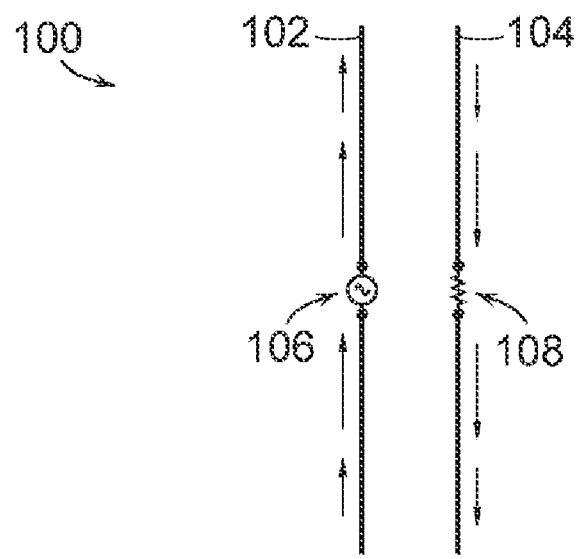
FIG. 1B illustrates current flow resulting from excitation of one dipole in the antenna structure of FIG. 1A.

FIGS. 1A-1G illustrate the operation of an antenna structure 100. FIG. 1A schematically illustrates the antenna structure 100 having two parallel antennas, in particular parallel dipoles 102, 104, of length L. The dipoles 102, 104 are separated by a distance d, and are not connected by any connecting element. The dipoles 102, 104 have a fundamental resonant frequency that corresponds approximately to $L=\lambda/2$. Each dipole is connected to an independent transmit/receive system, which can operate at the same frequency. This system connection can have the same characteristic impedance $Z_0$ for both antennas, which in this example is 50 ohms.

When one dipole is transmitting a signal, some of the signal being transmitted by the dipole will be coupled directly into the neighboring dipole. The maximum amount of coupling generally occurs near the half-wave resonant frequency of the individual dipole and increases as the separation distance d is made smaller. For example, for $d<\lambda/3$, the magnitude of coupling is greater than 0.1 or −10 dB, and for $d<\lambda/8$, the magnitude of the coupling is greater than −5 dB.

It is desirable to have no coupling (i.e., complete isolation) or to reduce the coupling between the antennas. If the coupling is, e.g., −10 dB, 10 percent of the transmit power is lost due to that amount of power being directly coupled into the neighboring antenna. There may also be detrimental system effects such as saturation or desensitization of a receiver connected to the neighboring antenna or degradation of the performance of a transmitter connected to the neighboring antenna. Currents induced on the neighboring antenna distort the gain pattern compared to that generated by an individual dipole. This effect is known to reduce the correlation between the gain patterns produced by the dipoles. Thus, while coupling may provide some pattern diversity, it has detrimental system impacts as described above.

Because of the close coupling, the antennas do not act independently and can be considered an antenna system having two pairs of terminals or ports that correspond to two different gain patterns. Use of either port involves substantially the entire structure including both dipoles. The parasitic excitation of the neighboring dipole enables diversity to be achieved at close dipole spacing, but currents excited on the dipole pass through the source impedance, and therefore manifest mutual coupling between ports.

Figure 1C:
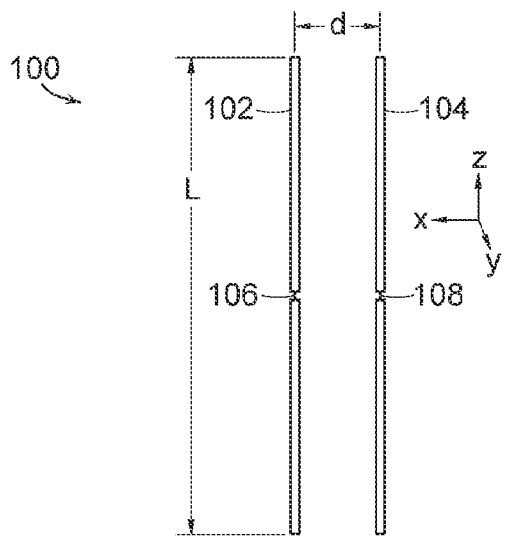
FIG. 1C illustrates a model corresponding to the antenna structure of FIG. 1A.
Figure 1D:
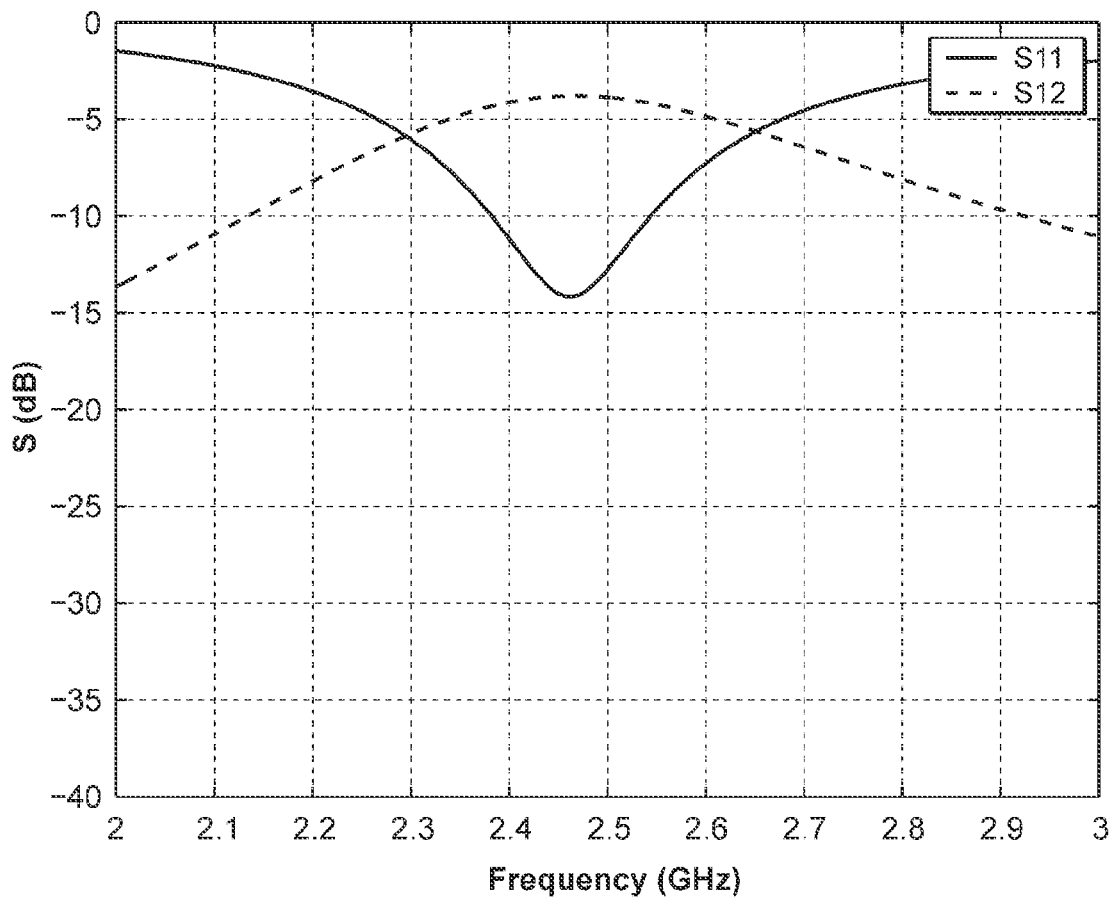
FIG. 1D is a graph illustrating scattering parameters for the FIG. 1C antenna structure.

FIG. 1C illustrates a model dipole pair corresponding to the antenna structure 100 shown in FIG. 1 used for simulations. In this example, the dipoles 102, 104 have a square cross section of 1 mm×1 mm and length (L) of 56 mm. These dimensions yield a center resonant frequency of 2.45 GHz when attached to a 50-ohm source. The free-space wavelength at this frequency is 122 mm. A plot of the scattering parameters S11 and S12 for a separation distance (d) of 10 mm, or approximately $\lambda/12$, is shown in FIG. 1D. Due to symmetry and reciprocity, S22=S11 and S12=S21. For simplicity, only S11 and S12 are shown and discussed. In this configuration, the coupling between dipoles as represented by S12 reaches a maximum of −3.7 dB.

Figure 1E:
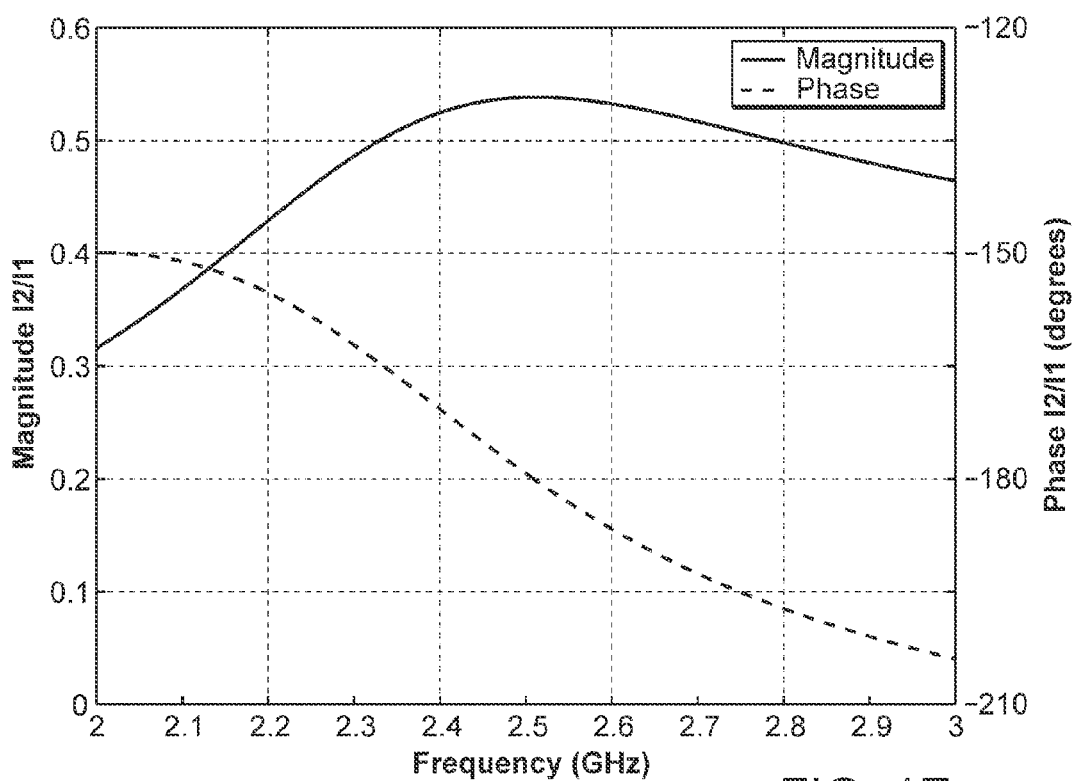
FIG. 1E is a graph illustrating the current ratios for the FIG. 1C antenna structure.

FIG. 1E shows the ratio (identified as "Magnitude I2/I1" in the figure) of the vertical current on dipole 104 of the antenna structure to that on dipole 102 under the condition in which port 106 is excited and port 108 is passively terminated. The frequency at which the ratio of currents (dipole 104/dipole 102) is a maximum corresponds to the frequency of 180 degree phase differential between the dipole currents and is just slightly higher in frequency than the point of maximum coupling shown in FIG. 1D.

Figure 1F:
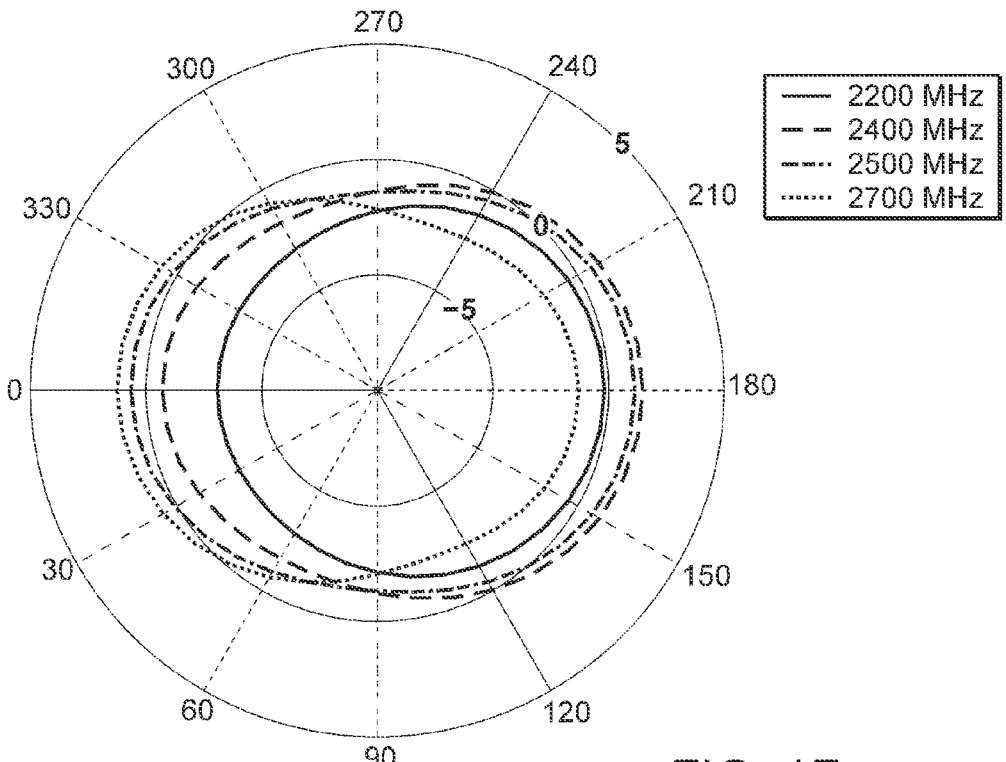
FIG. 1F is a graph illustrating gain patterns for the FIG. 1C antenna structure.

FIG. 1F shows azimuthal gain patterns for several frequencies with excitation of port 106. The patterns are not uniformly omni-directional and change with frequency due to the changing magnitude and phase of the coupling. Due to symmetry, the patterns resulting from excitation of port 108 would be the mirror image of those for port 106. Therefore, the more asymmetrical the pattern is from left to right, the more diverse the patterns are in terms of gain magnitude.

Figure 1G:
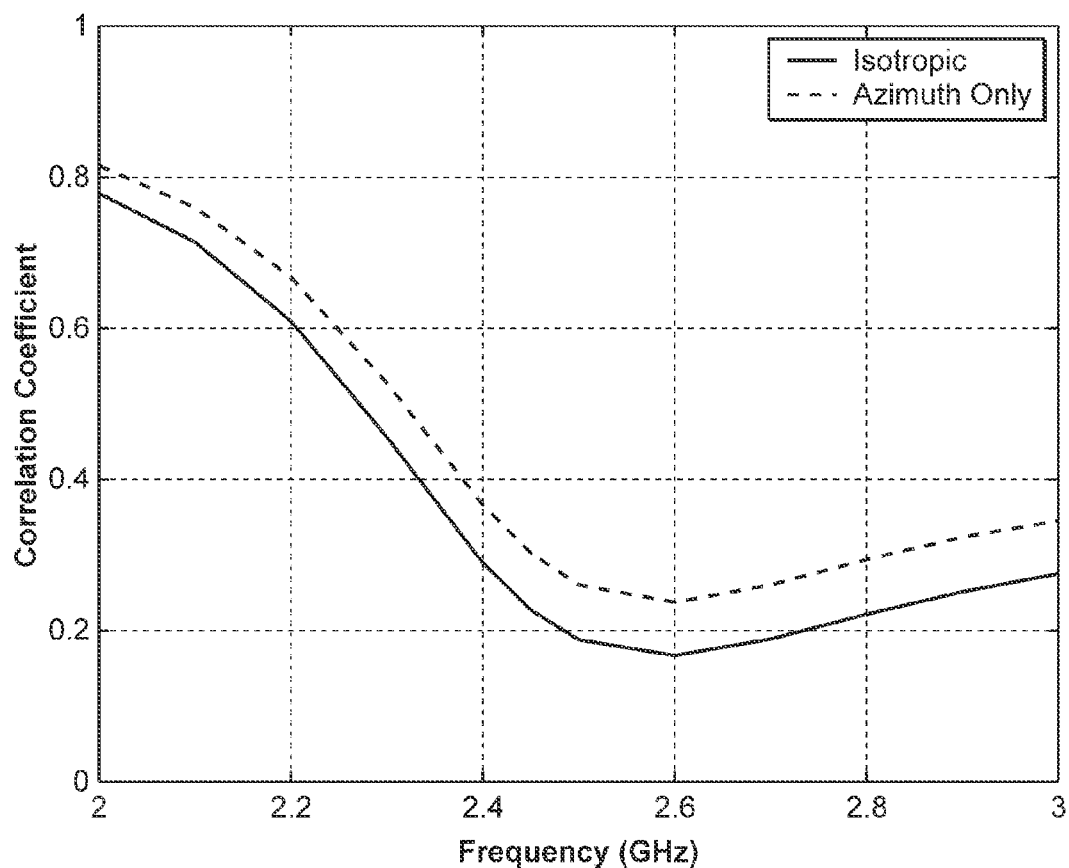
FIG. 1G is a graph illustrating envelope correlation for the FIG. 1C antenna structure.

Calculation of the correlation coefficient between patterns provides a quantitative characterization of the pattern diversity. FIG. 1G shows the calculated correlation between port 106 and port 108 antenna patterns. The correlation is much lower than is predicted by Clark's model for ideal dipoles. This is due to the differences in the patterns introduced by the mutual coupling.

Figure 2A:
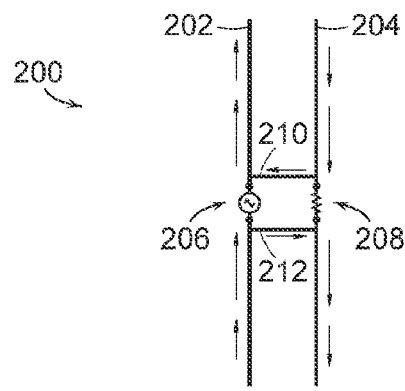
FIG. 2A illustrates an antenna structure with two parallel dipoles connected by connecting elements in accordance with one or more embodiments of the invention.

FIGS. 2A-2F illustrate the operation of an exemplary two port antenna structure 200 in accordance with one or more embodiments of the invention. The two port antenna structure 200 includes two closely-spaced resonant antenna elements 202, 204 and provides both low pattern correlation and low coupling between ports 206, 208. FIG. 2A schematically illustrates the two port antenna structure 200. This structure is similar to the antenna structure 100 comprising the pair of dipoles shown in FIG. 1B, but additionally includes horizontal conductive connecting elements 210, 212 between the dipoles on either side of the ports 206, 208. The two ports 206, 208 are located in the same locations as with the FIG. 1 antenna structure. When one port is excited, the combined structure exhibits a resonance similar to that of the unattached pair of dipoles, but with a significant reduction in coupling and an increase in pattern diversity.

Figure 2B:
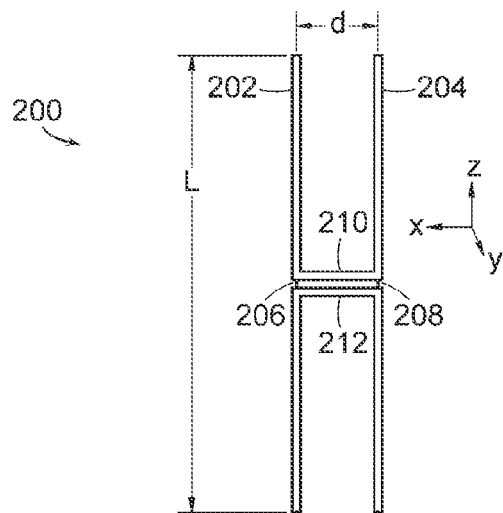
FIG. 2B illustrates a model corresponding to the antenna structure of FIG. 2A.
Figure 2C:
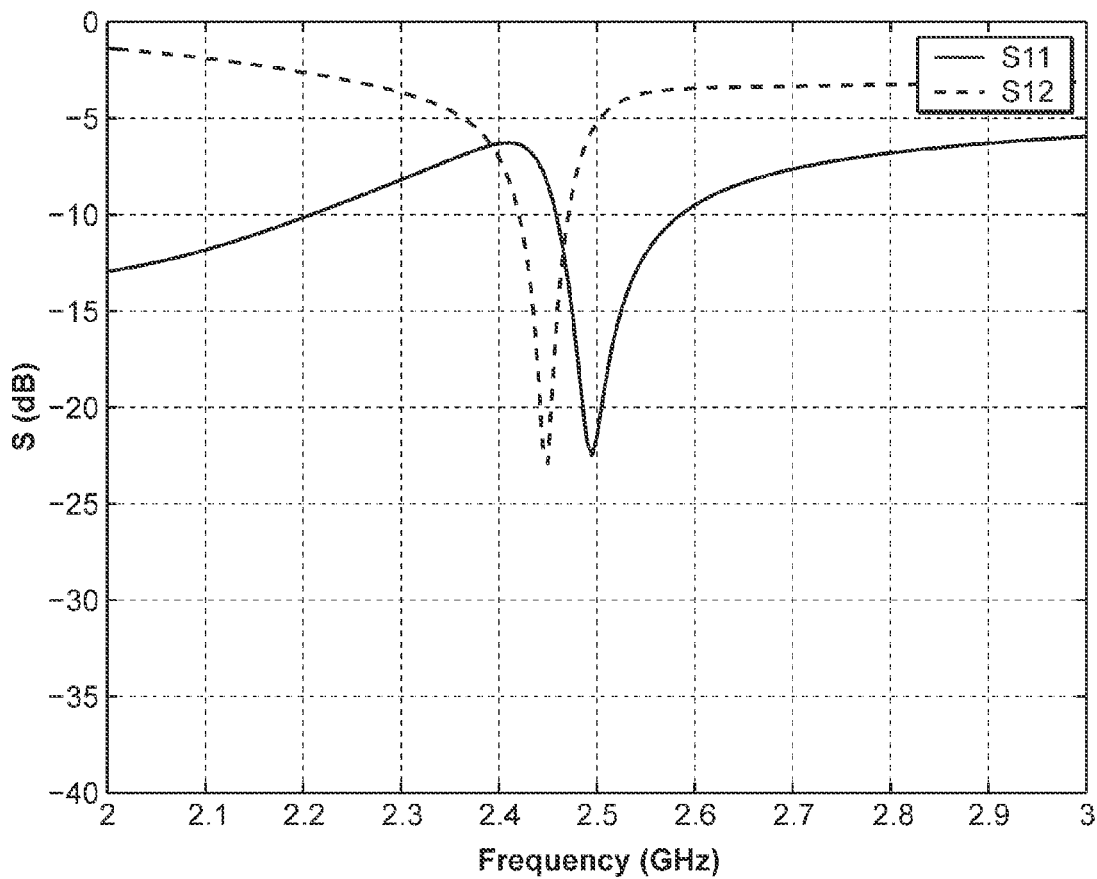
FIG. 2C is a graph illustrating scattering parameters for the FIG. 2B antenna structure.
Figure 2D:
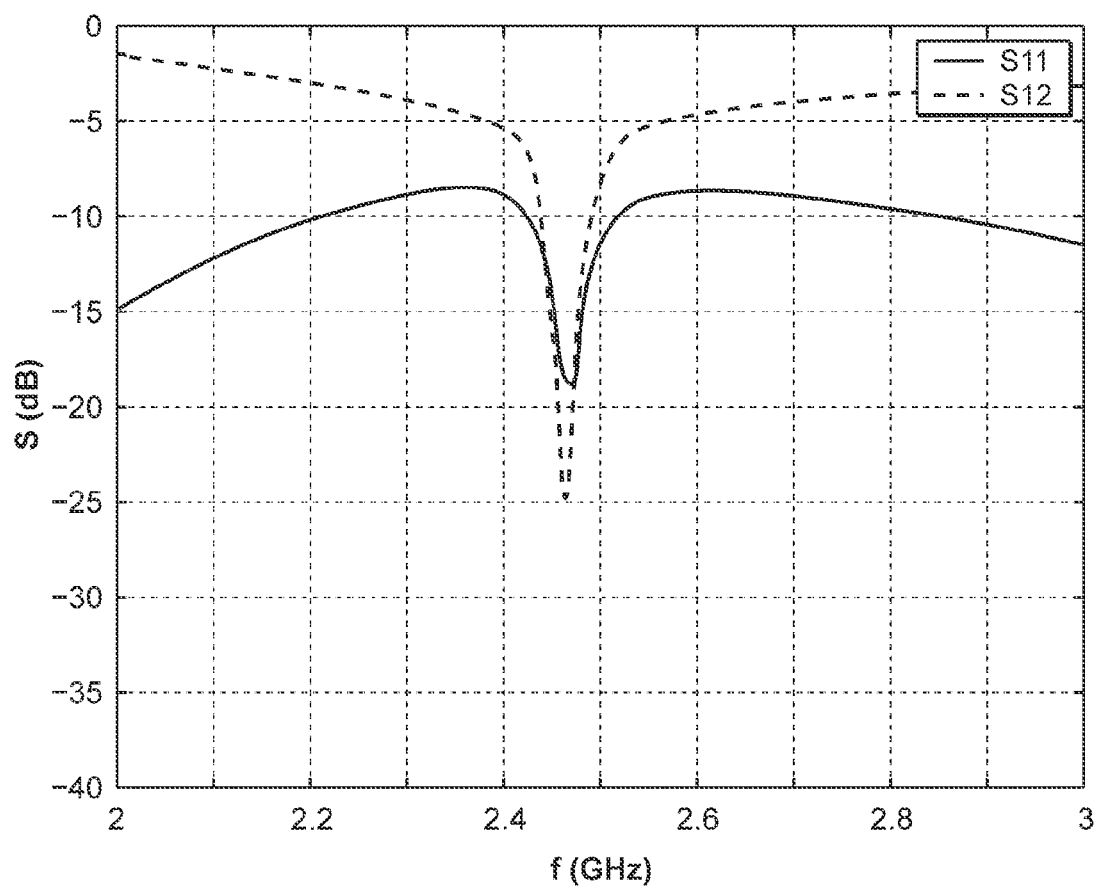
FIG. 2D is a graph illustrating scattering parameters for the FIG. 2B antenna structure with lumped element impedance matching at both ports.

An exemplary model of the antenna structure 200 with a 10 mm dipole separation is shown in FIG. 2B. This structure has generally the same geometry as the antenna structure 100 shown in FIG. 1C, but with the addition of the two horizontal connecting elements 210, 212 electrically connecting the antenna elements slightly above and below the ports. This structure shows a strong resonance at the same frequency as unattached dipoles, but with very different scattering parameters as shown in FIG. 2C. There is a deep drop-out in coupling, below −20 dB, and a shift in the input impedance as indicated by S11. In this example, the best impedance match (S11 minimum) does not coincide with the lowest coupling (S12 minimum). A matching network can be used to improve the input impedance match and still achieve very low coupling as shown in FIG. 2D. In this example, a lumped element matching network comprising a series inductor followed by a shunt capacitor was added between each port and the structure.

Figure 2E:
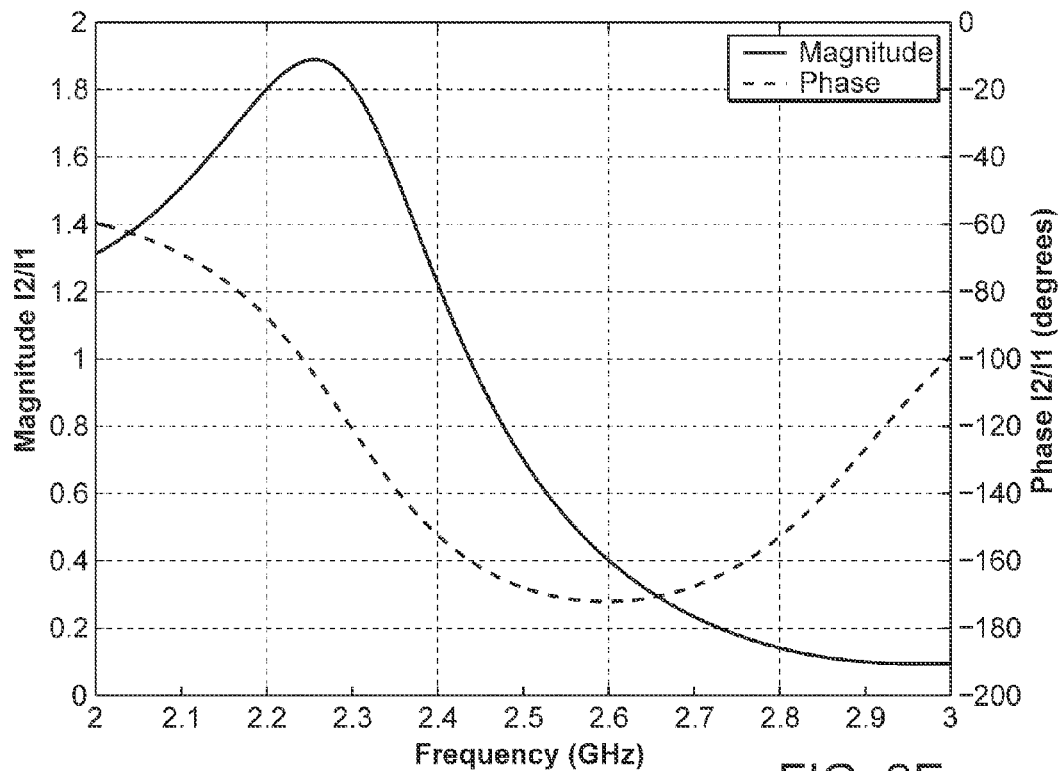
FIG. 2E is a graph illustrating the current ratios for the FIG. 2B antenna structure.
Figure 2F:
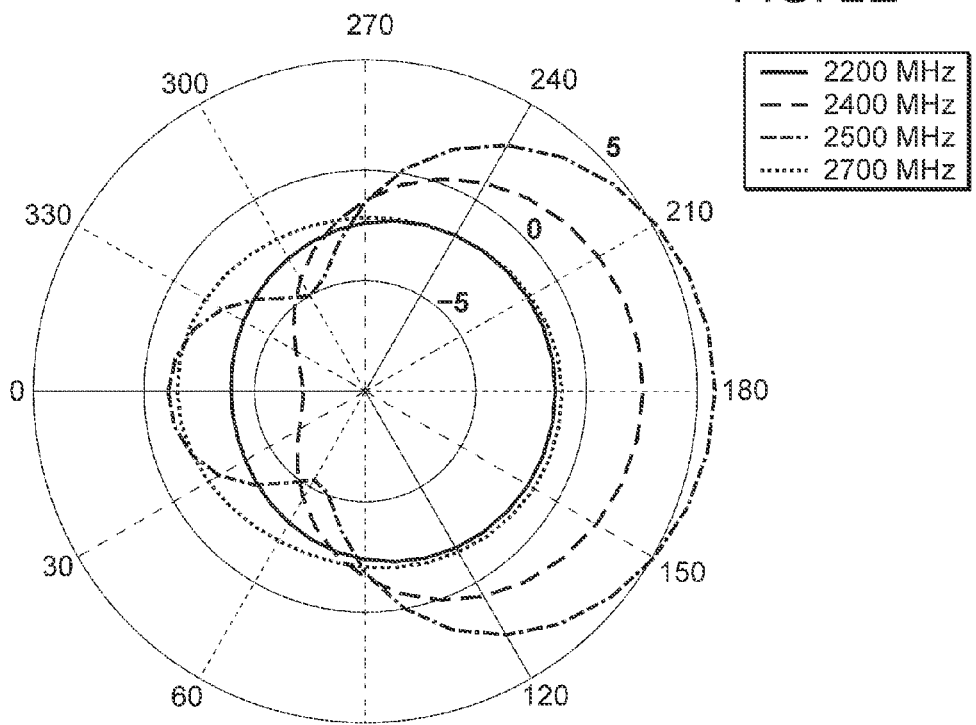
FIG. 2F is a graph illustrating gain patterns for the FIG. 2B antenna structure.

FIG. 2E shows the ratio (indicated as "Magnitude I2/I1" in the figure) of the current on dipole element 204 to that on dipole element 202 resulting from excitation of port 206. This plot shows that below the resonant frequency, the currents are actually greater on dipole element 204. Near resonance, the currents on dipole element 204 begin to decrease relative to those on dipole element 202 with increasing frequency. The point of minimum coupling (2.44 GHz in this case) occurs near the frequency where currents on both dipole elements are generally equal in magnitude. At this frequency, the phase of the currents on dipole element 204 lag those of dipole element 202 by approximately 160 degrees.

Unlike the FIG. 1C dipoles without connecting elements, the currents on antenna element 204 of the FIG. 2B combined antenna structure 200 are not forced to pass through the terminal impedance of port 208. Instead a resonant mode is produced where the current flows down antenna element 204, across the connecting element 210, 212, and up antenna element 202 as indicated by the arrows shown on FIG. 2A. (Note that this current flow is representative of one half of the resonant cycle; during the other half, the current directions are reversed). The resonant mode of the combined structure features the following: (1) the currents on antenna element 204 largely bypass port 208, thereby allowing for high isolation between the ports 206, 208, and (2) the magnitude of the currents on both antenna elements 202, 204 are approximately equal, which allows for dissimilar and uncorrelated gain patterns as described in further detail below.

Because the magnitude of currents is nearly equal on the antenna elements, a much more directional pattern is produced (as shown on FIG. 2F) than in the case of the FIG. 1C antenna structure 100 with unattached dipoles. When the currents are equal, the condition for nulling the pattern in the x (or phi=0) direction is for the phase of currents on dipole 204 to lag those of dipole 202 by the quantity $\pi$-kd (where $k=2\pi/\lambda$, and $\lambda$ is the effective wavelength). Under this condition, fields propagating in the phi=0 direction from dipole 204 will be 180 degrees out of phase with those of dipole 202, and the combination of the two will therefore have a null in the phi=0 direction.

Figure 2G:
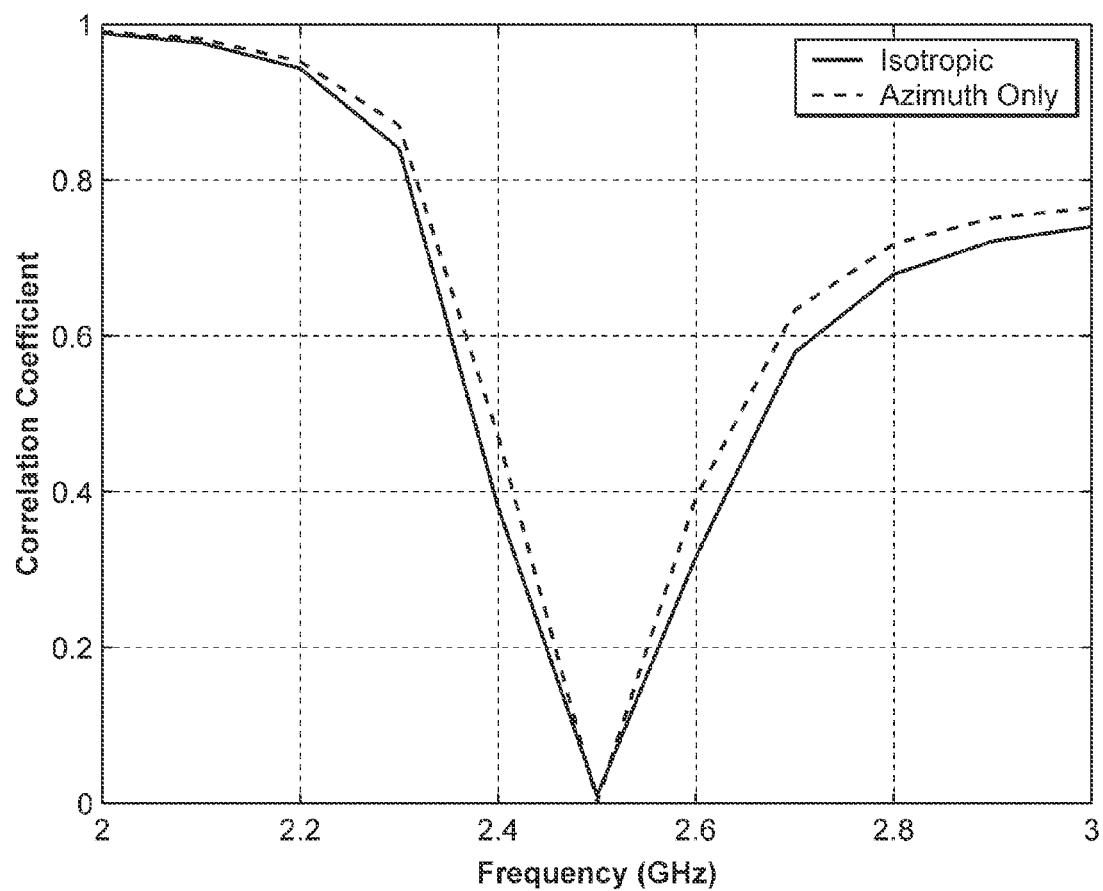
FIG. 2G is a graph illustrating envelope correlation for the FIG. 2B antenna structure.

In the model example of FIG. 2B, d is 10 mm or an effective electrical length of $\lambda/12$. In this case, kd equates $\pi/6$ or 30 degrees, and so the condition for a directional azimuthal radiation pattern with a null towards phi=0 and maximum gain towards phi=180 is for the current on dipole 204 to lag those on dipole 202 by 150 degrees. At resonance, the currents pass close to this condition (as shown in FIG. 2E), which explains the directionality of the patterns. In the case of the excitation of dipole 204, the radiation patterns are the mirror opposite of those of FIG. 2F, and maximum gain is in the phi=0 direction. The difference in antenna patterns produced from the two ports has an associated low predicted envelope correlation as shown on FIG. 2G. Thus the combined antenna structure has two ports that are isolated from each other and produce gain patterns of low correlation.

Figure 3A:
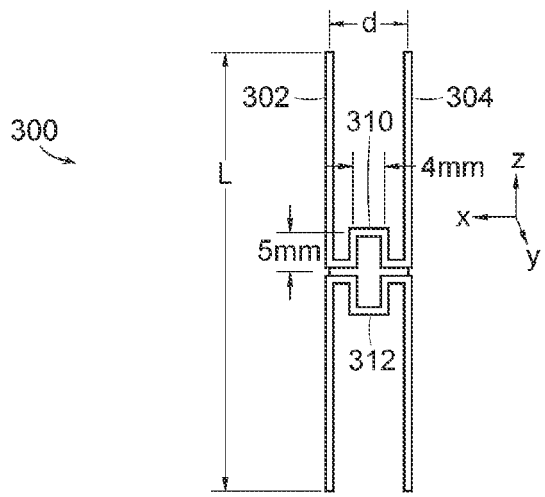
FIG. 3A illustrates an antenna structure with two parallel dipoles connected by meandered connecting elements in accordance with one or more embodiments of the invention.
Figure 3B:
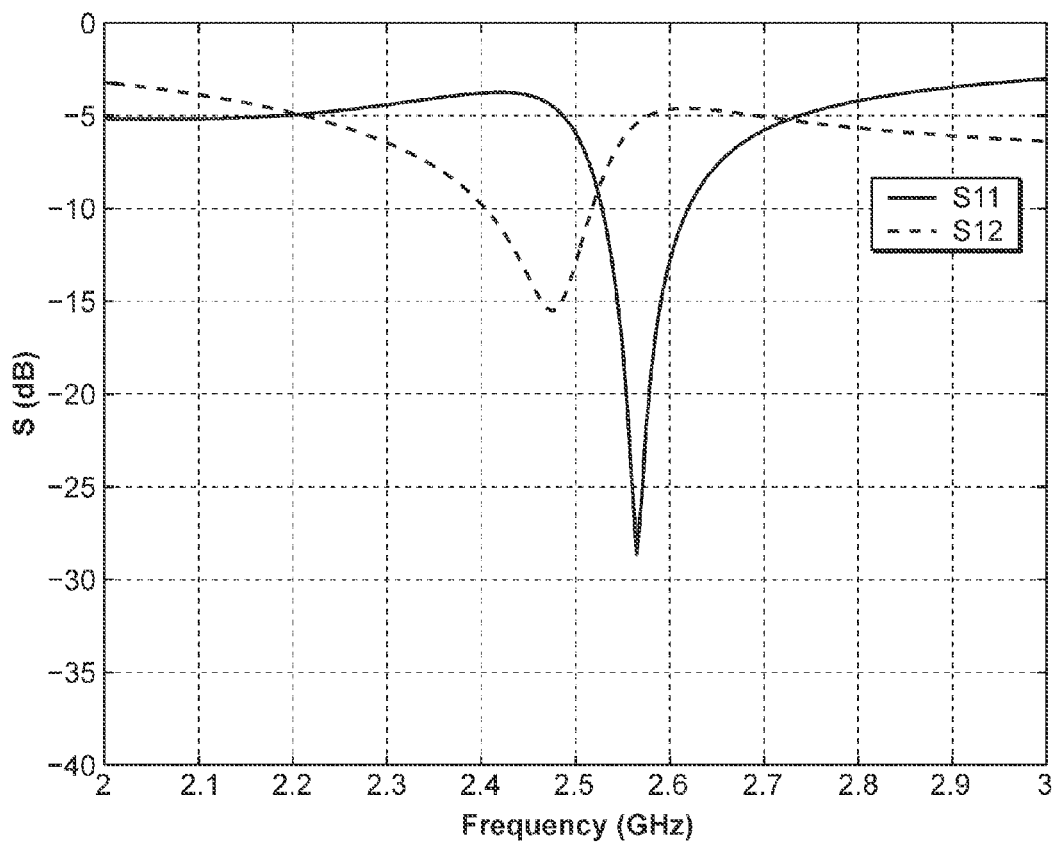
FIG. 3B is a graph showing scattering parameters for the FIG. 3A antenna structure.
Figure 3C:
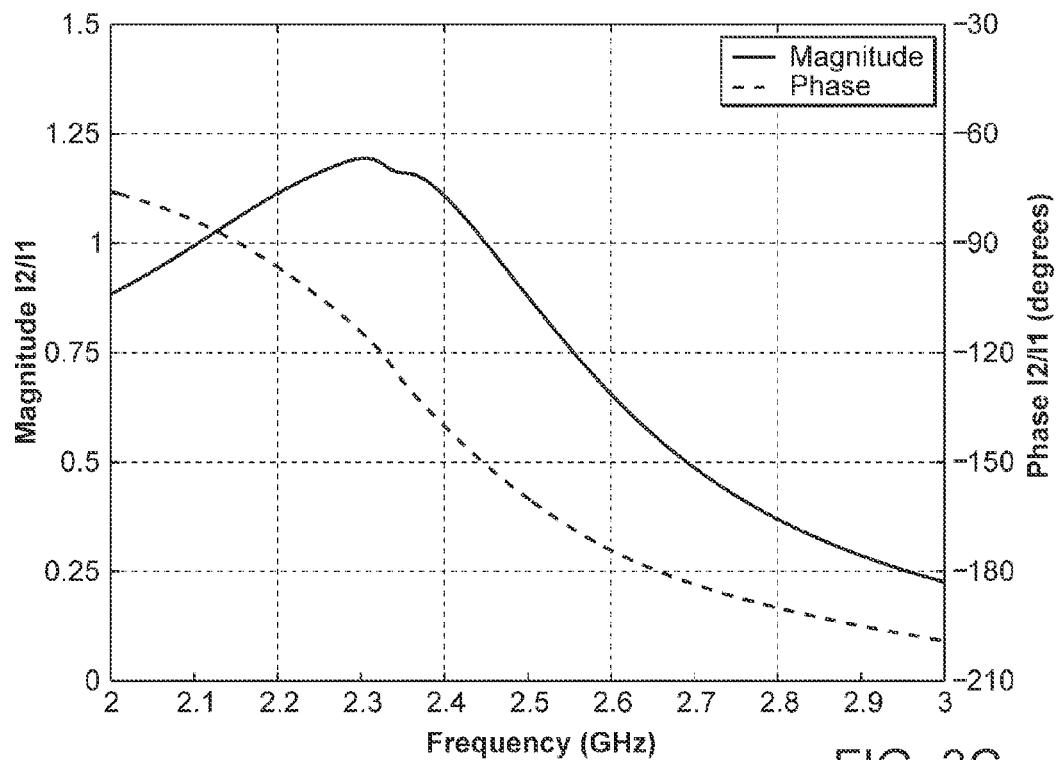
FIG. 3C is a graph illustrating current ratios for the FIG. 3A antenna structure.
Figure 3D:
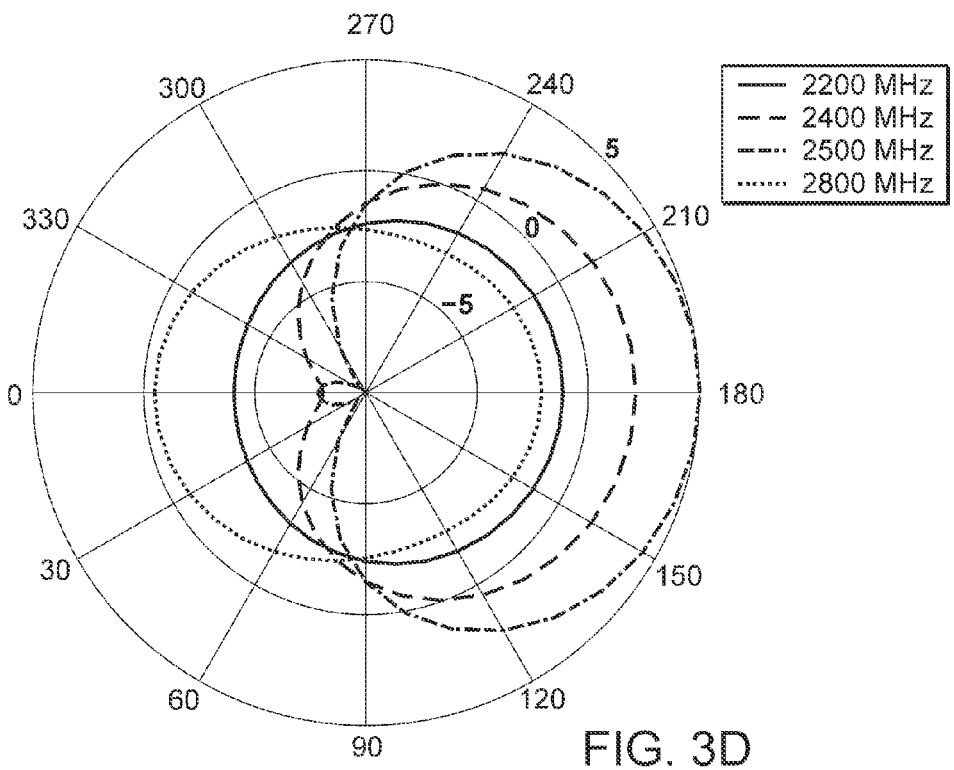
FIG. 3D is a graph illustrating gain patterns for the FIG. 3A antenna structure.
Figure 3E:
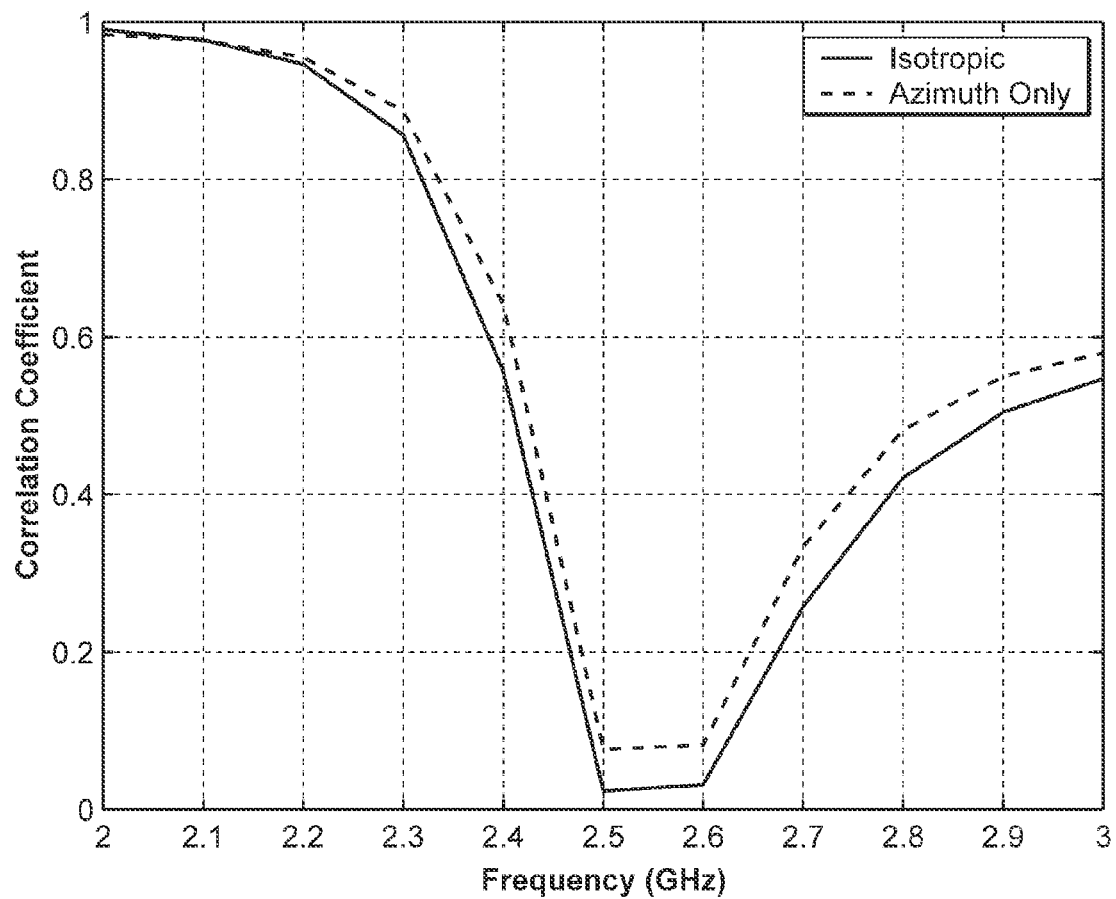
FIG. 3E is a graph illustrating envelope correlation for the FIG. 3A antenna structure.

Accordingly, the frequency response of the coupling is dependent on the characteristics of the connecting elements 210, 212, including their impedance and electrical length. In accordance with one or more embodiments of the invention, the frequency or bandwidth over which a desired amount of isolation can be maintained is controlled by appropriately configuring the connecting elements. One way to configure the cross connection is to change the physical length of the connecting element. An example of this is shown by the multimode antenna structure 300 of FIG. 3A where a meander has been added to the cross connection path of the connecting elements 310, 312. This has the general effect of increasing both the electrical length and the impedance of the connection between the two antenna elements 302, 304. Performance characteristics of this structure including scattering parameters, current ratios, gain patterns, and pattern correlation are shown on FIGS. 3B, 3C, 3D, and 3E, respectively. In this embodiment, the change in physical length has not significantly altered the resonant frequency of the structure, but there is a significant change in S12, with larger bandwidth and a greater minimum value than in structures without the meander. Thus, it is possible to optimize or improve the isolation performance by altering the electrical characteristic of the connecting elements.

Figure 4:
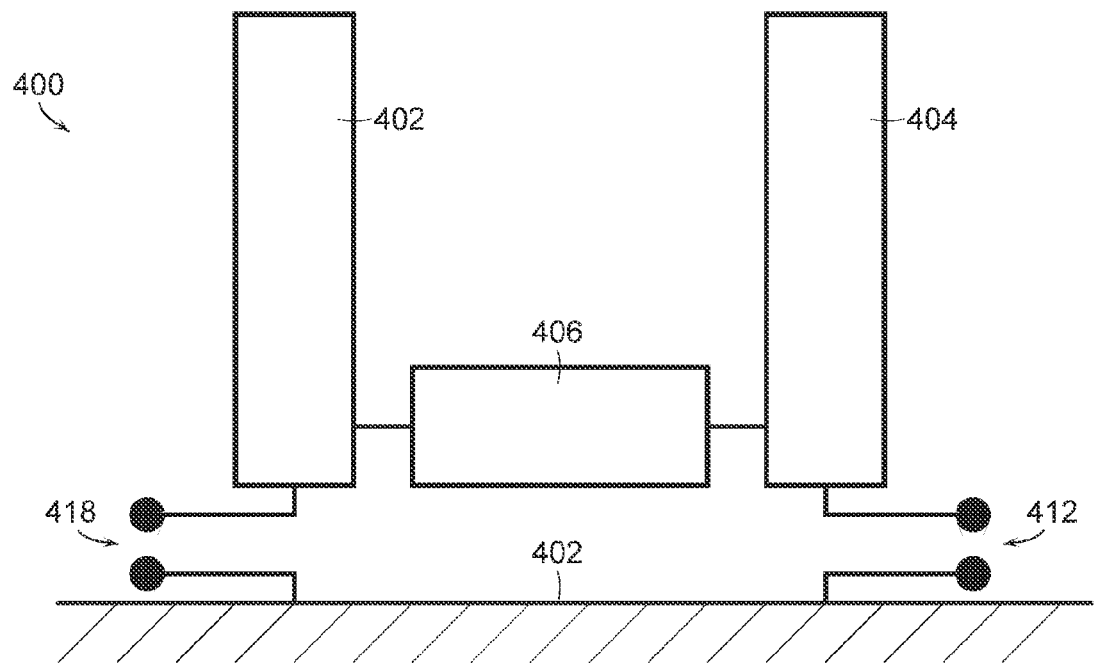
FIG. 4 illustrates an antenna structure with a ground or counterpoise in accordance with one or more embodiments of the invention.
Figure 5:
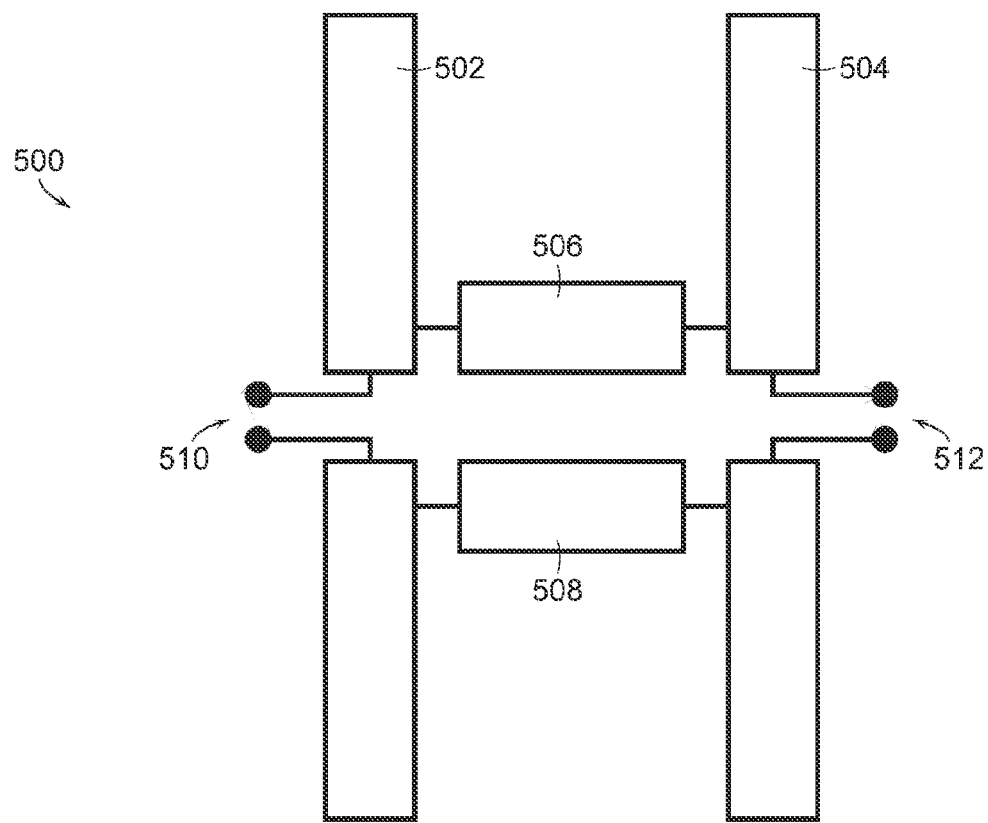
FIG. 5 illustrates a balanced antenna structure in accordance with one or more embodiments of the invention.

Exemplary multimode antenna structures in accordance with various embodiments of the invention can be designed to be excited from a ground or counterpoise 402 (as shown by antenna structure 400 in FIG. 4), or as a balanced structure (as shown by antenna structure 500 in FIG. 5). In either case, each antenna structure includes two or more antenna elements (402, 404 in FIG. 4, and 502, 504 in FIG. 5) and one or more electrically conductive connecting elements (406 in FIG. 4, and 506, 508 in FIG. 5). For ease of illustration, only a two-port structure is illustrated in the example diagrams. However, it is possible to extend the structure to include more than two ports in accordance with various embodiments of the invention. A signal connection to the antenna structure, or port (418, 412 in FIGS. 4 and 510, 512 in FIG. 5), is provided at each antenna element. The connecting element provides electrical connection between the two antenna elements at the frequency or frequency range of interest. Although the antenna is physically and electrically one structure, its operation can be explained by considering it as two independent antennas. For antenna structures not including a connecting element such as antenna structure 100, port 106 of that structure can be said to be connected to antenna 102, and port 108 can be said to be connected to antenna 104. However, in the case of this combined structure such as antenna structure 400, port 418 can be referred to as being associated with one antenna mode, and port 412 can be referred to as being associated with another antenna mode.

The antenna elements are designed to be resonant at the desired frequency or frequency range of operation. The lowest order antenna resonance occurs when an antenna element has an electrical length of one quarter of a wavelength. Thus, a simple element design is a quarter-wave monopole in the case of an unbalanced configuration. It is also possible to use higher order modes. For example, a structure formed from quarter-wave monopoles also exhibits dual mode antenna performance with high isolation at a frequency of three times the fundamental frequency. Thus, higher order modes may be exploited to create a multiband antenna. Similarly, in a balanced configuration, the antenna elements can be complementary quarter-wave elements as in a half-wave center-fed dipole. However, the antenna structure can also be formed from other types of antenna elements that are resonant at the desired frequency or frequency range. Other possible antenna element configurations include, but are not limited to, helical coils, wideband planar shapes, chip antennas, meandered shapes, loops, and inductively shunted forms such as Planar Inverted-F Antennas (PIFAs).

The antenna elements of an antenna structure in accordance with one or more embodiments of the invention need not have the same geometry or be the same type of antenna element. The antenna elements should each have resonance at the desired frequency or frequency range of operation.

In accordance with one or more embodiments of the invention, the antenna elements of an antenna structure have the same geometry. This is generally desirable for design simplicity, especially when the antenna performance requirements are the same for connection to either port.

Figure 6A:
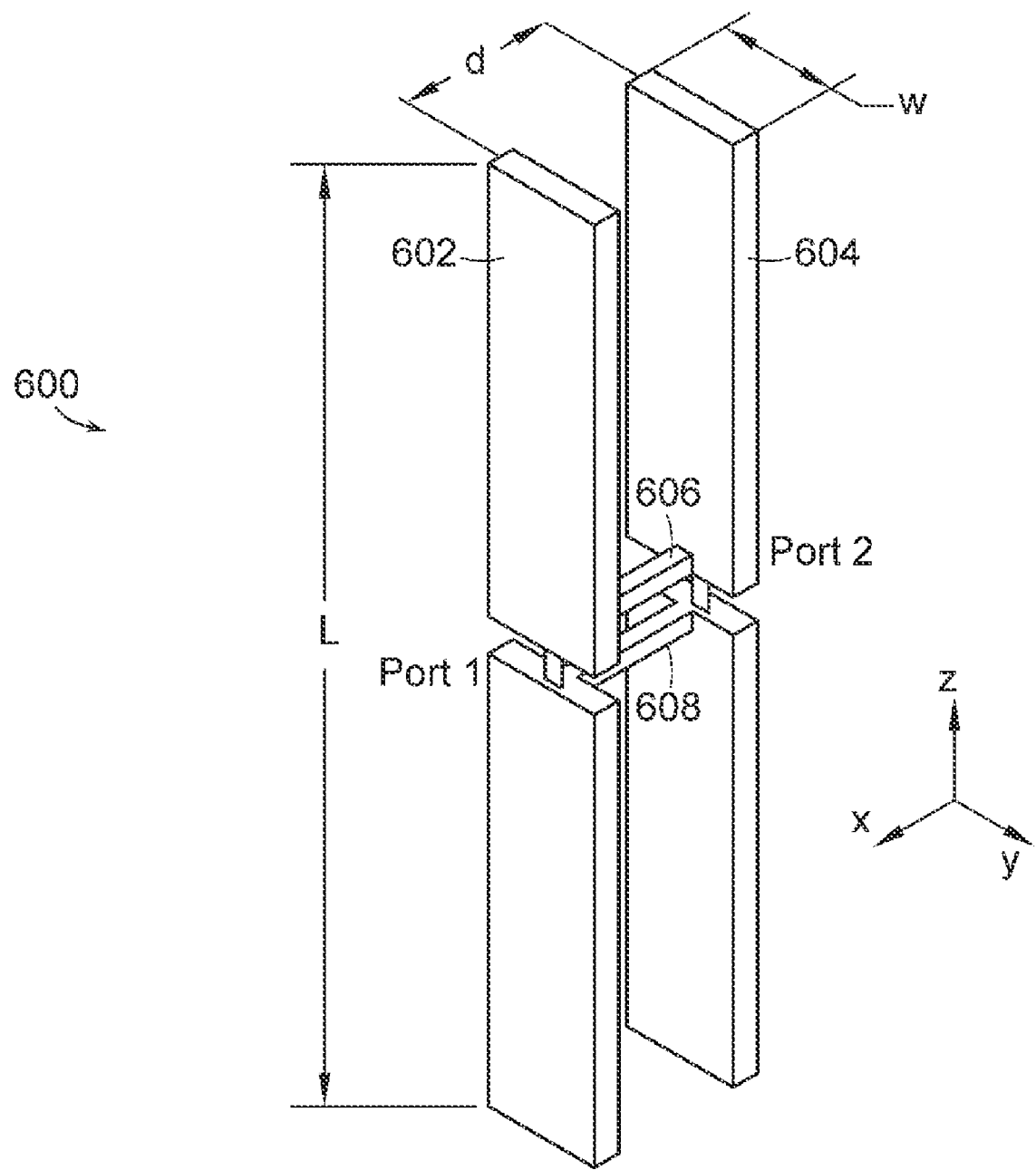
FIG. 6A illustrates an antenna structure in accordance with one or more embodiments of the invention.
Figure 6B:
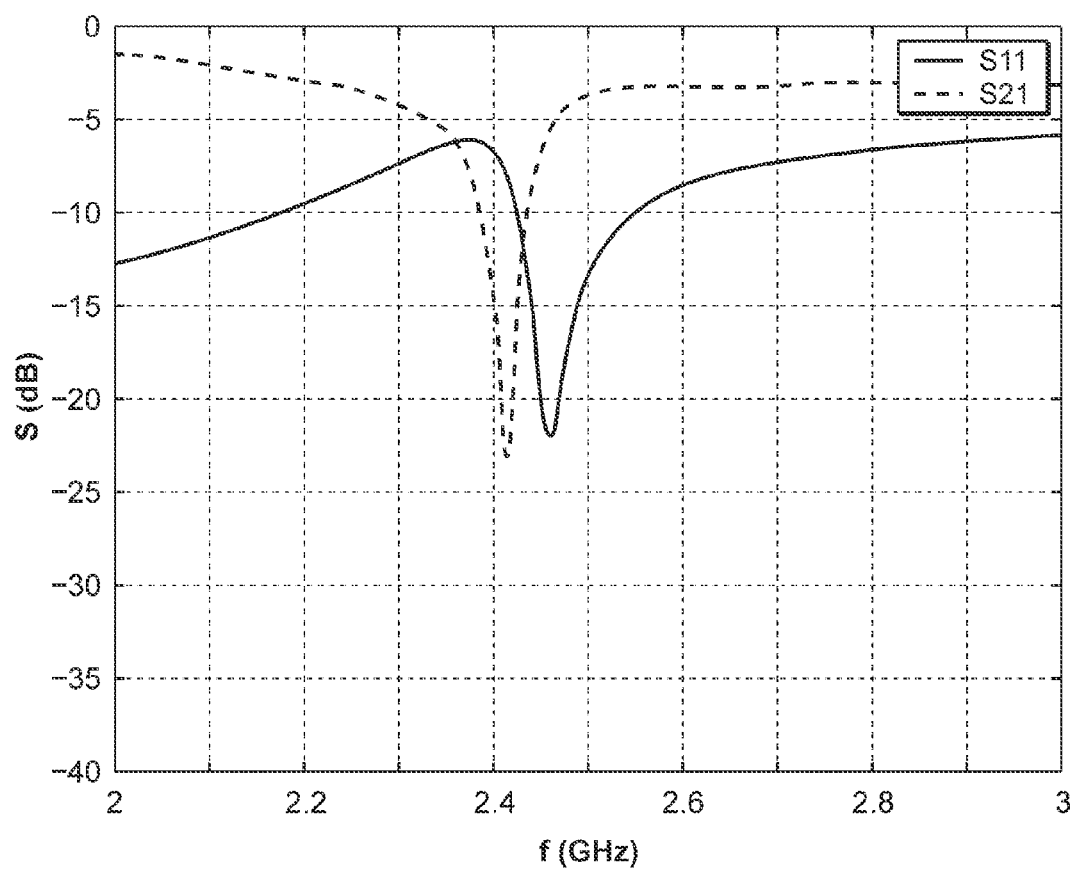
FIG. 6B is a graph showing scattering parameters for the FIG. 6A antenna structure for a particular dipole width dimension.
Figure 6C:
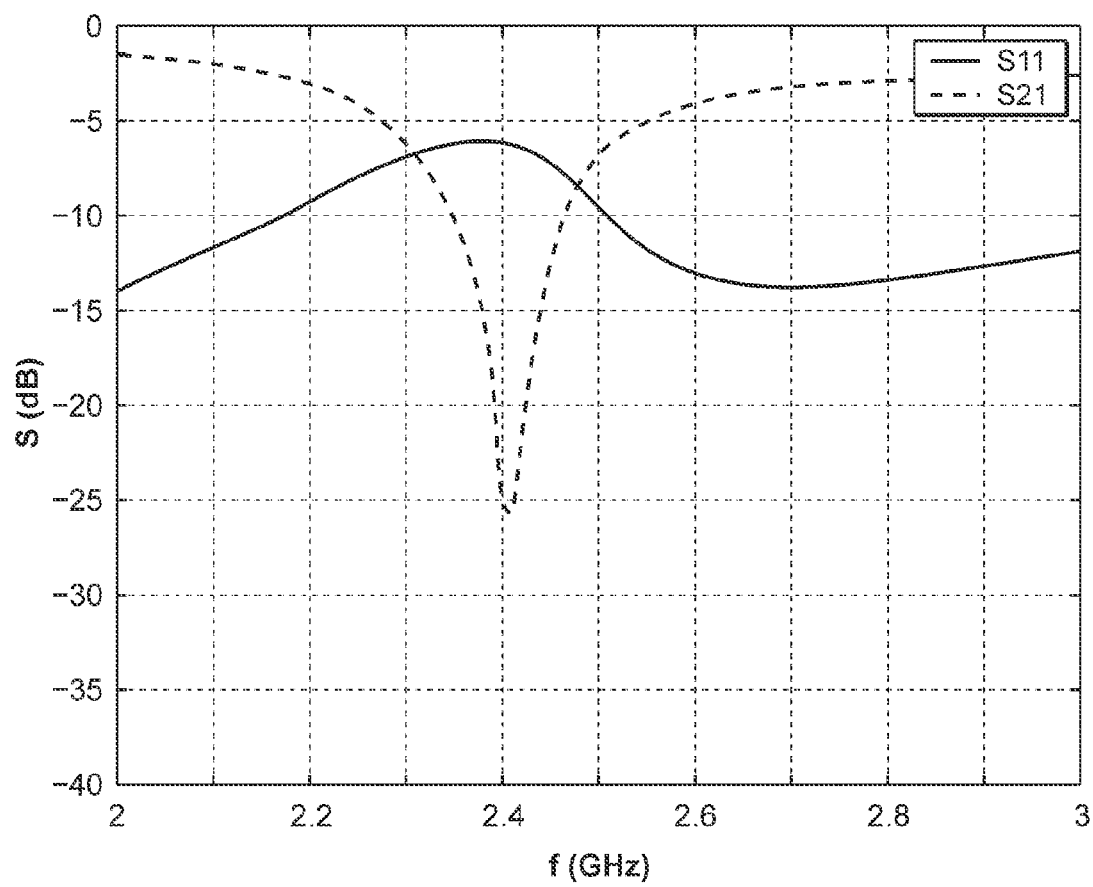
FIG. 6C is a graph showing scattering parameters for the FIG. 6A antenna structure for another dipole width dimension.

The bandwidth and resonant frequencies of the combined antenna structure can be controlled by the bandwidth and resonance frequencies of the antenna elements. Thus, broader bandwidth elements can be used to produce a broader bandwidth for the modes of the combined structure as illustrated, e.g., in FIGS. 6A, 6B, and 6C. FIG. 6A illustrates a multimode antenna structure 600 including two dipoles 602, 604 connected by connecting elements 606, 608. The dipoles 602, 604 each have a width (W) and a length (L) and are spaced apart by a distance (d). FIG. 6B illustrates the scattering parameters for the structure having exemplary dimensions: W=1 mm, L=57.2 mm, and d=10 mm. FIG. 6C illustrates the scattering parameters for the structure having exemplary dimensions: W=10 mm, L=50.4 mm, and d=10 mm. As shown, increasing W from 1 mm to 10 mm, while keeping the other dimensions generally the same, results in a broader isolation bandwidth and impedance bandwidth for the antenna structure.

It has also been found that increasing the separation between the antenna elements increases the isolation bandwidth and the impedance bandwidth for an antenna structure.

In general, the connecting element is in the high-current region of the combined resonant structure. It is therefore preferable for the connecting element to have a high conductivity.

The ports are located at the feed points of the antenna elements as they would be if they were operated as separate antennas. Matching elements or structures may be used to match the port impedance to the desired system impedance.

Figure 7:
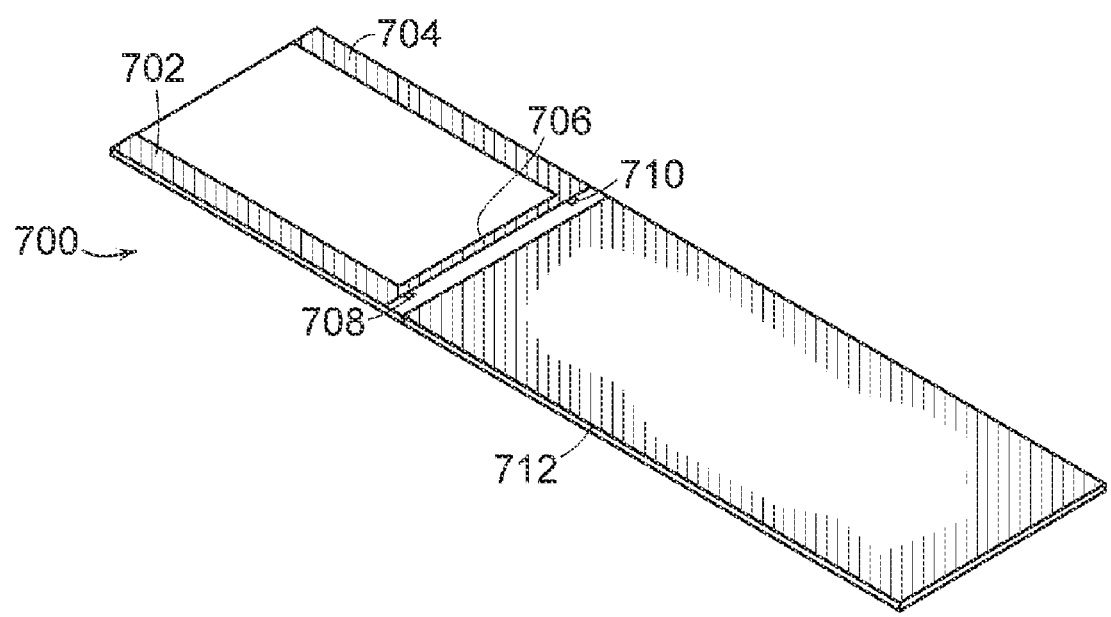
FIG. 7 illustrates an antenna structure fabricated on a printed circuit board in accordance with one or more embodiments of the invention.

In accordance with one or more embodiments of the invention, the multimode antenna structure can be a planar structure incorporated, e.g., into a printed circuit board, as shown as FIG. 7. In this example, the antenna structure 700 includes antenna elements 702, 704 connected by a connecting element 706 at ports 708, 710. The antenna structure is fabricated on a printed circuit board substrate 712. The antenna elements shown in the figure are simple quarter-wave monopoles. However, the antenna elements can be any geometry that yields an equivalent effective electrical length.

Figure 8A:
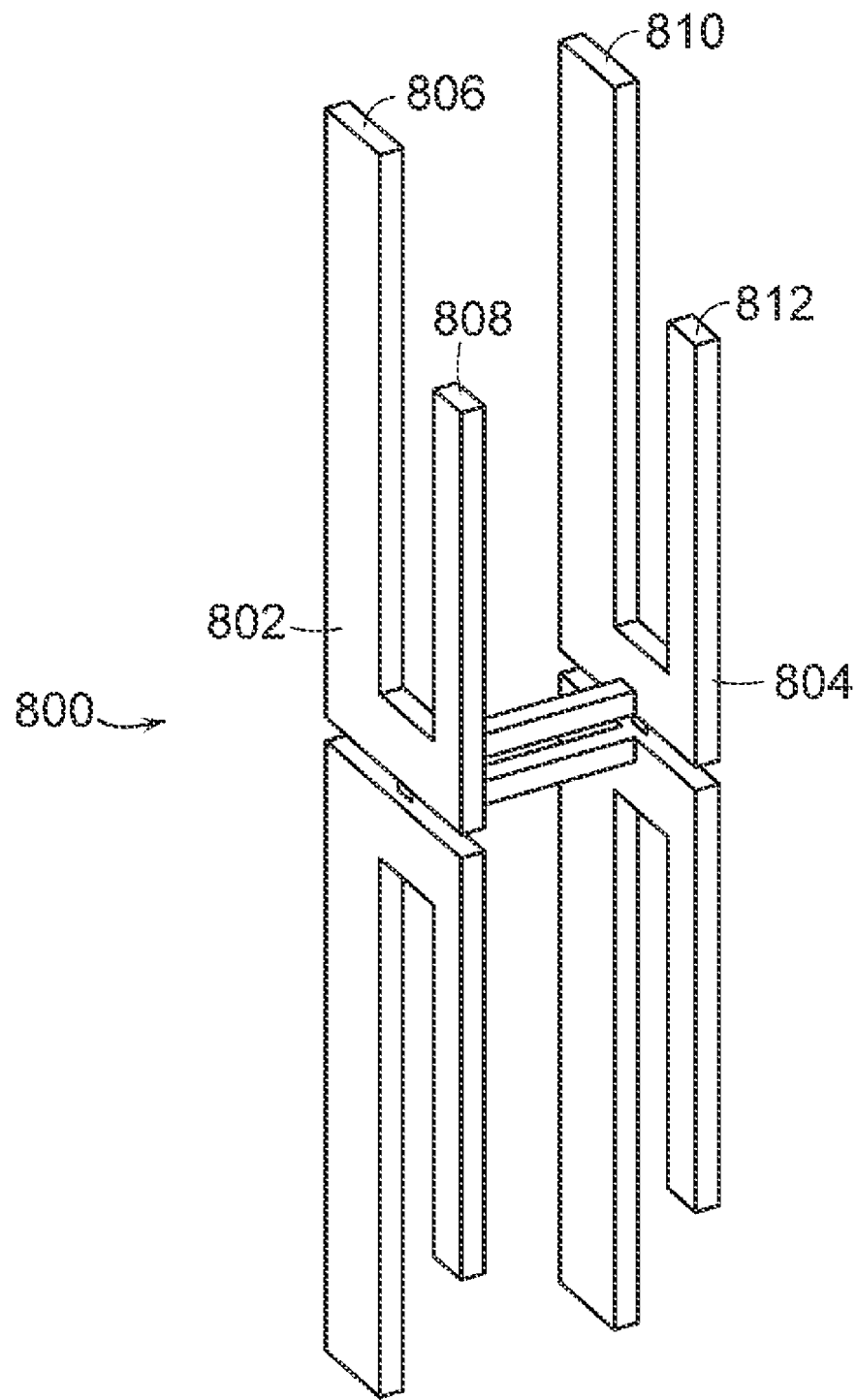
FIG. 8A illustrates an antenna structure having dual resonance in accordance with one or more embodiments of the invention.
Figure 8B:
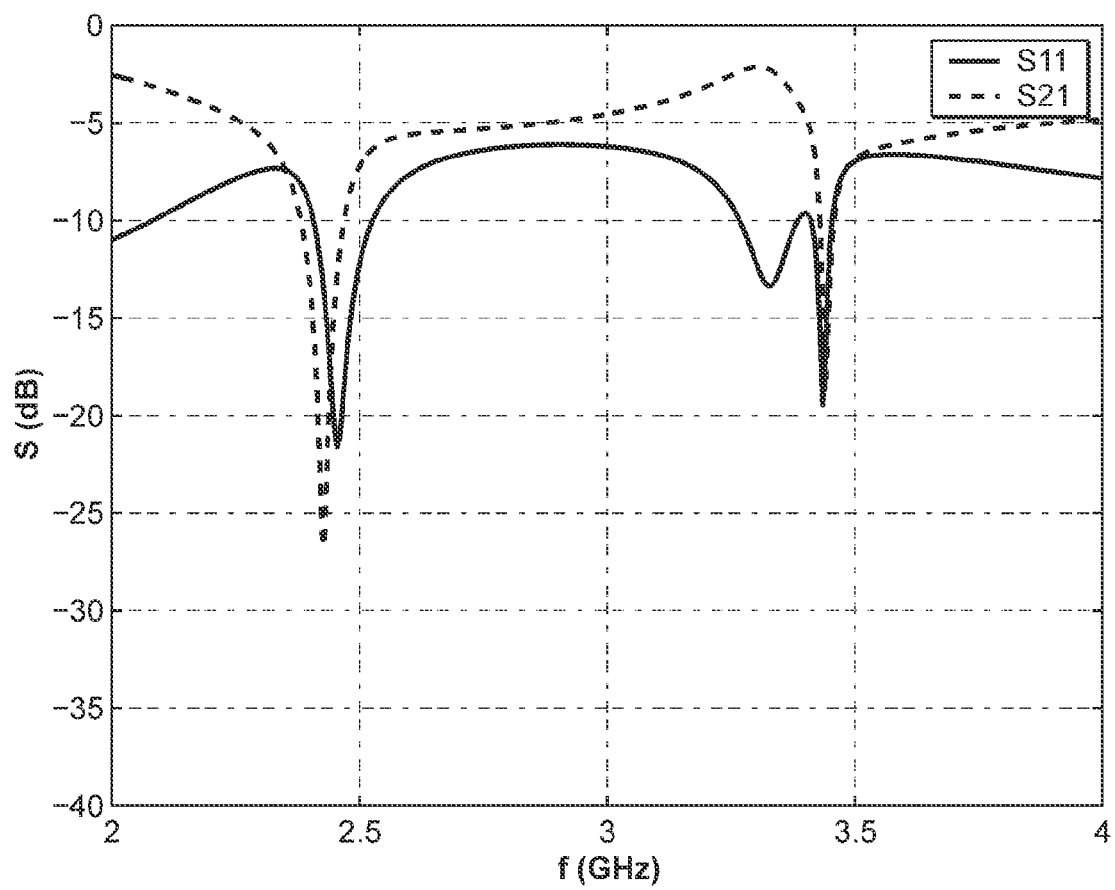
FIG. 8B is a graph illustrating scattering parameters for the FIG. 8A antenna structure.

In accordance with one or more embodiments of the invention, antenna elements with dual resonant frequencies can be used to produce a combined antenna structure with dual resonant frequencies and hence dual operating frequencies. FIG. 8A shows an exemplary model of a multimode dipole structure 800 where the dipole antenna elements 802, 804 are split into two fingers 806, 808 and 810, 812, respectively, of unequal length. The dipole antenna elements have resonant frequencies associated with each the two different finger lengths and accordingly exhibit a dual resonance. Similarly, the multimode antenna structure using dual-resonant dipole arms exhibits two frequency bands where high isolation (or small S21) is obtained as shown in FIG. 8B.

Figure 9:
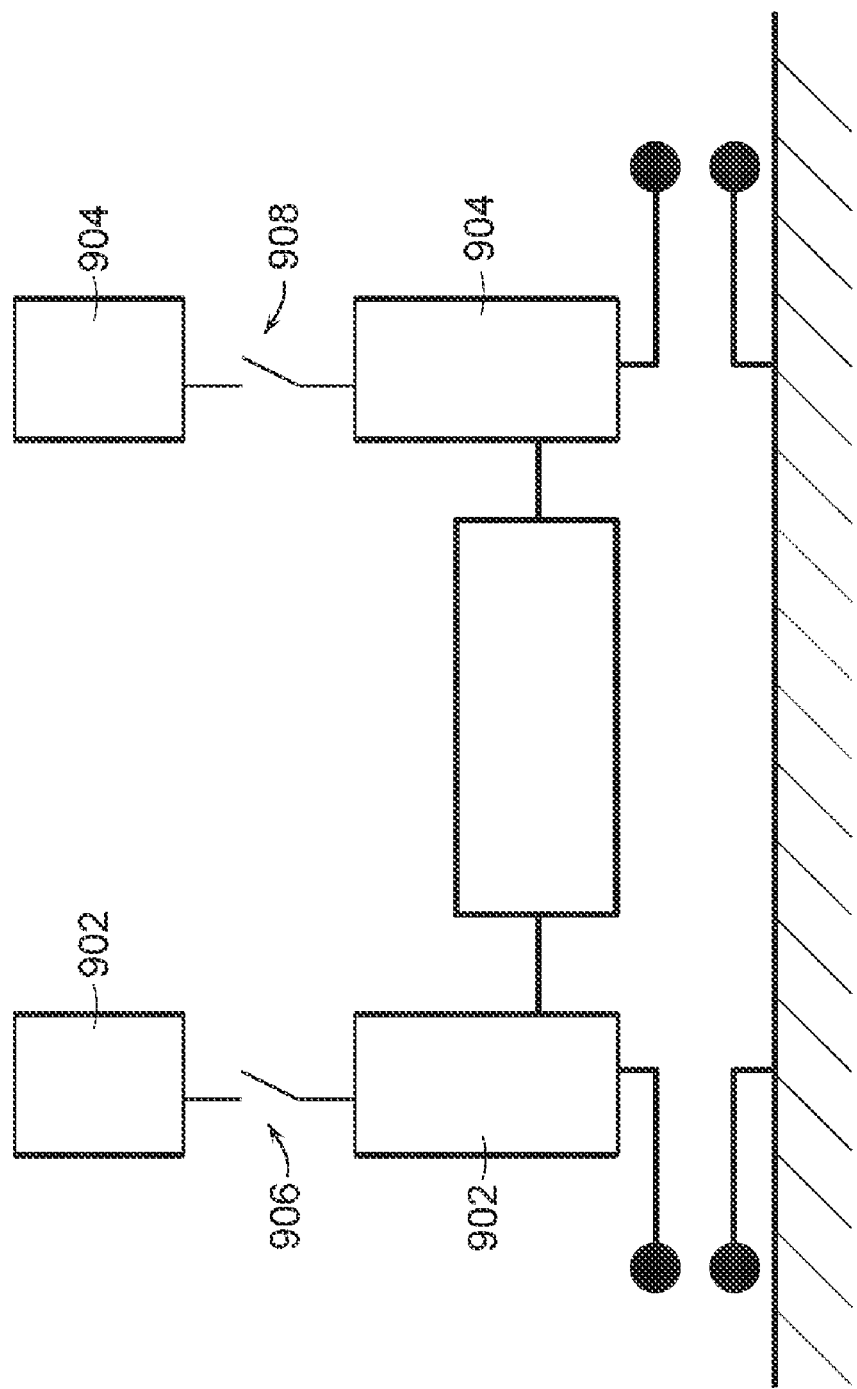
FIG. 9 illustrates a tunable antenna structure in accordance with one or more embodiments of the invention.

In accordance with one or more embodiments of the invention, a multimode antenna structure 900 shown in FIG. 9 is provided having variable length antenna elements 902, 904 forming a tunable antenna. This may be done by changing the effective electrical length of the antenna elements by a controllable device such as an RF switch 906, 908 at each antenna element 902, 904. In this example, the switch may be opened (by operating the controllable device) to create a shorter electrical length (for higher frequency operation) or closed to create a longer electrical length (for lower frequency of operation). The operating frequency band for the antenna structure 900, including the feature of high isolation, can be tuned by tuning both antenna elements in concert. This approach may be used with a variety of methods of changing the effective electrical length of the antenna elements including, e.g., using a controllable dielectric material, loading the antenna elements with a variable capacitor such as a MEMs device, varactor, or tunable dielectric capacitor, and switching on or off parasitic elements.

In accordance with one or more embodiments of the invention, the connecting element or elements provide an electrical connection between the antenna elements with an electrical length approximately equal to the electrical distance between the elements. Under this condition, and when the connecting elements are attached at the port ends of the antenna elements, the ports are isolated at a frequency near the resonance frequency of the antenna elements. This arrangement can produce nearly perfect isolation at particular frequency.

Alternately, as previously discussed, the electrical length of the connecting element may be increased to expand the bandwidth over which isolation exceeds a particular value. For example, a straight connection between antenna elements may produce a minimum S21 of −25 dB at a particular frequency and the bandwidth for which S21<−10 dB may be 100 MHz. By increasing the electrical length, a new response can be obtained where the minimum S21 is increased to −15 dB but the bandwidth for which S21<−10 dB may be increased to 150 MHz.

Various other multimode antenna structures in accordance with one or more embodiments of the invention are possible. For example, the connecting element can have a varied geometry or can be constructed to include components to vary the properties of the antenna structure. These components can include, e.g., passive inductor and capacitor elements, resonator or filter structures, or active components such as phase shifters.

Figure 10A:
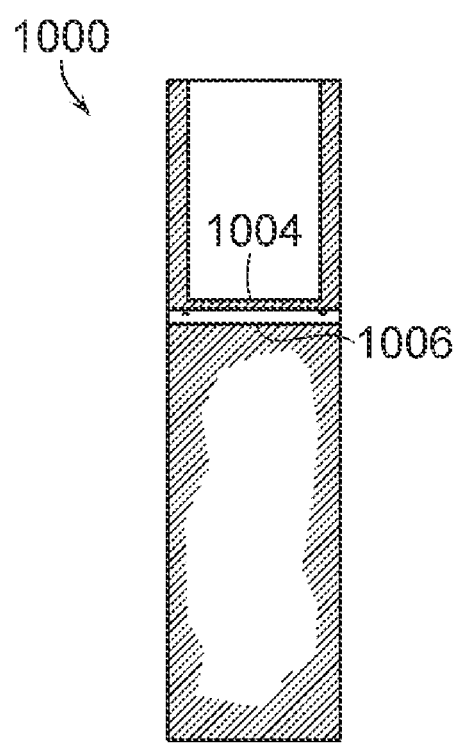
FIGS. 10A and 10B illustrate antenna structures having connecting elements positioned at different locations along the length of the antenna elements in accordance with one or more embodiments of the invention.
Figure 10B:
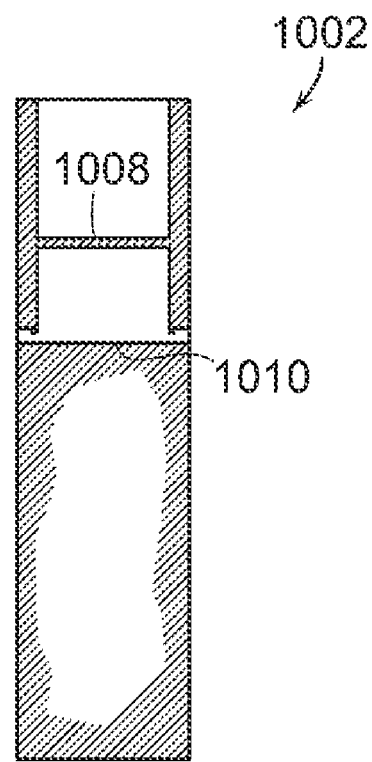
Figure 10C:
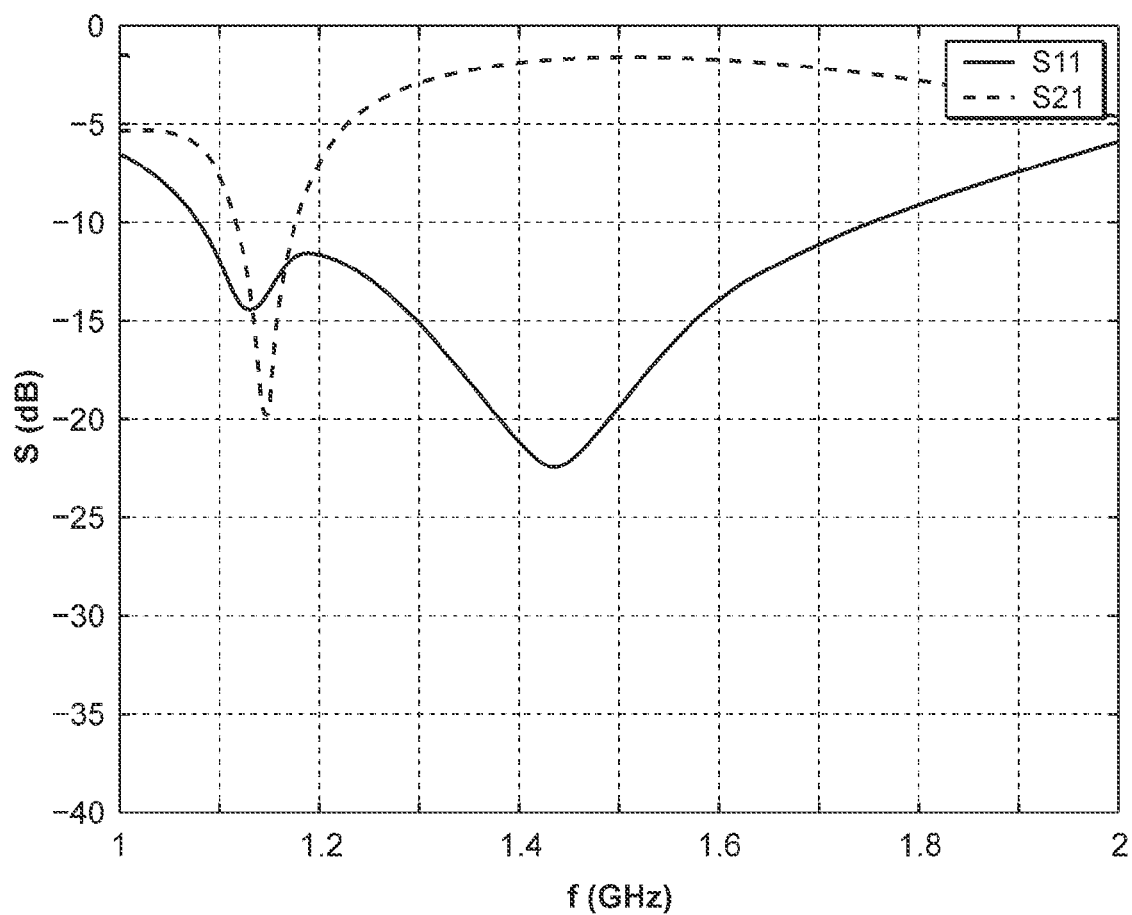
FIGS. 10C and 10D are graphs illustrating scattering parameters for the FIGS. 10A and 10B antenna structures, respectively.
Figure 10D:
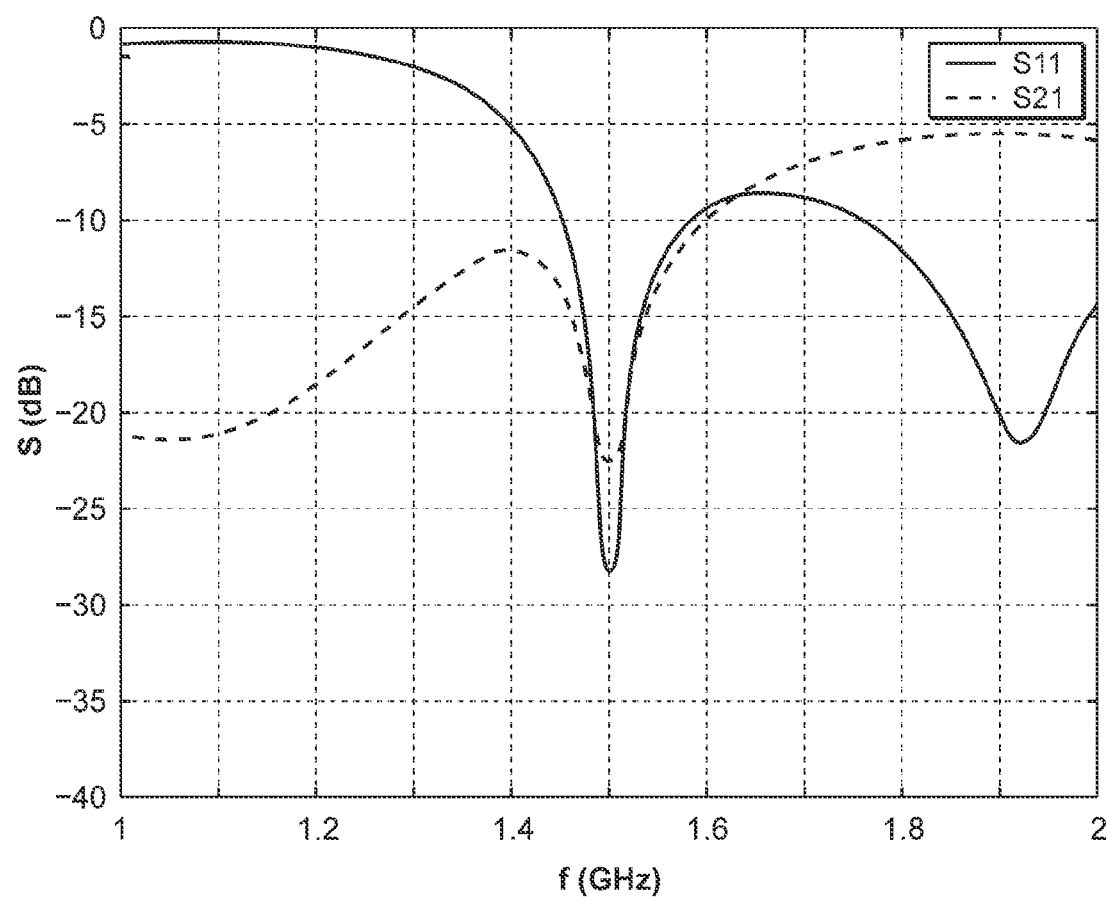

In accordance with one or more embodiments of the invention, the position of the connecting element along the length of the antenna elements can be varied to adjust the properties of the antenna structure. The frequency band over which the ports are isolated can be shifted upward in frequency by moving the point of attachment of the connecting element on the antenna elements away from the ports and towards the distal end of the antenna elements. FIGS. 10A and 10B illustrate multimode antenna structures 1000, 1002, respectively, each having a connecting element electrically connected to the antenna elements. In the FIG. 10A antenna structure 1000, the connecting element 1004 is located in the structure such the gap between the connecting element 1004 and the top edge of the ground plane 1006 is 3 mm. FIG. 10C shows the scattering parameters for the structure showing that high isolation is obtained at a frequency of 1.15 GHz in this configuration. A shunt capacitor/series inductor matching network is used to provide the impedance match at 1.15 GHz. FIG. 10D shows the scattering parameters for the structure 1002 of FIG. 10B, where the gap between the connecting element 1008 and the top edge 1010 of the ground plane is 19 mm. The antenna structure 1002 of FIG. 10B exhibits an operating band with high isolation at approximately 1.50 GHz.

FIG. 11 schematically illustrates a multimode antenna structure 1100 in accordance with one or more further embodiments of the invention. The antenna structure 1100 includes two or more connecting elements 1102, 1104, each of which electrically connects the antenna elements 1106, 1108. (For ease of illustration, only two connecting elements are shown in the figure. It should be understood that use of more than two connecting elements is also contemplated.)

The connecting elements 1102, 1104 are spaced apart from each other along the antenna elements 1106, 1108. Each of the connecting elements 1102, 1104 includes a switch 1112, 1110. Peak isolation frequencies can be selected by controlling the switches 1110, 1112. For example, a frequency f1 can be selected by closing switch 1110 and opening switch 1112. A different frequency f2 can be selected by closing switch 1112 and opening switch 1110.

FIG. 12 illustrates a multimode antenna structure 1200 in accordance with one or more alternate embodiments of the invention. The antenna structure 1200 includes a connecting element 1202 having a filter 1204 operatively coupled thereto. The filter 1204 can be a low pass or band pass filter selected such that the connecting element connection between the antenna elements 1206, 1208 is only effective within the desired frequency band, such as the high isolation resonance frequency. At higher frequencies, the structure will function as two separate antenna elements that are not coupled by the electrically conductive connecting element, which is open circuited.

FIG. 13 illustrates a multimode antenna structure 1300 in accordance with one or more alternate embodiments of the invention. The antenna structure 1300 includes two or more connecting elements 1302, 1304, which include filters 1306, 1308, respectively. (For ease of illustration, only two connecting elements are shown in the figure. It should be understood that use of more than two connecting elements is also contemplated.) In one possible embodiment, the antenna structure 1300 has a low pass filter 1308 on the connecting element 1304 (which is closer to the antenna ports) and a high pass filter 1306 on the connecting element 1302 in order to create an antenna structure with two frequency bands of high isolation, i.e., a dual band structure.

FIG. 14 illustrates a multimode antenna structure 1400 in accordance with one or more alternate embodiments of the invention. The antenna structure 1400 includes one or more connecting elements 1402 having a tunable element 1406 operatively connected thereto. The antenna structure 1400 also includes antenna elements 1408, 1410. The tunable element 1406 alters the delay or phase of the electrical connection or changes the reactive impedance of the electrical connection. The magnitude of the scattering parameters S21/S12 and a frequency response are affected by the change in electrical delay or impedance and so an antenna structure can be adapted or generally optimized for isolation at specific frequencies using the tunable element 1406.

Figure 15:
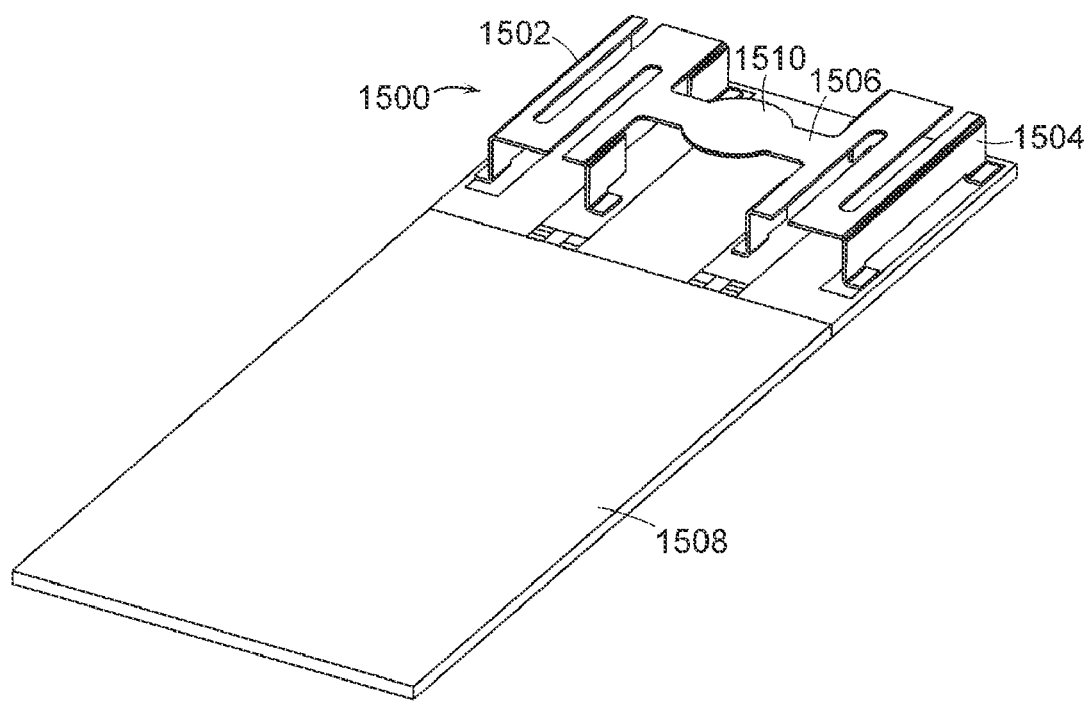
FIG. 15 illustrates an antenna structure mounted on a PCB assembly in accordance with one or more embodiments of the invention.

FIG. 15 illustrates a multimode antenna structure 1500 in accordance with one or more alternate embodiments of the invention. The multimode antenna structure 1500 can be used, e.g., in a WIMAX USB dongle. The antenna structure 1500 can be configured for operation, e.g., in WiMAX bands from 2300 to 2700 MHz.

The antenna structure 1500 includes two antenna elements 1502, 1504 connected by a conductive connecting element 1506. The antenna elements include slots to increase the electrical length of the elements to obtain the desired operating frequency range. In this example, the antenna structure is optimized for a center frequency of 2350 MHz. The length of the slots can be reduced to obtain higher center frequencies. The antenna structure is mounted on a printed circuit board assembly 1508. A two-component lumped element match is provided at each antenna feed.

The antenna structure 1500 can be manufactured, e.g., by metal stamping. It can be made, e.g., from 0.2 mm thick copper alloy sheet. The antenna structure 1500 includes a pickup feature 1510 on the connecting element at the center of mass of the structure, which can be used in an automated pick-and-place assembly process. The antenna structure is also compatible with surface-mount reflow assembly.

Figure 16:
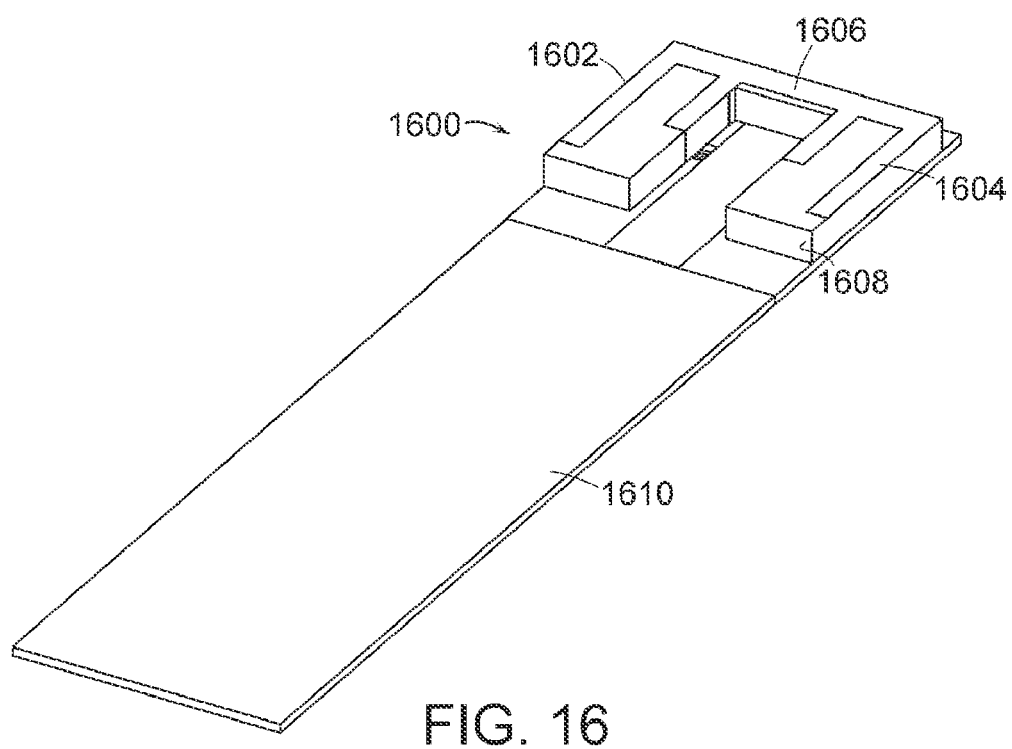
FIG. 16 illustrates another antenna structure mounted on a PCB assembly in accordance with one or more embodiments of the invention.

FIG. 16 illustrates a multimode antenna structure 1600 in accordance with one or more alternate embodiments of the invention. As with antenna structure 1500 of FIG. 15, the antenna structure 1600 can also be used, e.g., in a WIMAX USB dongle. The antenna structure can be configured for operation, e.g., in WiMAX bands from 2300 to 2700 MHz.

The antenna structure 1600 includes two antenna elements 1602, 1604, each comprising a meandered monopole. The length of the meander determines the center frequency. The exemplary design shown in the figure is optimized for a center frequency of 2350 MHz. To obtain higher center frequencies, the length of the meander can be reduced.

A connecting element 1606 electrically connects the antenna elements. A two-component lumped element match is provided at each antenna feed.

The antenna structure can be fabricated, e.g., from copper as a flexible printed circuit (FPC) mounted on a plastic carrier 1608. The antenna structure can be created by the metalized portions of the FPC. The plastic carrier provides mechanical support and facilitates mounting to a PCB assembly 1610. Alternatively, the antenna structure can be formed from sheet-metal.

Figure 17:
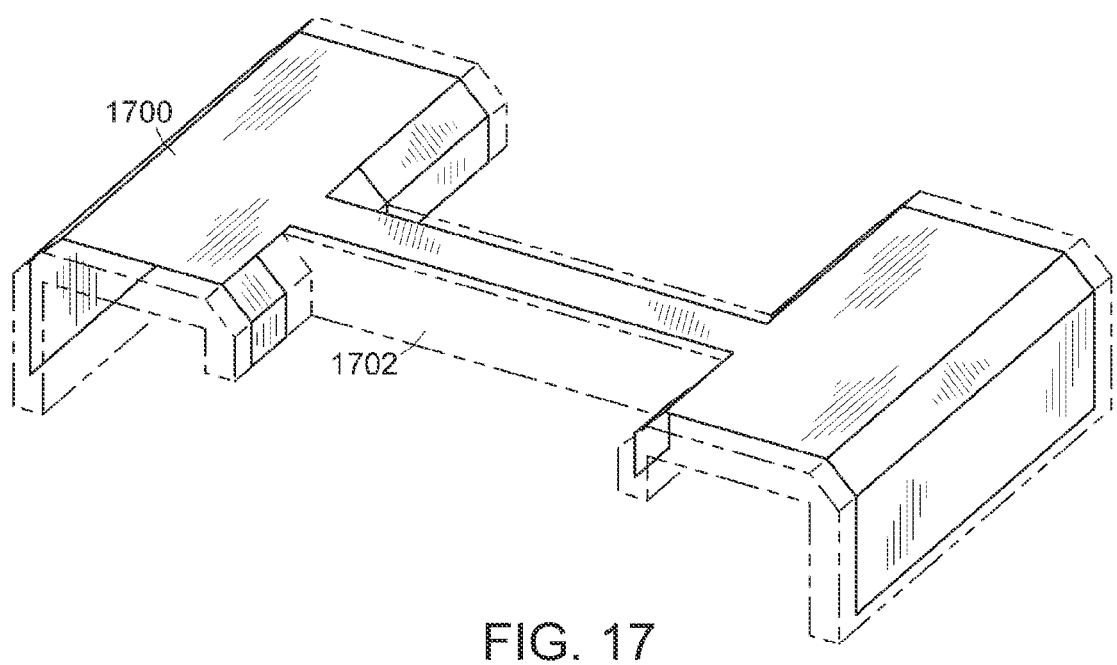
FIG. 17 illustrates an alternate antenna structure that can be mounted on a PCB assembly in accordance with one or more embodiments of the invention.

FIG. 17 illustrates a multimode antenna structure 1700 in accordance with another embodiment of the invention. This antenna design can be used, e.g., for USB, Express 34, and Express 54 data card formats. The exemplary antenna structure shown in the figure is designed to operate at frequencies from 2.3 to 6 GHz. The antenna structure can be fabricated, e.g., from sheet-metal or by FPC over a plastic carrier 1702.

Figure 18A:
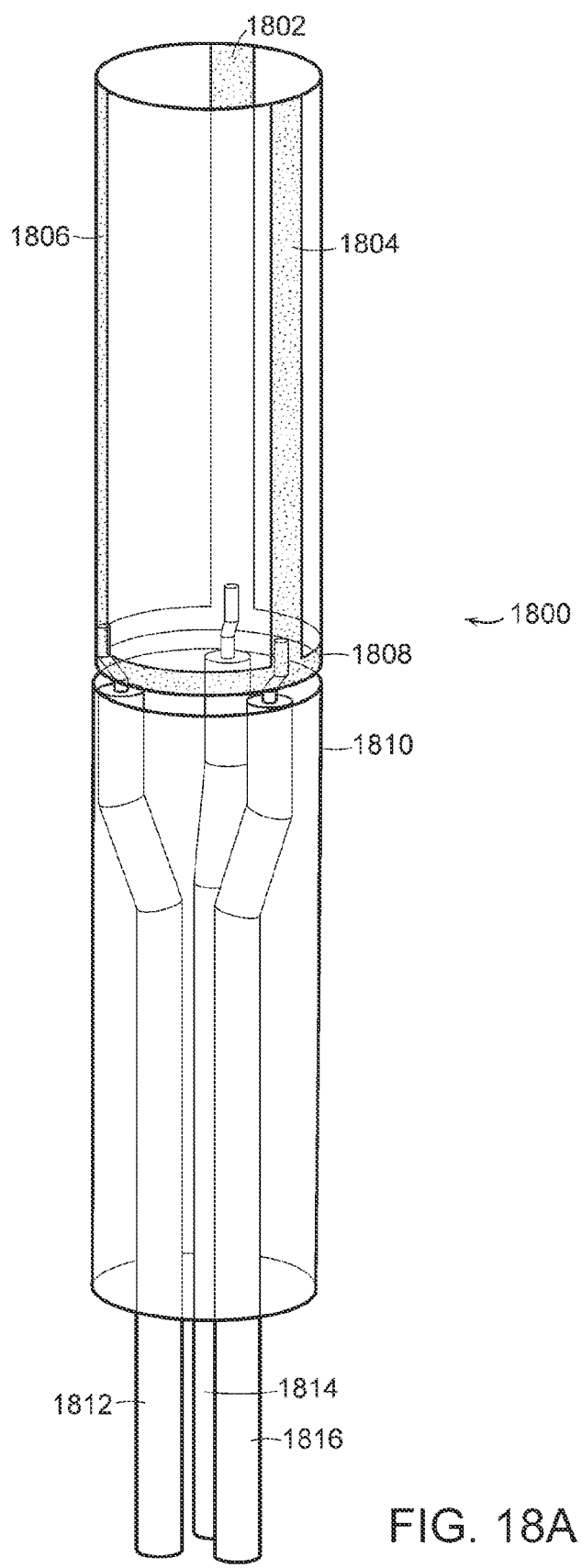
FIG. 18A illustrates a three mode antenna structure in accordance with one or more embodiments of the invention.
Figure 18B:
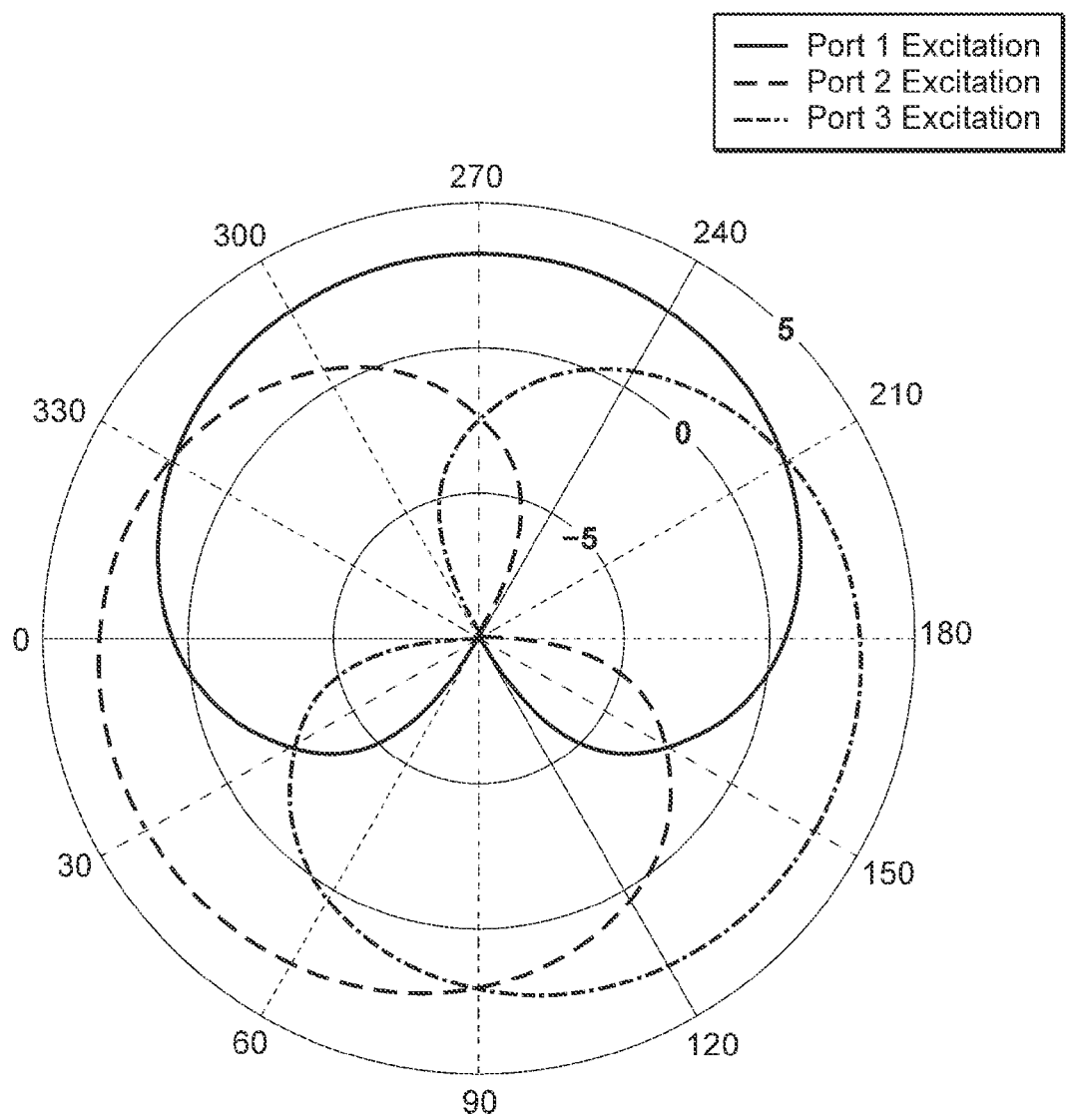
FIG. 18B is a graph illustrating the gain patterns for the FIG. 18A antenna structure.

FIG. 18A illustrates a multimode antenna structure 1800 in accordance with another embodiment of the invention. The antenna structure 1800 comprises a three mode antenna with three ports. In this structure, three monopole antenna elements 1802, 1804, 1806 are connected using a connecting element 1808 comprising a conductive ring that connects neighboring antenna elements. The antenna elements are balanced by a common counterpoise, or sleeve 1810, which is a single hollow conductive cylinder. The antenna has three coaxial cables 1812, 1814, 1816 for connection of the antenna structure to a communications device. The coaxial cables 1812, 1814, 1816 pass through the hollow interior of the sleeve 1810. The antenna assembly may be constructed from a single flexible printed circuit wrapped into a cylinder and may be packaged in a cylindrical plastic enclosure to provide a single antenna assembly that takes the place of three separate antennas. In one exemplary arrangement, the diameter of the cylinder is 10 mm and the overall length of the antenna is 56 mm so as to operate with high isolation between ports at 2.45 GHz. This antenna structure can be used, e.g., with multiple antenna radio systems such as MIMO or 802.11N systems operating in the 2.4 to 2.5 GHz bands. In addition to port to port isolation, each port advantageously produces a different gain pattern as shown on FIG. 18B. While this is one specific example, it is understood that this structure can be scaled to operate at any desired frequency. It is also understood that methods for tuning, manipulating bandwidth, and creating multiband structures described previously in the context of two-port antennas can also apply to this multiport structure.

While the above embodiment is shown as a true cylinder, it is possible to use other arrangements of three antenna elements and connecting elements that produce the same advantages. This includes, but is not limited to, arrangements with straight connections such that the connecting elements form a triangle, or another polygonal geometry. It is also possible to construct a similar structure by similarly connecting three separate dipole elements instead of three monopole elements with a common counterpoise. Also, while symmetric arrangement of antenna elements advantageously produces equivalent performance from each port, e.g., same bandwidth, isolation, impedance matching, it is also possible to arrange the antenna elements asymmetrically or with unequal spacing depending on the application.

Figure 19:
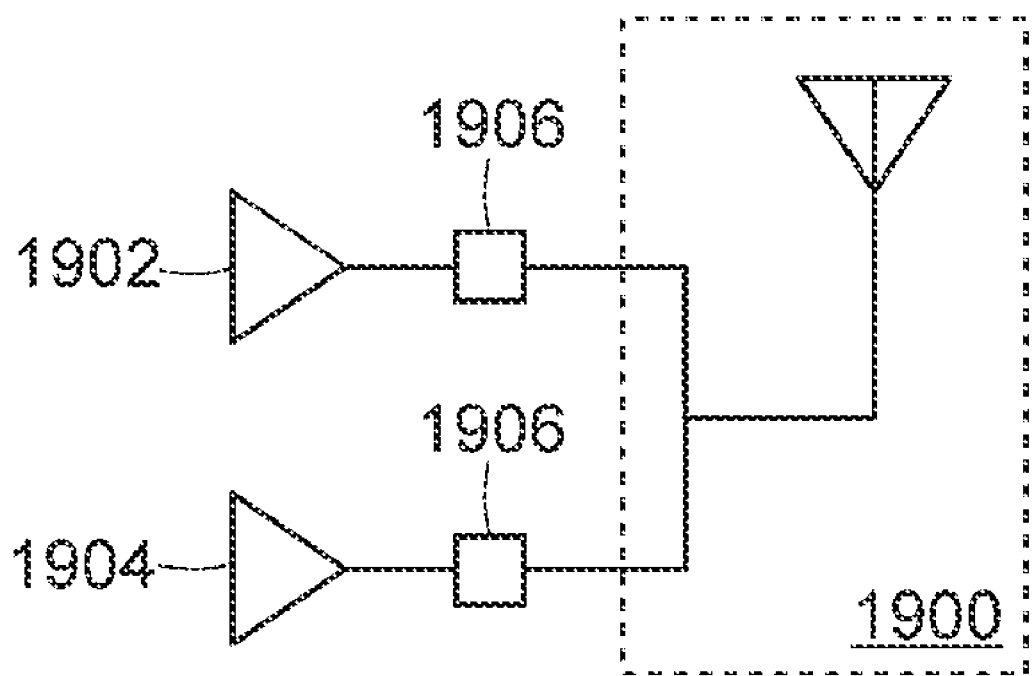
FIG. 19 illustrates an antenna and power amplifier combiner application for an antenna structure in accordance with one or more embodiments of the invention.

FIG. 19 illustrates use of a multimode antenna structure 1900 in a combiner application in accordance with one or more embodiments of the invention. As shown in the figure, transmit signals may be applied to both antenna ports of the antenna structure 1900 simultaneously. In this configuration, the multimode antenna can serve as both antenna and power amplifier combiner. The high isolation between antenna ports restricts interaction between the two amplifiers 1902, 1904, which is known to have undesirable effects such as signal distortion and loss of efficiency. Optional impedance matching at 1906 can be provided at the antenna ports.

Figure 20A:
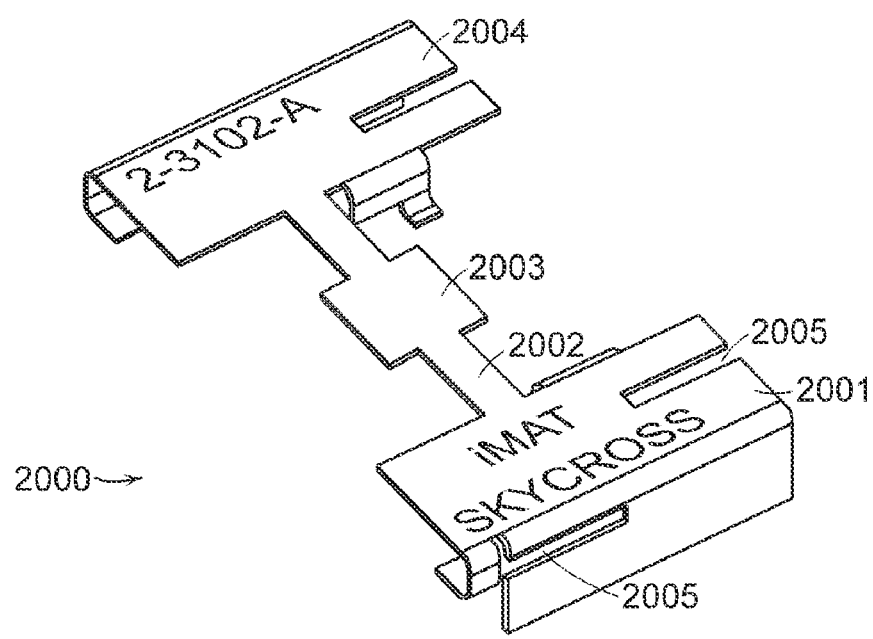
FIGS. 20A and 20B illustrate a multimode antenna structure useable, e.g., in a WiMAX USB or ExpressCard/34 device in accordance with one or more further embodiments of the invention.
Figure 20B:
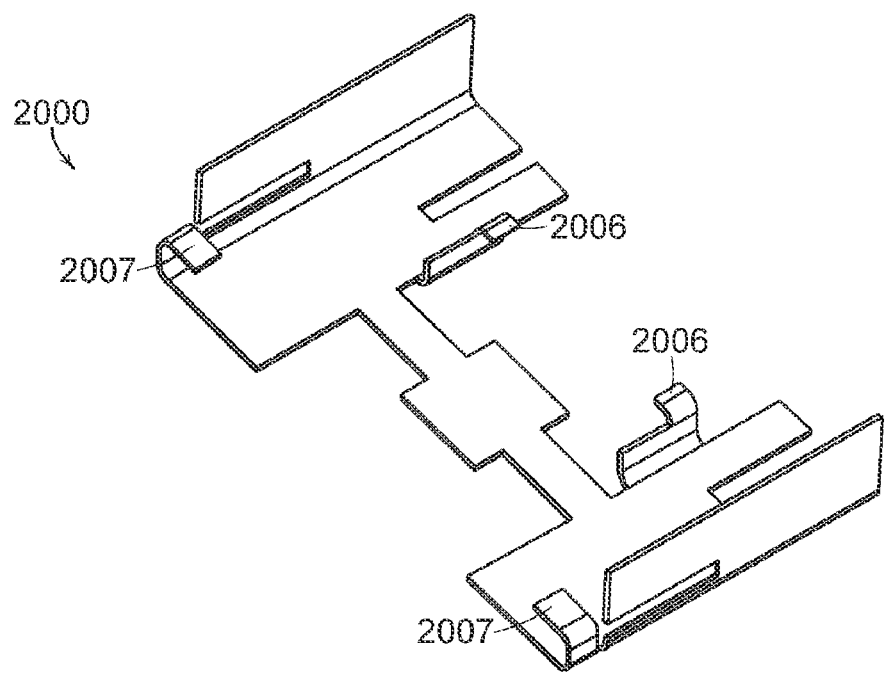

FIGS. 20A and 20B illustrate a multimode antenna structure 2000 in accordance with one or more alternate embodiments of the invention. The antenna structure 2000 can also be used, e.g., in a WiMAX USB or ExpressCard/34 device. The antenna structure can be configured for operation, e.g., in WiMAX bands from 2300 to 6000 MHz.

The antenna structure 2000 includes two antenna elements 2001, 2004, each comprising a broad monopole. A connecting element 2002 electrically connects the antenna elements. Slots (or other cut-outs) 2005 are used to improve the input impedance match above 5000 MHz. The exemplary design shown in the figure is optimized to cover frequencies from 2300 to 6000 MHz.

The antenna structure 2000 can be manufactured, e.g., by metal stamping. It can be made, e.g., from 0.2 mm thick copper alloy sheet. The antenna structure 2000 includes a pickup feature 2003 on the connecting element 2002 generally at the center of mass of the structure, which can be used in an automated pick-and-place assembly process. The antenna structure is also compatible with surface-mount reflow assembly. Feed points 2006 of the antenna provide the points of connection to the radio circuitry on a PCB, and also serve as a support for structural mounting of the antenna to the PCB. Additional contact points 2007 provide structural support.

Figure 20C:
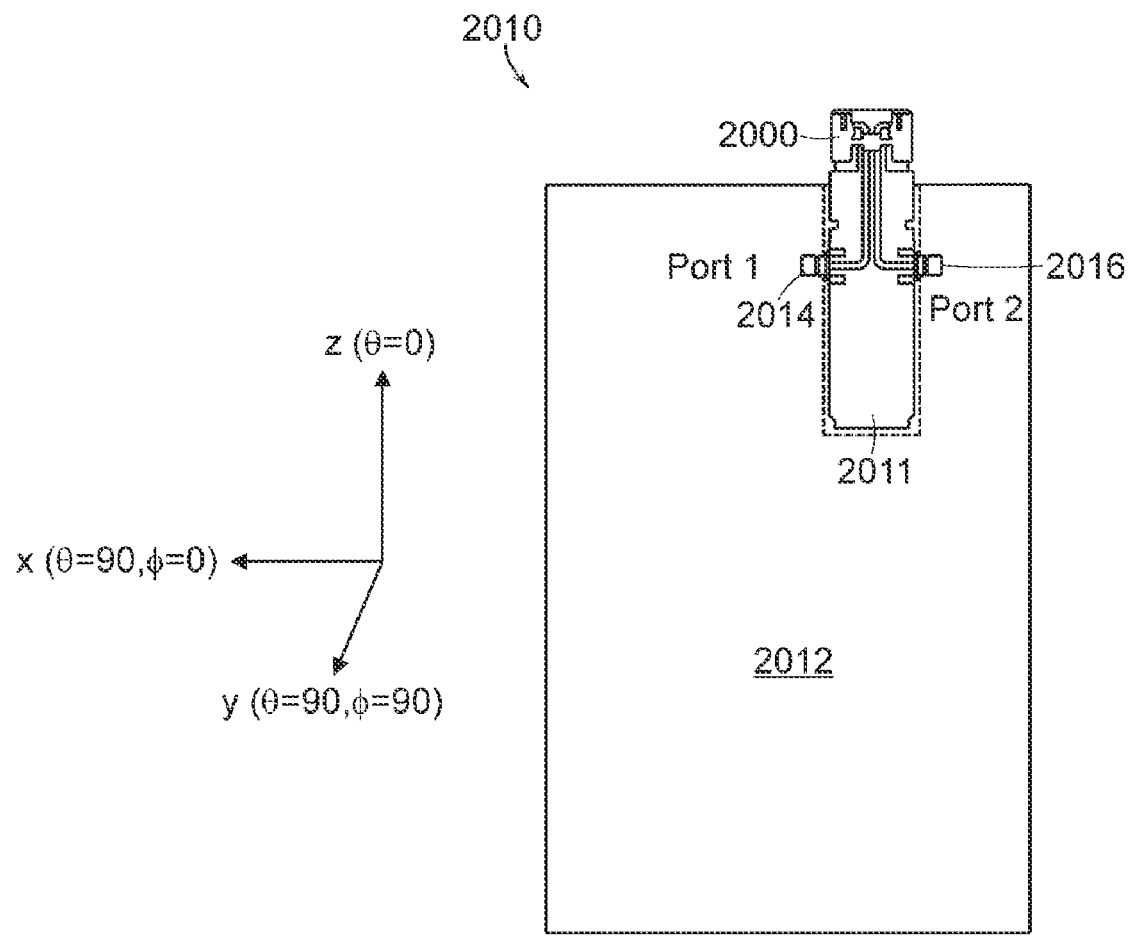
FIG. 20C illustrates a test assembly used to measure the performance of the antenna of FIGS. 20A and 20B.

FIG. 20C illustrates a test assembly 2010 used to measure the performance of antenna 2000. The figure also shows the coordinate reference for far-field patterns. Antenna 2000 is mounted on a 30×88 mm PCB 2011 representing an ExpressCard/34 device. The grounded portion of the PCB 2011 is attached to a larger metal sheet 2012 (having dimensions of 165×254 mm in this example) to represent a counterpoise size typical of a notebook computer. Test ports 2014, 2016 on the PCB 2011 are connected to the antenna through 50-ohm striplines.

Figure 20D:
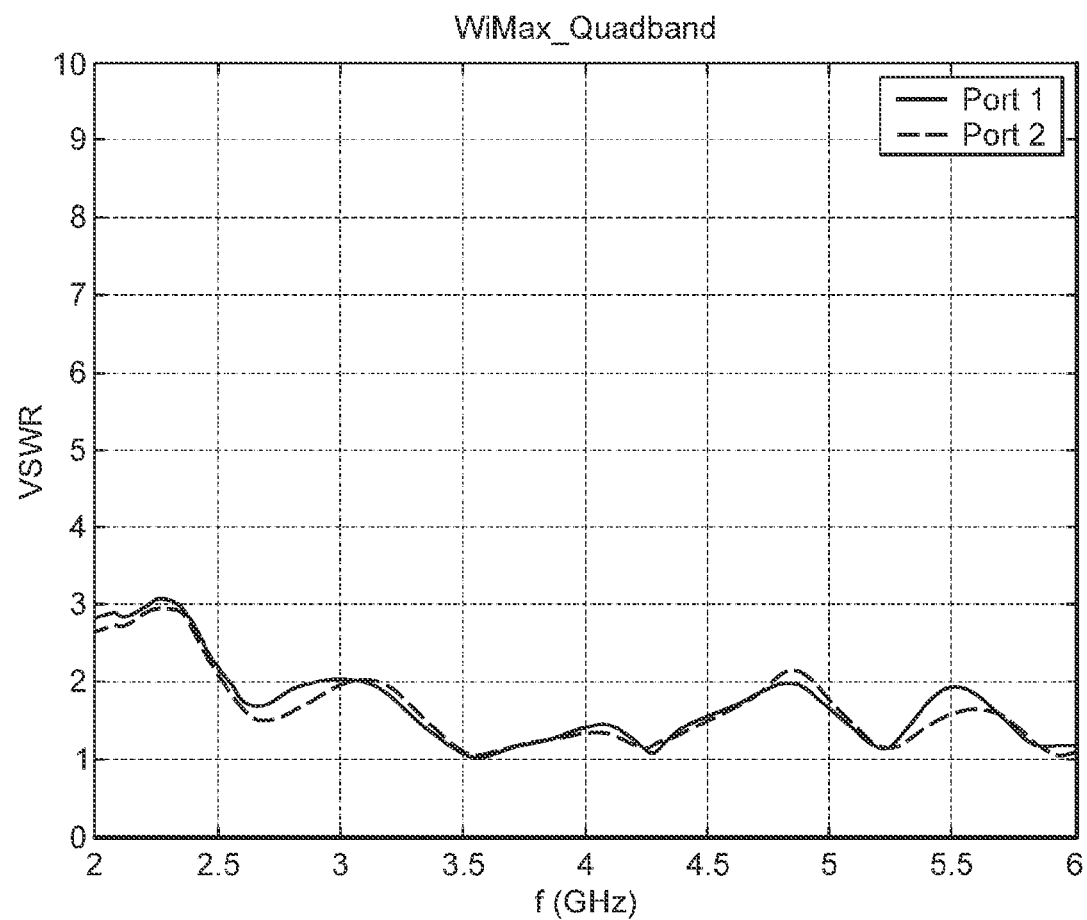
FIGS. 20D to 20J illustrate test measurement results for the antenna of FIGS. 20A and 20B.
Figure 20E:
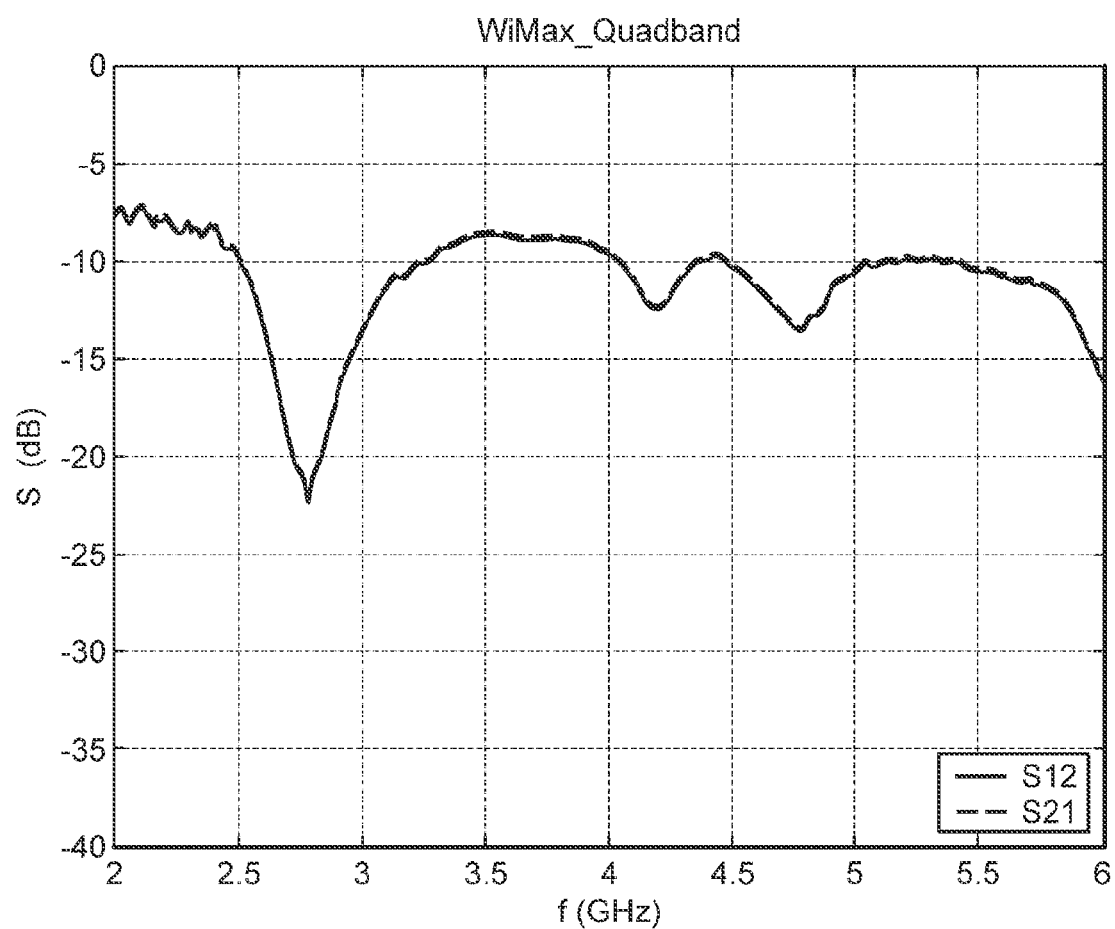
Figure 20F:
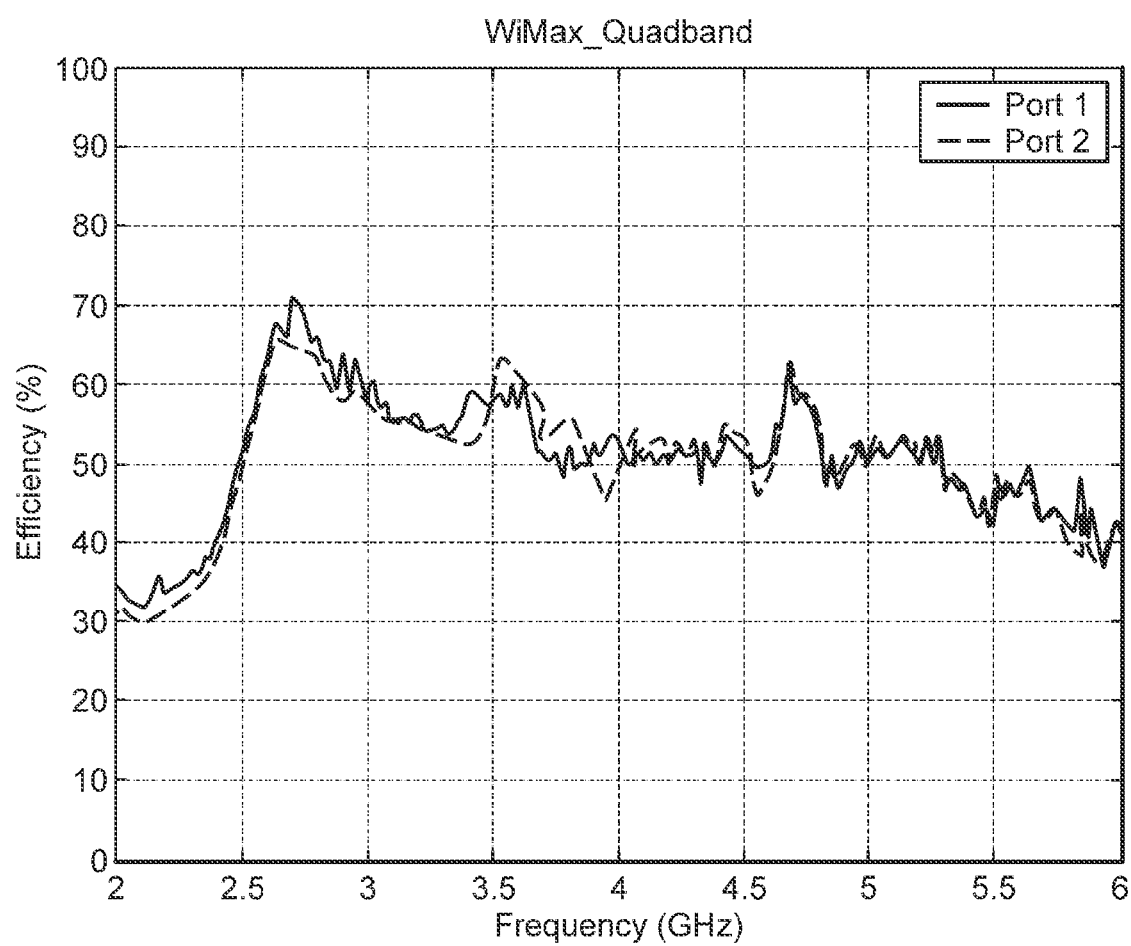
Figure 20G:
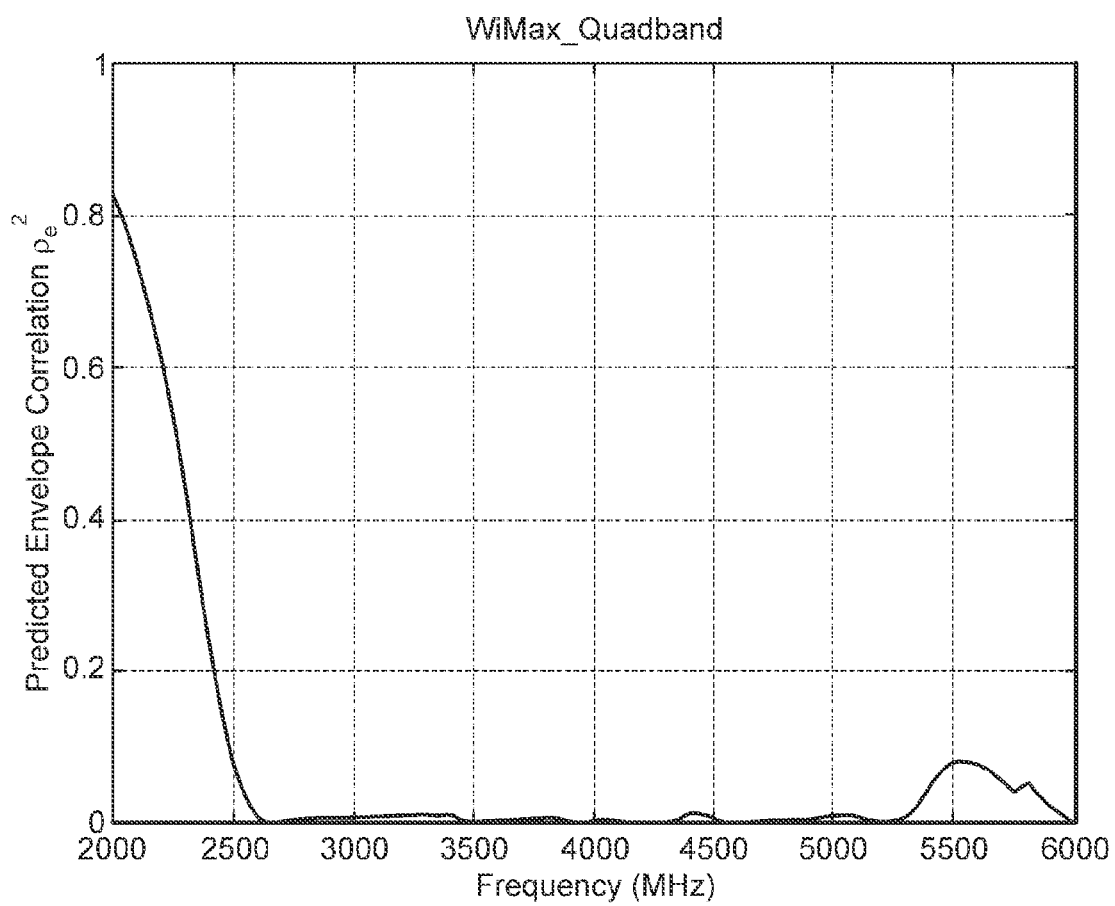
Figure 20H:
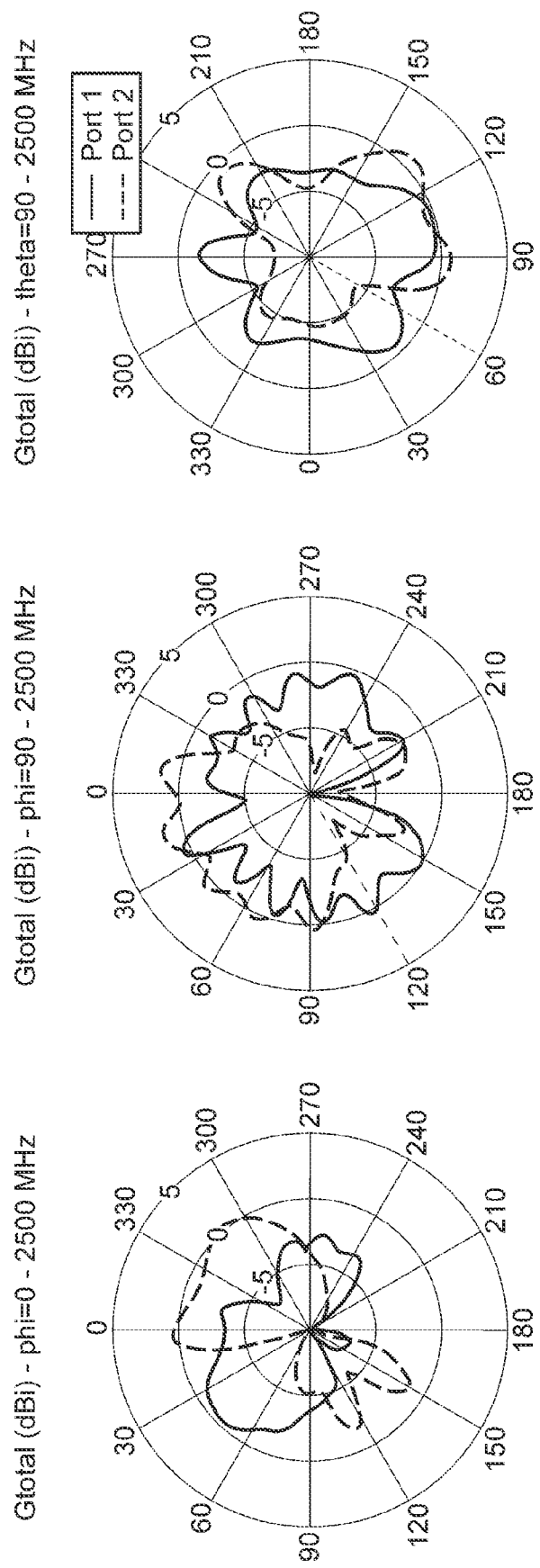
Figure 20I:
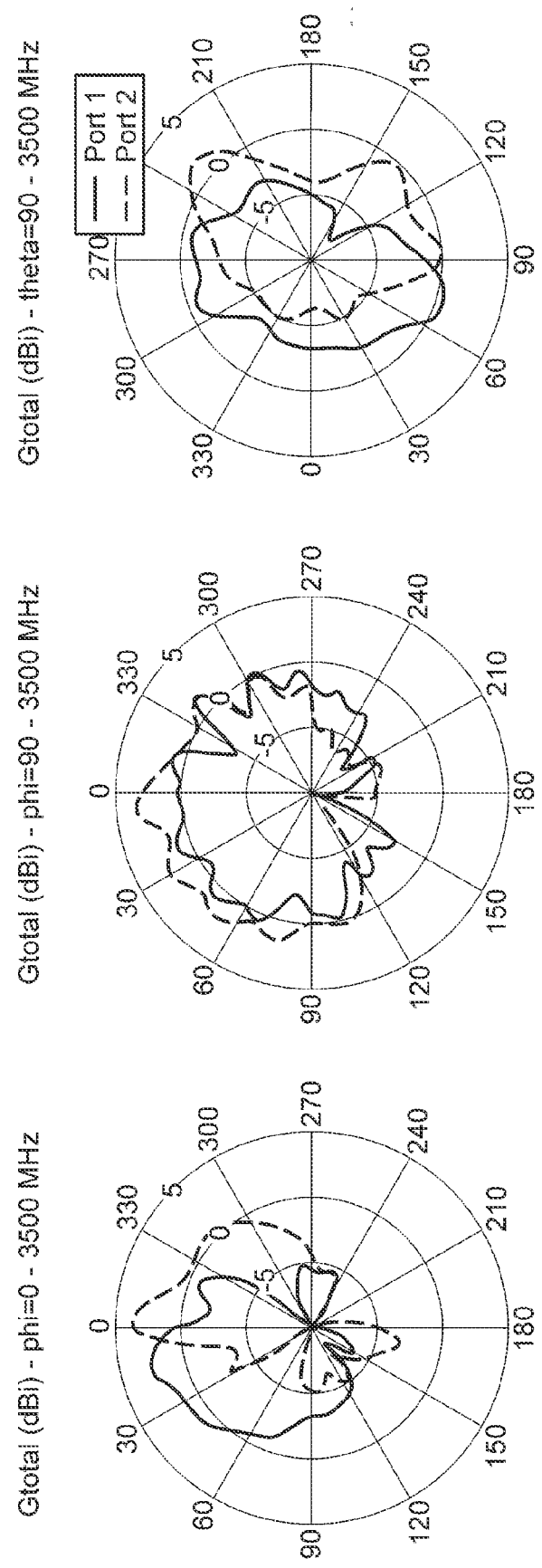
Figure 20J:
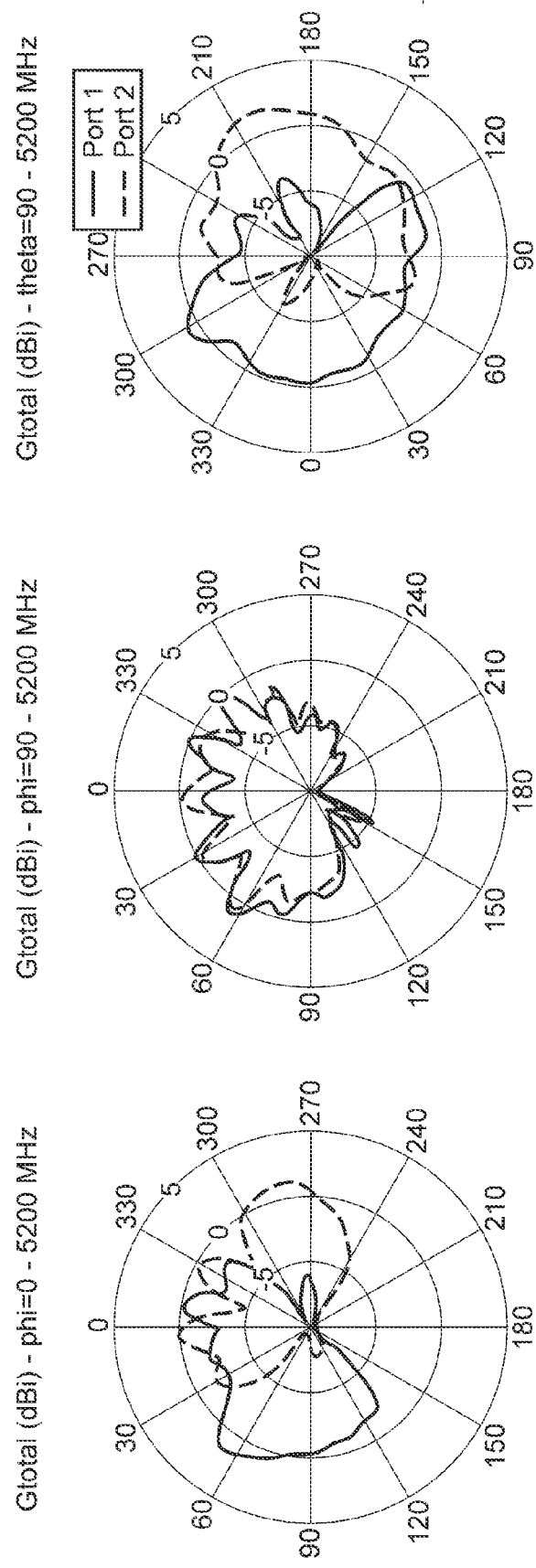

FIG. 20D shows the VSWR measured at test ports 2014, 2016. FIG. 20E shows the coupling (S21 or S12) measured between the test ports. The VSWR and coupling are advantageously low across the broad range of frequencies, e.g., 2300 to 6000 MHz. FIG. 20F shows the measured radiation efficiency referenced from the test ports 2014 (Port 1), 2016 (Port 2). FIG. 20G shows the calculated correlation between the radiation patterns produced by excitation of test port 2014 (Port 1) versus those produced by excitation of test port 2016 (Port 2). The radiation efficiency is advantageously high while the correlation between patterns is advantageously low at the frequencies of interest. FIG. 20H shows far field gain patterns by excitation of test port 2014 (Port 1) or test port 2016 (Port 2) at a frequency of 2500 MHz. FIGS. 20I and 20J show the same pattern measurements at frequencies of 3500 and 5200 MHz, respectively. The patterns resulting from test port 2014 (Port 1) are different and complementary to those of test port 2016 (Port 2) in the $\phi=0$ or XZ plane and in the $\theta=90$ or XY plane.

Figure 21A:
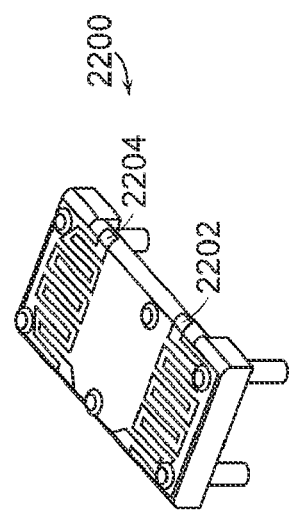
FIGS. 21A and 21B illustrate a multimode antenna structure useable, e.g., in a WiMAX USB dongle in accordance with one or more alternate embodiments of the invention.
Figure 21B:
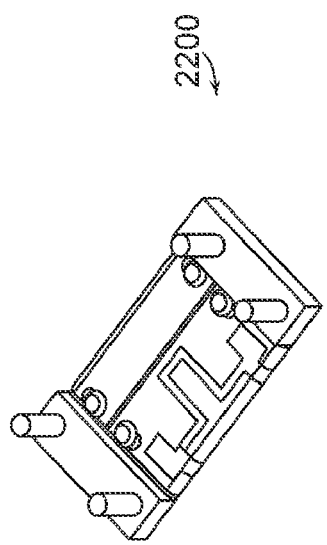

FIGS. 21A and 21B illustrate a multimode antenna structure 2100 in accordance with one or more alternate embodiments of the invention. The antenna structure 2100 can also be used, e.g., in a WiMAX USB dongle. The antenna structure can be configured for operation, e.g., in WiMAX bands from 2300 to 2400 MHz.

The antenna structure 2100 includes two antenna elements 2102, 2104, each comprising a meandered monopole. The length of the meander determines the center frequency. Other tortuous configurations such as, e.g., helical coils and loops, can also be used to provide a desired electrical length. The exemplary design shown in the figure is optimized for a center frequency of 2350 MHz. A connecting element 2106 (shown in FIG. 21B) electrically connects the antenna elements 2102, 2104. A two-component lumped element match is provided at each antenna feed.

The antenna structure can be fabricated, e.g., from copper as a flexible printed circuit (FPC) 2103 mounted on a plastic carrier 2101. The antenna structure can be created by the metalized portions of the FPC 2103. The plastic carrier 2101 provides mounting pins or pips 2107 for attaching the antenna to a PCB assembly (not shown) and pips 2105 for securing the FPC 2103 to the carrier 2101. The metalized portion of 2103 includes exposed portions or pads 2108 for electrically contacting the antenna to the circuitry on the PCB.

Figure 22A:
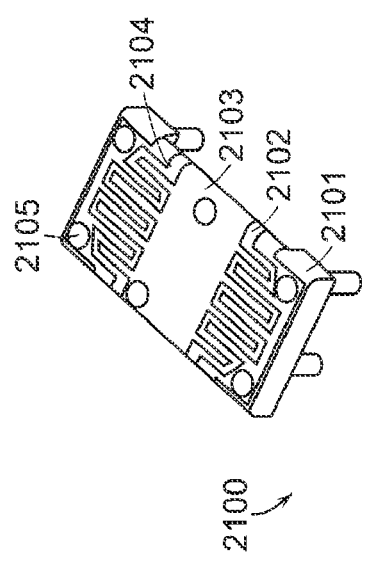
FIGS. 22A and 22B illustrate a multimode antenna structure useable, e.g., in a WiMAX USB dongle in accordance with one or more alternate embodiments of the invention.
Figure 22B:
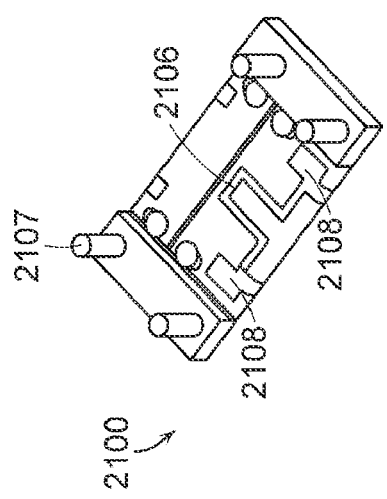

To obtain higher center frequencies, the electrical length of the elements 2102, 2104 can be reduced. FIGS. 22A and 22B illustrate a multimode antenna structure 2200, the design of which is optimized for a center frequency of 2600 MHz. The electrical length of the elements 2202, 2204 is shorter than that of elements 2102, 2104 of FIGS. 21A and 21B because metallization at the end of the elements 2202, 2204 has been removed, and the width of the of the elements at feed end has been increased.

Figure 23A:
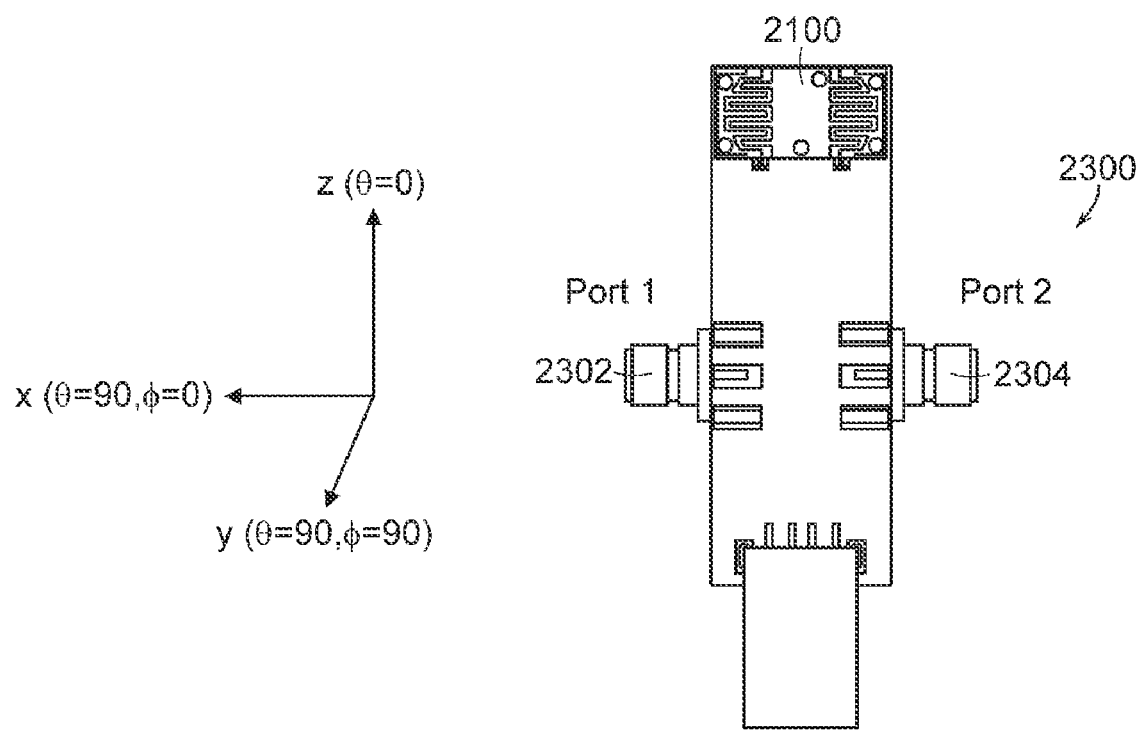
FIG. 23A illustrates a test assembly used to measure the performance of the antenna of FIGS. 21A and 21B.
Figure 23B:
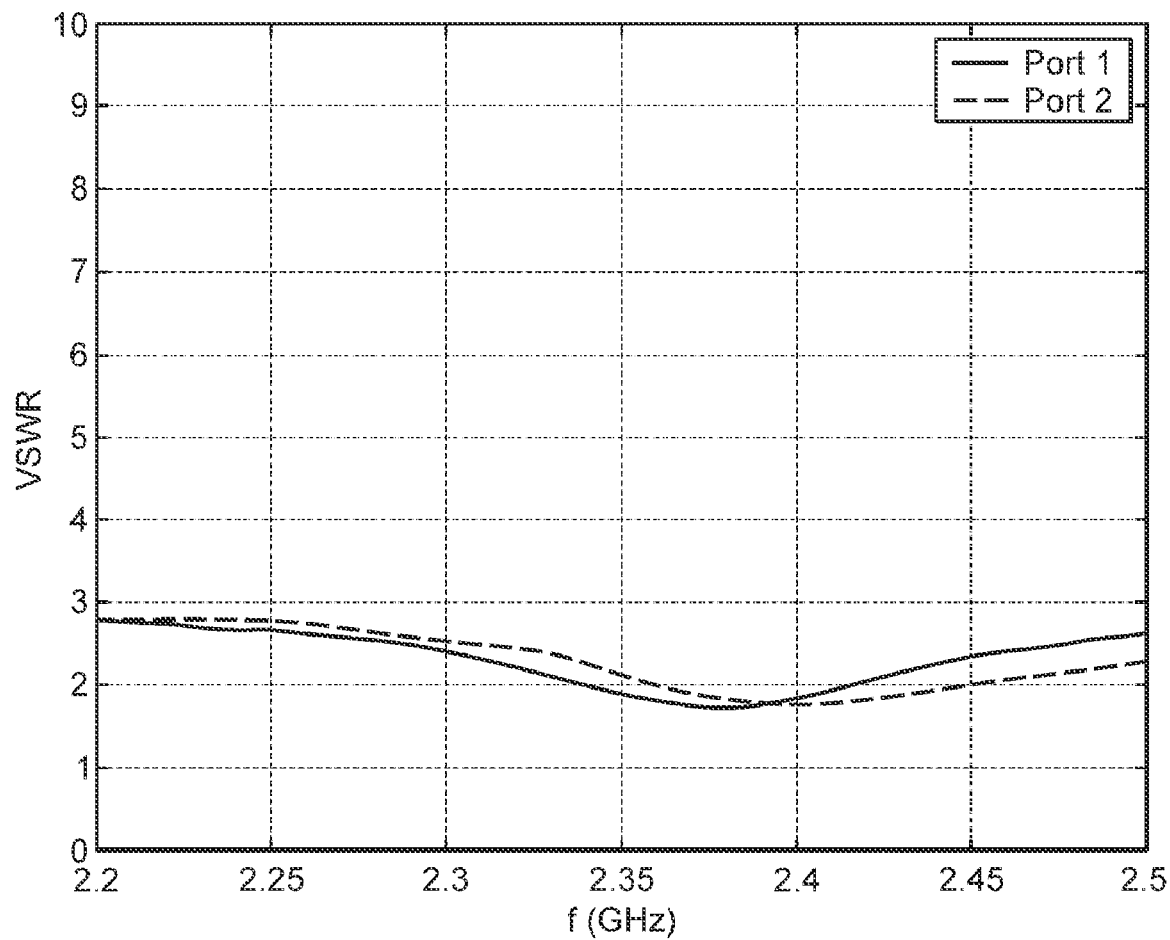
FIGS. 23B to 23K illustrate test measurement results for the antenna of FIGS. 21A and 21B.
Figure 23C:
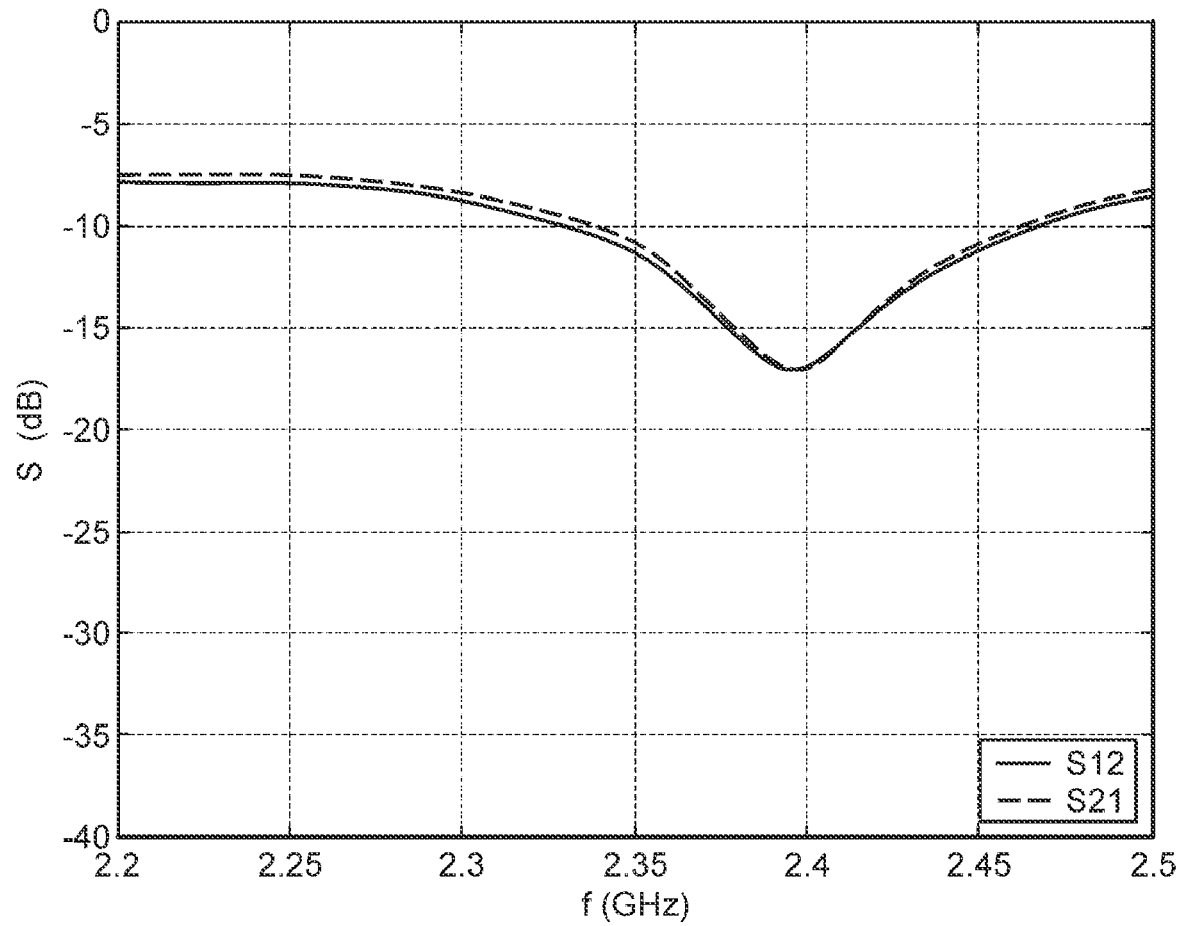
Figure 23D:
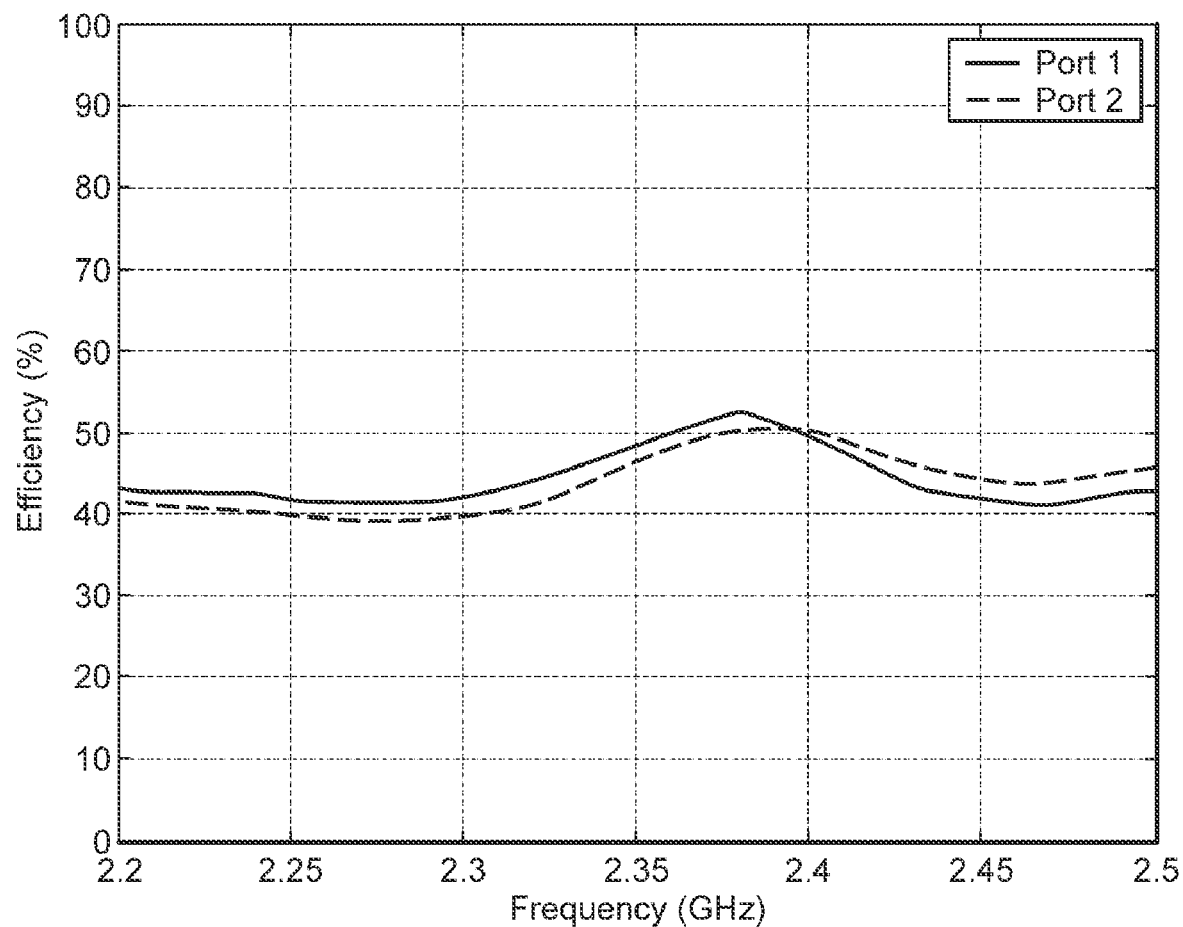
Figure 23E:
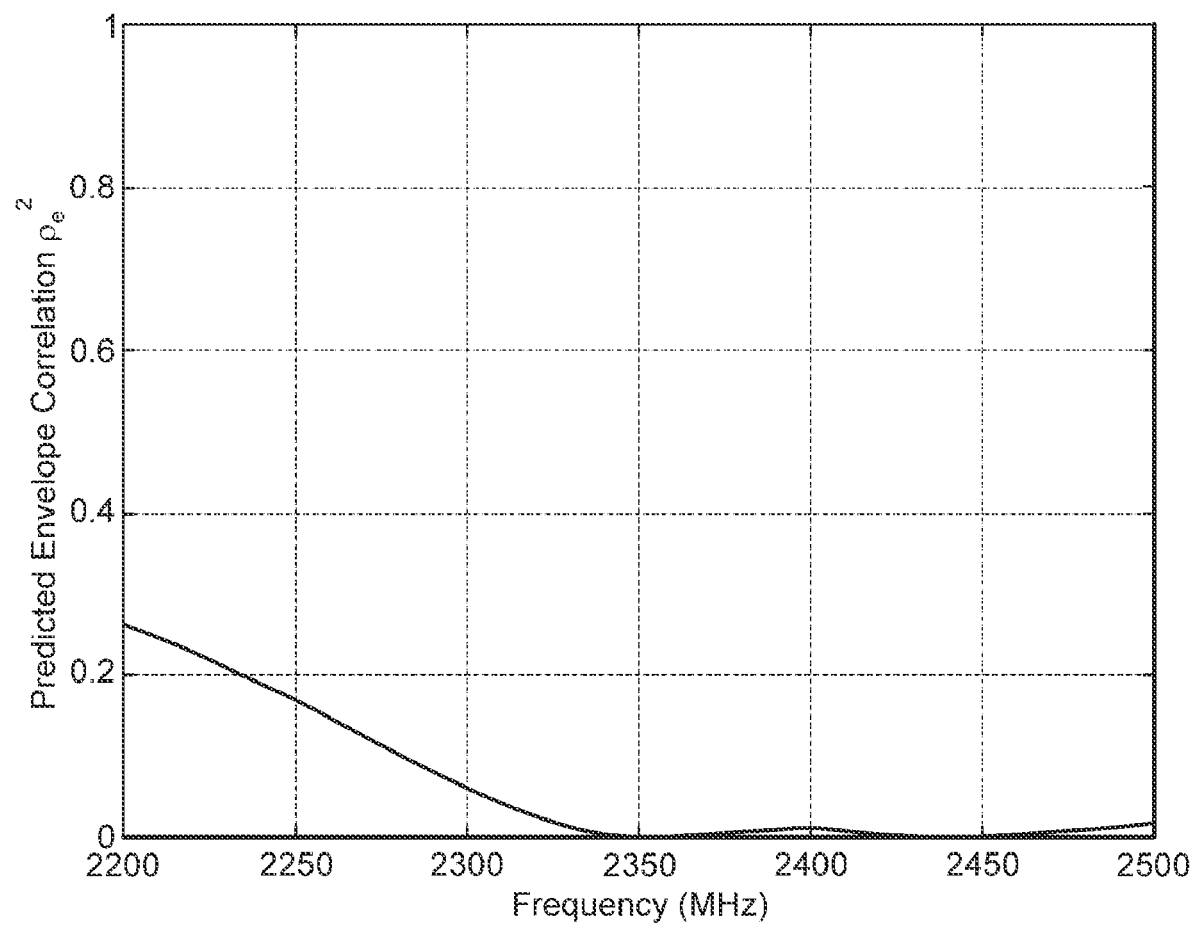
Figure 23F:
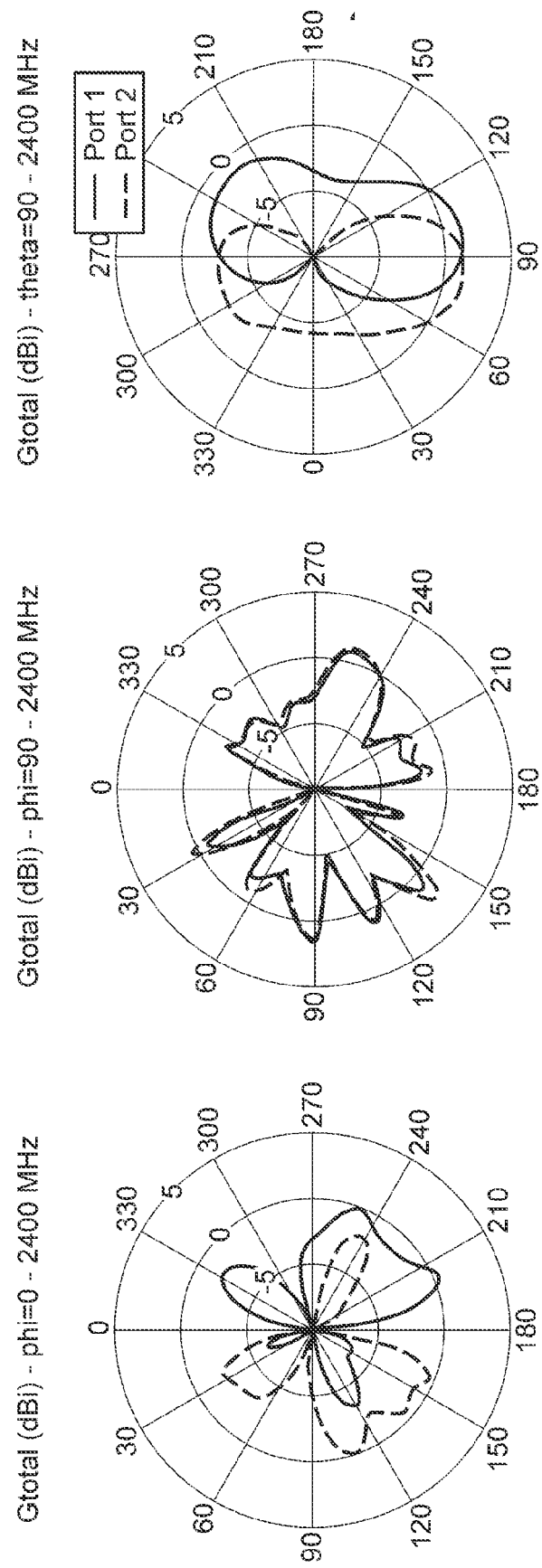

FIG. 23A illustrates a test assembly 2300 using antenna 2100 of FIGS. 21A and 21B along with the coordinate reference for far-field patterns. FIG. 23B shows the VSWR measured at test ports 2302 (Port 1), 2304 (Port 2). FIG. 23C shows the coupling (S21 or S12) measured between the test ports 2302 (Port 1), 2304 (Port 2). The VSWR and coupling are advantageously low at the frequencies of interest, e.g., 2300 to 2400 MHz. FIG. 23D shows the measured radiation efficiency referenced from the test ports. FIG. 23E shows the calculated correlation between the radiation patterns produced by excitation of test port 2302 (Port 1) versus those produced by excitation of test port 2304 (Port 2). The radiation efficiency is advantageously high while the correlation between patterns is advantageously low at the frequencies of interest. FIG. 23F shows far field gain patterns by excitation of test port 2302 (Port 1) or test port 2304 (Port 2) at a frequency of 2400 MHz. The patterns resulting from test port 2302 (Port 1) are different and complementary to those of test port 2304 (Port 2) in the $\phi=0$ or XZ plane and in the $\theta=90$ or XY plane.

Figure 23G:
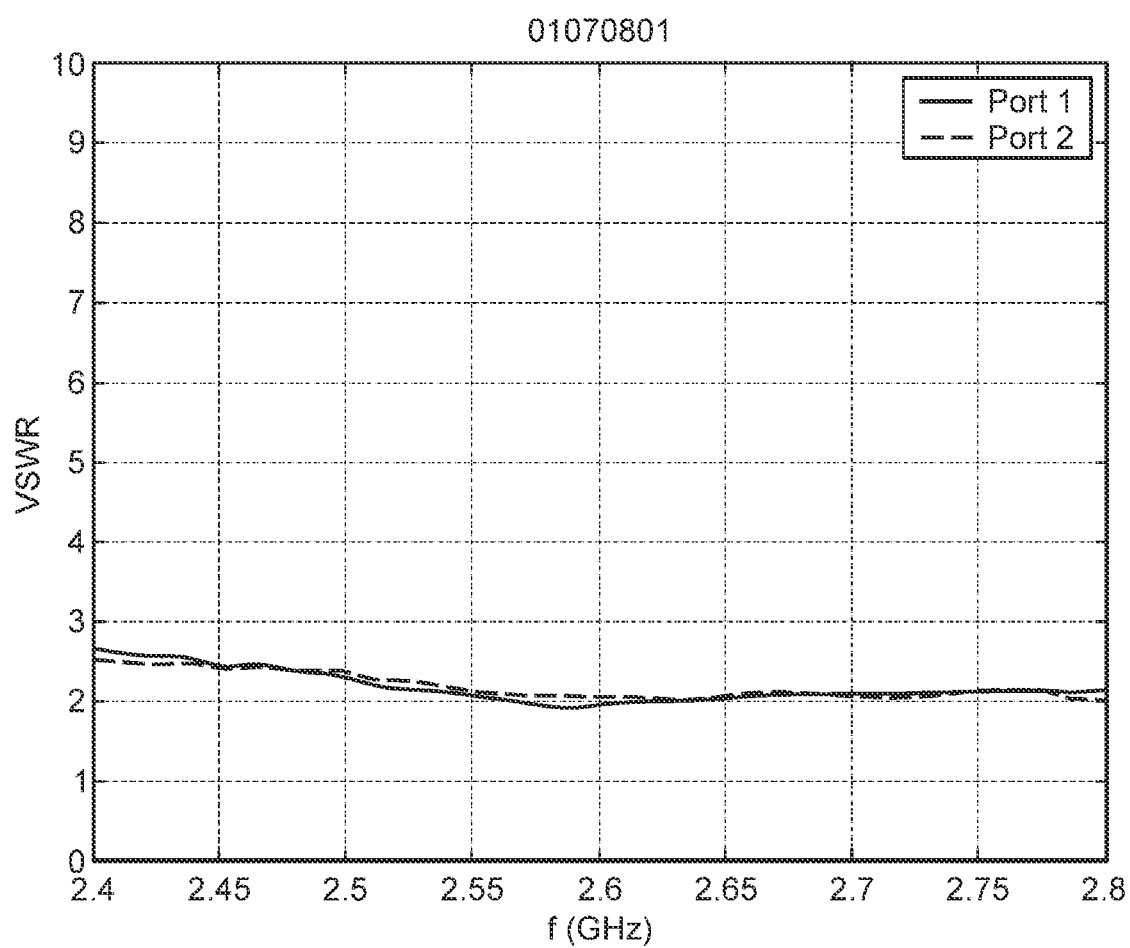
Figure 23H:
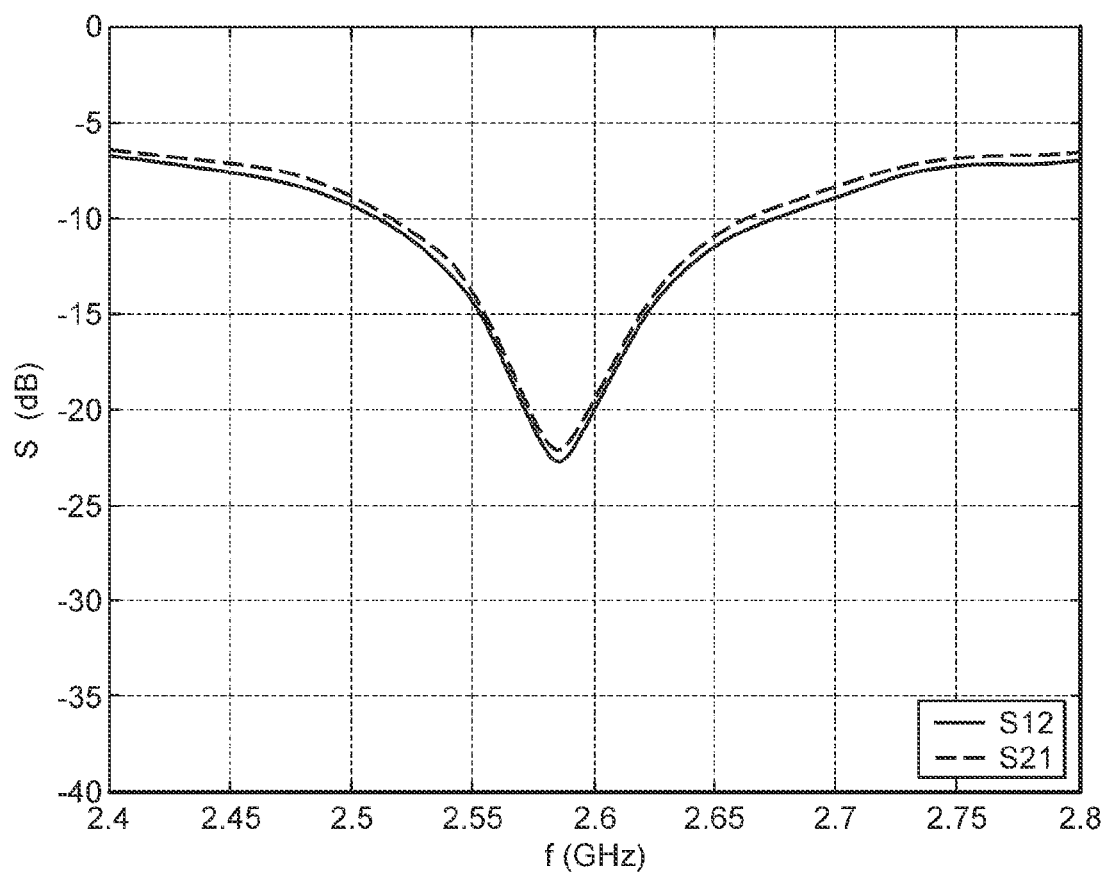
Figure 23I:
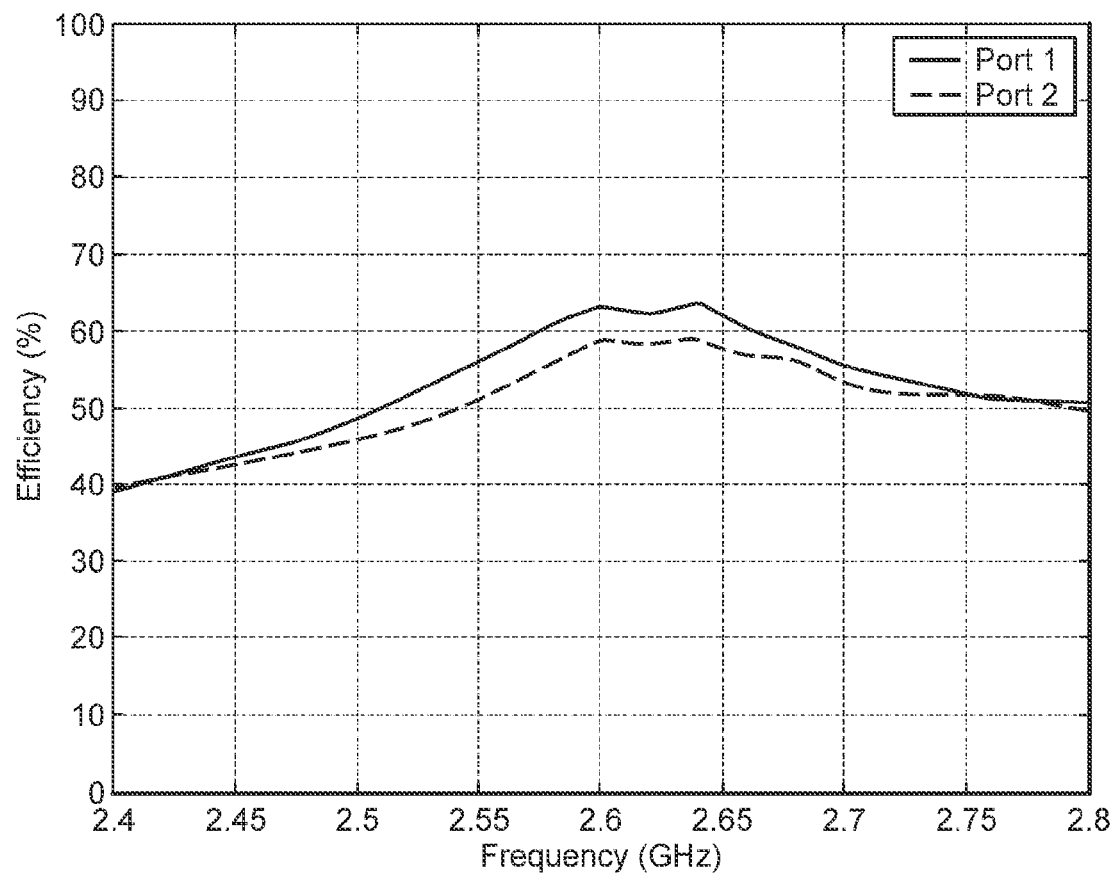
Figure 23J:
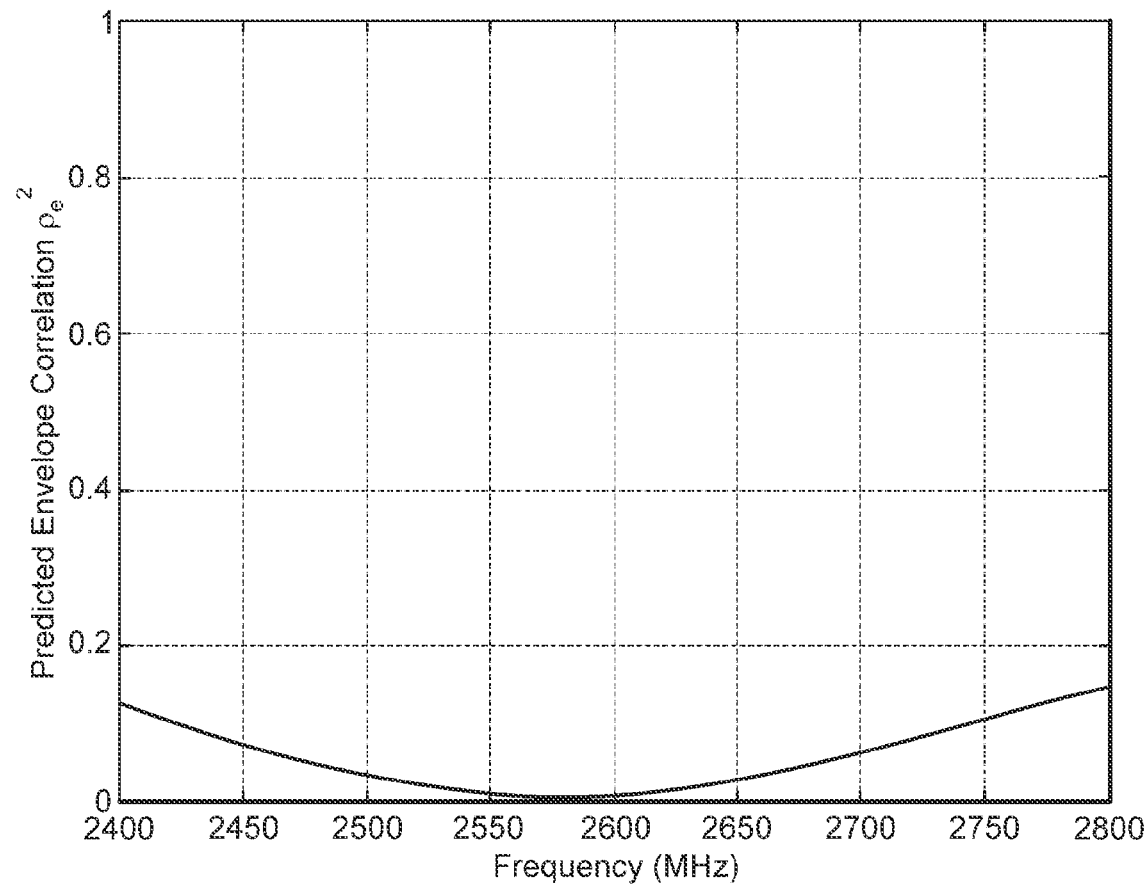
Figure 23K:
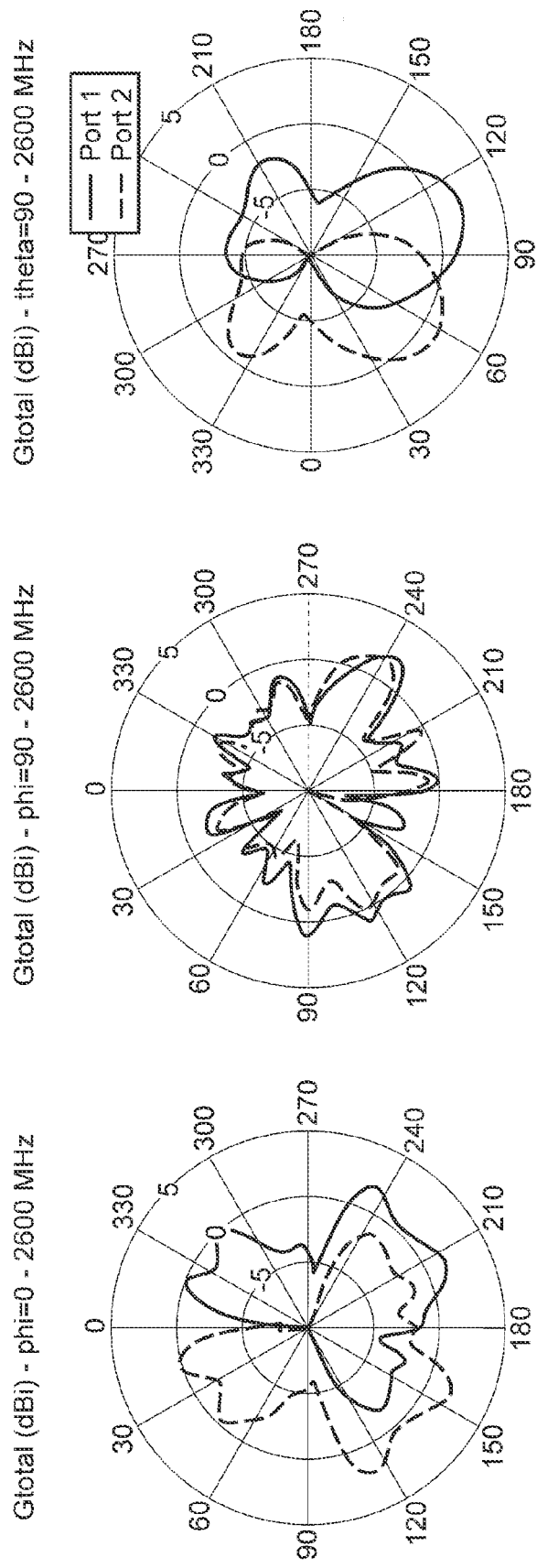

FIG. 23G shows the VSWR measured at the test ports of assembly 2300 with antenna 2200 in place of antenna 2100. FIG. 23H shows the coupling (S21 or S12) measured between the test ports. The VSWR and coupling are advantageously low at the frequencies of interest, e.g. 2500 to 2700 MHz. FIG. 23I shows the measured radiation efficiency referenced from the test ports. FIG. 23J shows the calculated correlation between the radiation patterns produced by excitation of test port 2302 (Port 1) versus those produced by excitation of test port 2304 (Port 2). The radiation efficiency is advantageously high while the correlation between patterns is advantageously low at the frequencies of interest. FIG. 23K shows far field gain patterns by excitation of test port 2302 (Port 1) or test port 2304 (Port 2) at a frequency of 2600 MHz. The patterns resulting from test port 2302 (Port 1) are different and complementary to those of test port 2304 (Port 2) in the $\phi=0$ or XZ plane and in the $\theta=90$ or XY plane.

One or more further embodiments of the invention are directed to techniques for beam pattern control for the purpose of null steering or beam pointing. When such techniques are applied to a conventional array antenna (comprising separate antenna elements that are spaced at some fraction of a wavelength), each element of the array antenna is fed with a signal that is a phase shifted version of a reference signal or waveform. For a uniform linear array with equal excitation, the beam pattern produced can be described by the array factor F, which depends on the phase of each individual element and the inter-element element spacing d.

$$F = A_0 \sum_{n=0}^{N-1} \exp[jn(\beta d\cos\theta + \alpha)]$$

where $\beta=2\pi/\lambda$, N=Total # of elements, $\alpha$=phase shift between successive elements, and $\theta$=angle from array axis By controlling the phase $\alpha$ to a value $\alpha_i$, the maximum value of F can be adjusted to a different direction $\theta_i$, thereby controlling the direction in which a maximum signal is broadcast or received.

The inter-element spacing in conventional array antennas is often on the order of ¼ wavelength, and the antennas can be closely coupled, having nearly identical polarization. It is advantageous to reduce the coupling between elements, as coupling can lead to several problems in the design and performance of array antennas. For example, problems such as pattern distortion and scan blindness (see Stutzman, Antenna Theory and Design, Wiley 1998, pgs 122-128 and 135-136, and 466-472) can arise from excessive inter-element coupling, as well as a reduction of the maximum gain attainable for a given number of elements.

Beam pattern control techniques can be advantageously applied to all multimode antenna structures described herein having antenna elements connected by one or more connecting elements, which exhibit high isolation between multiple feedpoints. The phase between ports at the high isolation antenna structure can be used for controlling the antenna pattern. It has been found that a higher peak gain is achievable in given directions when the antenna is used as a simple beam-forming array as a result of the reduced coupling between feedpoints. Accordingly, greater gain can be achieved in selected directions from a high isolation antenna structure in accordance with various embodiments that utilizes phase control of the carrier signals presented to its feed terminals.

In handset applications where the antennas are spaced at much less than ¼ wavelength, mutual coupling effects in conventional antennas reduce the radiation efficiency of the array, and therefore reduce the maximum gain achievable.

Figure 24:
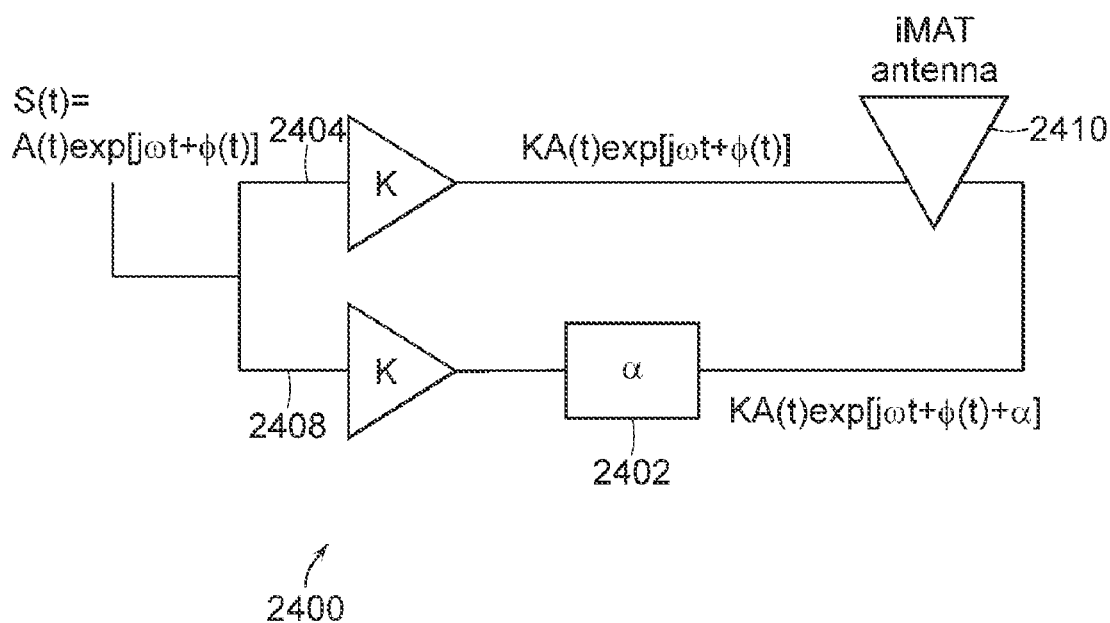
FIG. 24 is a schematic block diagram of an antenna structure with a beam steering mechanism in accordance with one or more embodiments of the invention.

By controlling the phase of the carrier signal provided to each feedpoint of a high isolation antenna in accordance with various embodiments, the direction of maximum gain produced by the antenna pattern can be controlled. A gain advantage of, e.g., 3 dB obtained by beam steering is advantageous particularly in portable device applications where the beam pattern is fixed and the device orientation is randomly controlled by the user. As shown, e.g., in the schematic block diagram of FIG. 24, which illustrates a pattern control apparatus 2400 in accordance with various embodiments, a relative phase shift $\alpha$ is applied by a phase shifter 2402 to the RF signals applied to each antenna feed 2404, 2408. The signals are fed to respective antenna ports of antenna structure 2410.

The phase shifter 2402 can comprise standard phase shift components such as, e.g., electrically controlled phase shift devices or standard phase shift networks.

FIGS. 25A-25G provide a comparison of antenna patterns produced by a closely spaced 2-D conventional array of dipole antennas and a 2-D array of high isolation antennas in accordance with various embodiments of the invention for different phase differences $\alpha$ between two feeds to the antennas. In FIGS. 25A-25G, curves are shown for the antenna patterns at $\theta=90$ degrees. The solid lines in the figures represents the antenna pattern produced by the isolated feed single element antenna in accordance with various embodiments, while the dashed lines represent the antenna pattern produced by two separate monopole conventional antennas separated by a distance equal to the width of the single element isolated feed structure. Therefore, the conventional antenna and the high isolation antenna are of generally equivalent size.

In all cases shown in the figures, the peak gain produced by the high isolation antenna in accordance with various embodiments produces a greater gain margin when compared to the two separate conventional dipoles, while providing azimuthal control of the beam pattern. This behavior makes it possible to use the high isolation antenna in transmit or receive applications where additional gain is needed or desired in a particular direction. The direction can be controlled by adjusting the relative phase between the drivepoint signals. This may be particularly advantageous for portable devices needing to direct energy toward a receive point such as, e.g., a base station. The combined high isolation antenna offers greater advantage when compared to two single conventional antenna elements when phased in a similar fashion.

Figure 25A:
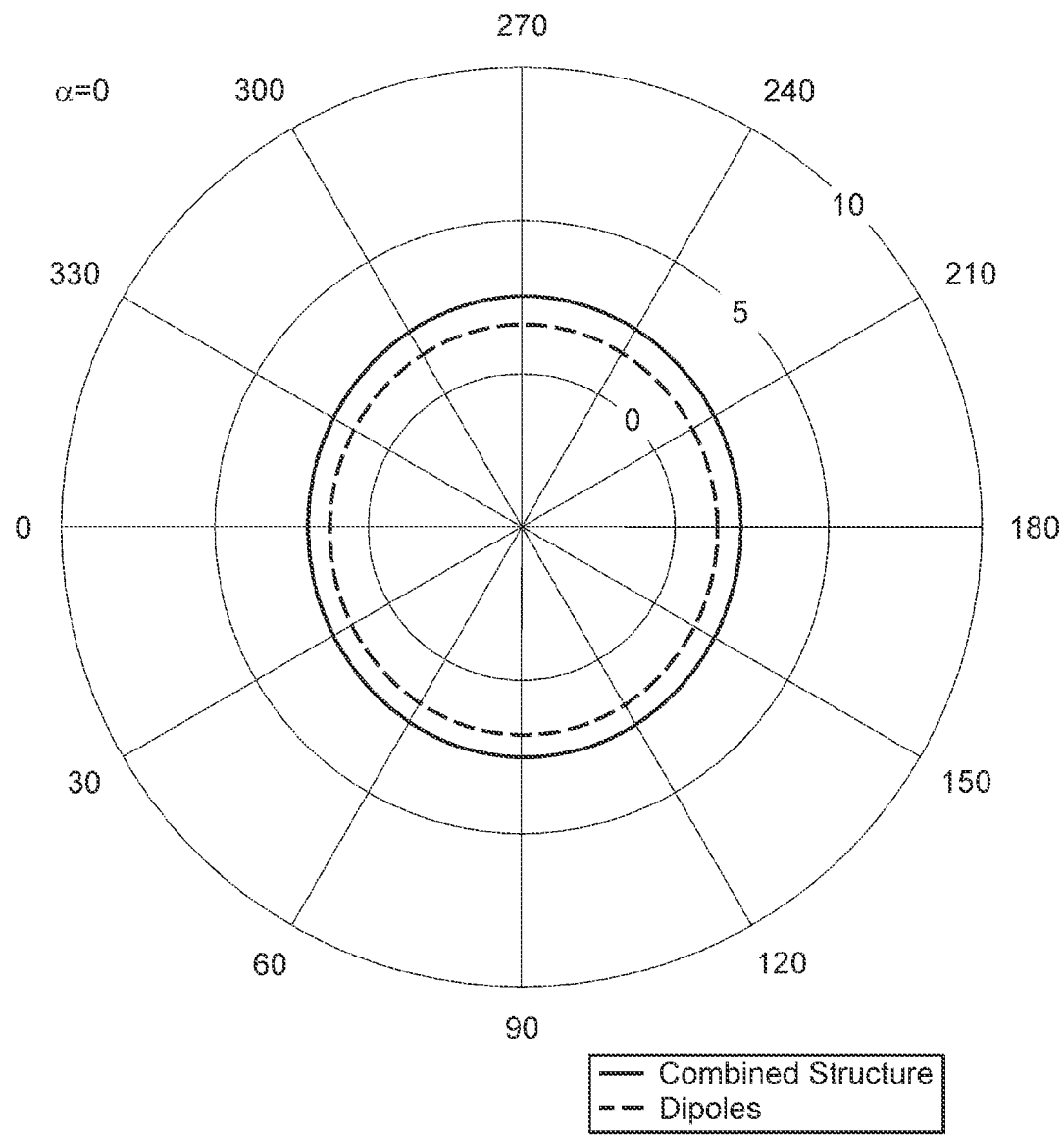
FIGS. 25A to 25G illustrate test measurement results for the antenna of FIG. 25A.

As shown in FIG. 25A, the combined dipole in accordance with various embodiments shows greater gain in a uniform azimuth pattern ($\theta=90$) for $\alpha=0$ (zero degrees phase difference).

Figure 25B:
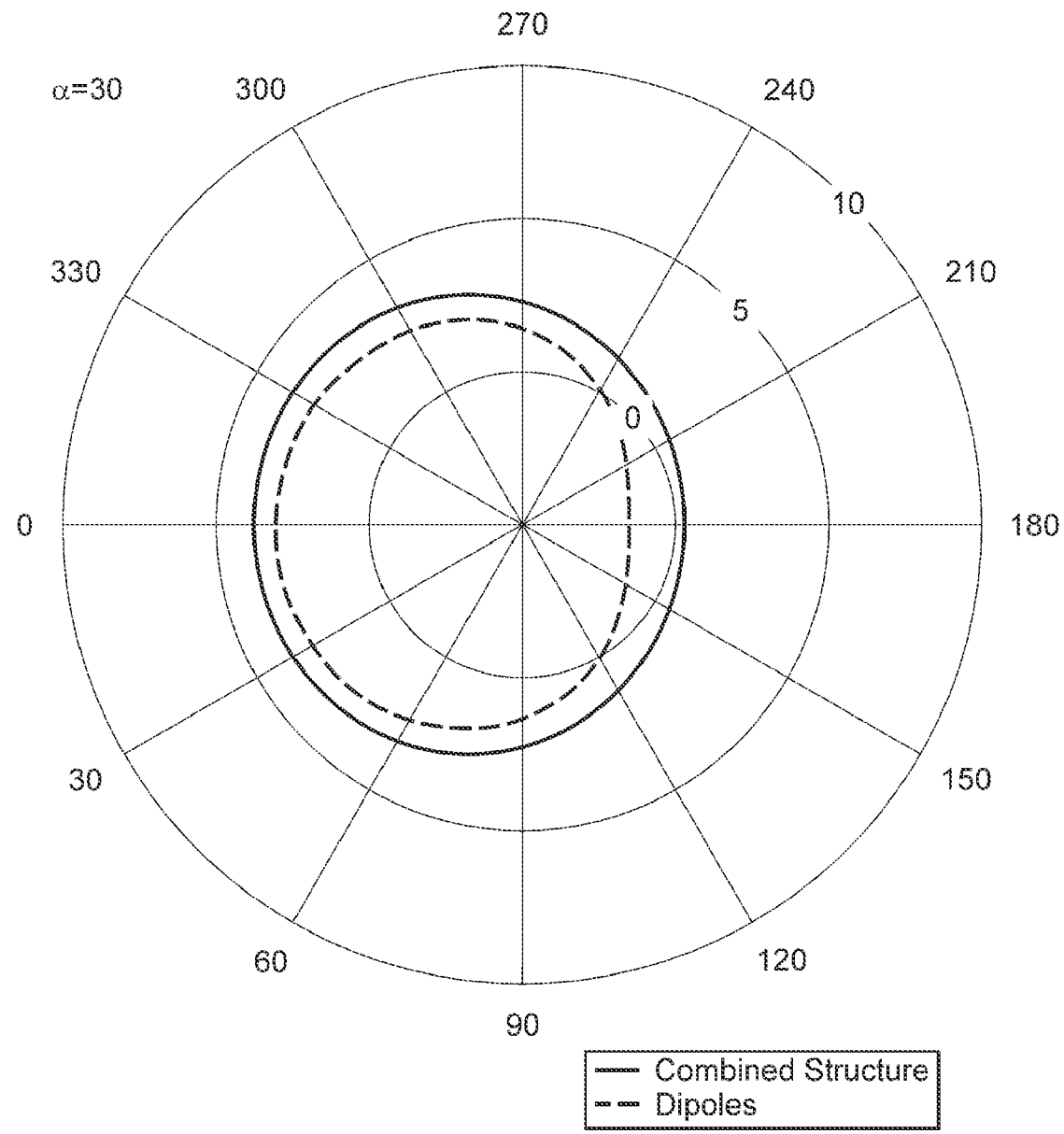

As shown in FIG. 25B, the combined dipole in accordance with various embodiments shows greater peak gain (at $\phi=0$) with a non-symmetric azimuthal pattern ($\theta=90$ plot for $\alpha=30$ (30 degrees phase difference between feedpoints).

Figure 25C:
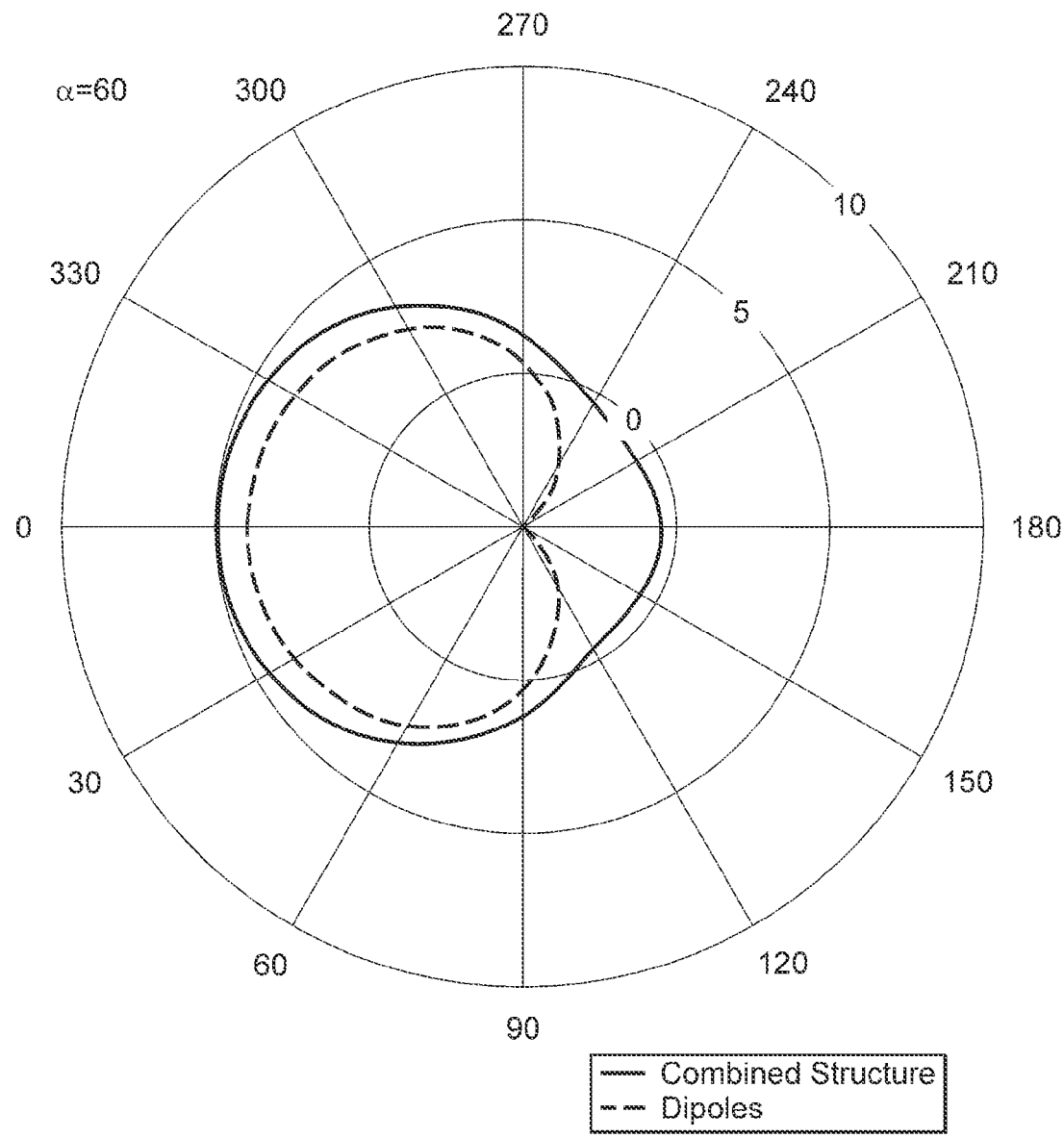

As shown in FIG. 25C, the combined dipole in accordance with various embodiments shows greater peak gain (at $\phi=0$) with a shifted azimuthal pattern ($\theta=90$ plot for $\alpha=60$ (60 degrees phase difference between feedpoints).

Figure 25D:
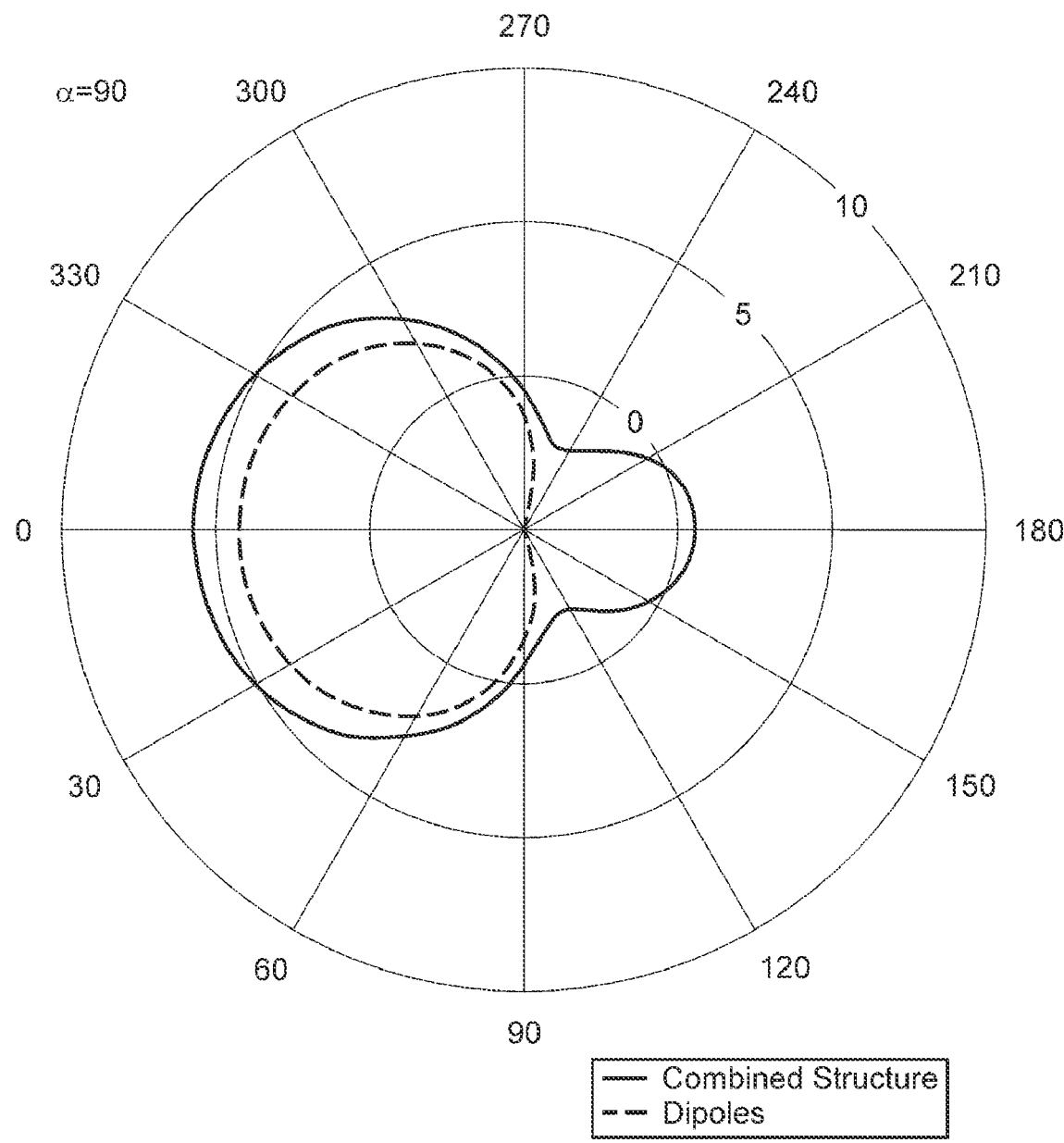

As shown in FIG. 25D, the combined dipole in accordance with various embodiments shows even greater peak gain (at $\phi=0$) with a shifted azimuthal pattern ($\theta=90$ plot for $\alpha=90$ (90 degrees phase difference between feedpoints).

Figure 25E:
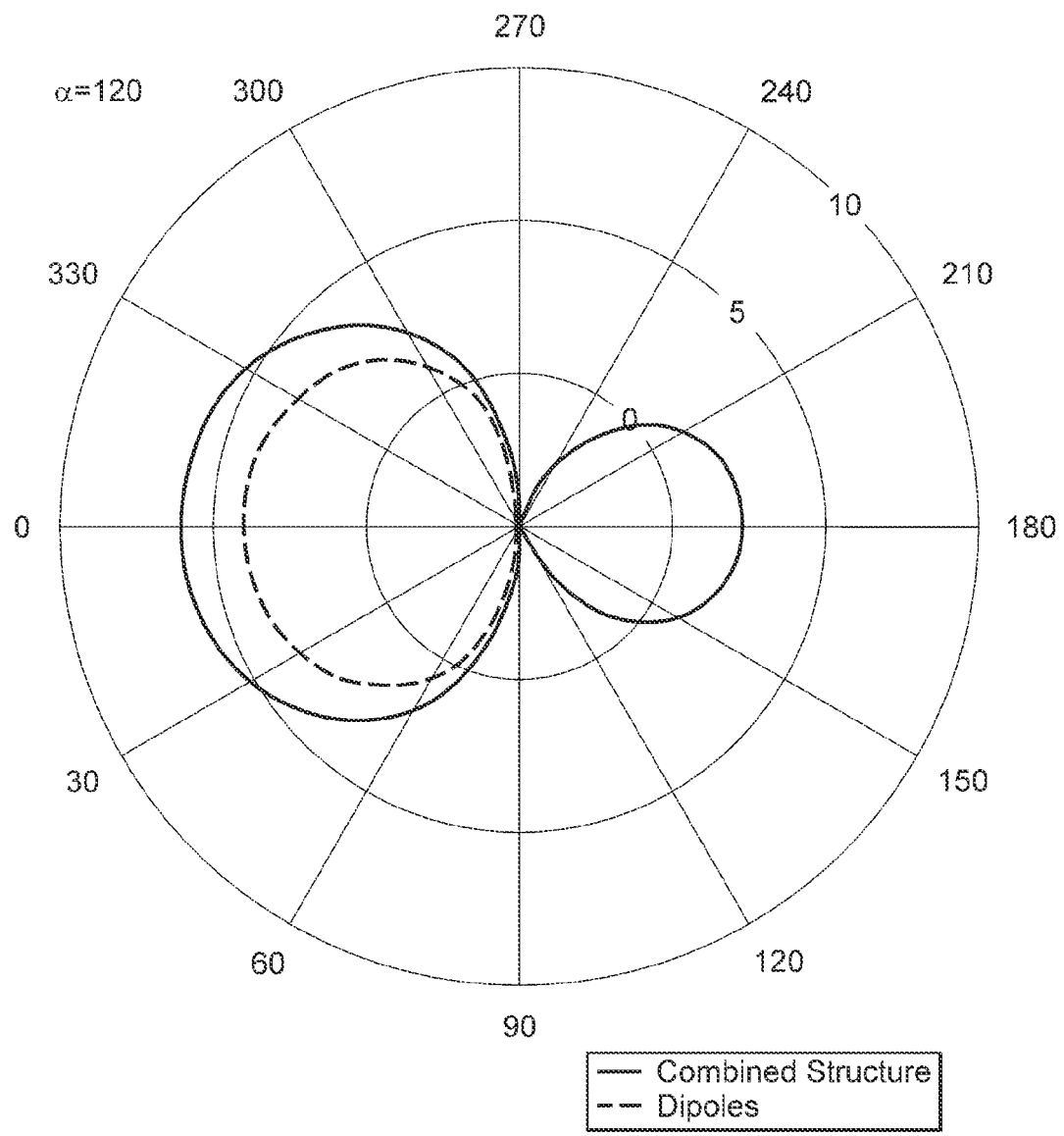

As shown in FIG. 25E, the combined dipole in accordance with various embodiments shows greater peak gain (at $\phi=0$) with a shifted azimuthal pattern ($\theta=90$ plot greater backlobe (at $\phi=180$) for $\alpha=120$ (120 degrees phase difference between feedpoints).

Figure 25F:
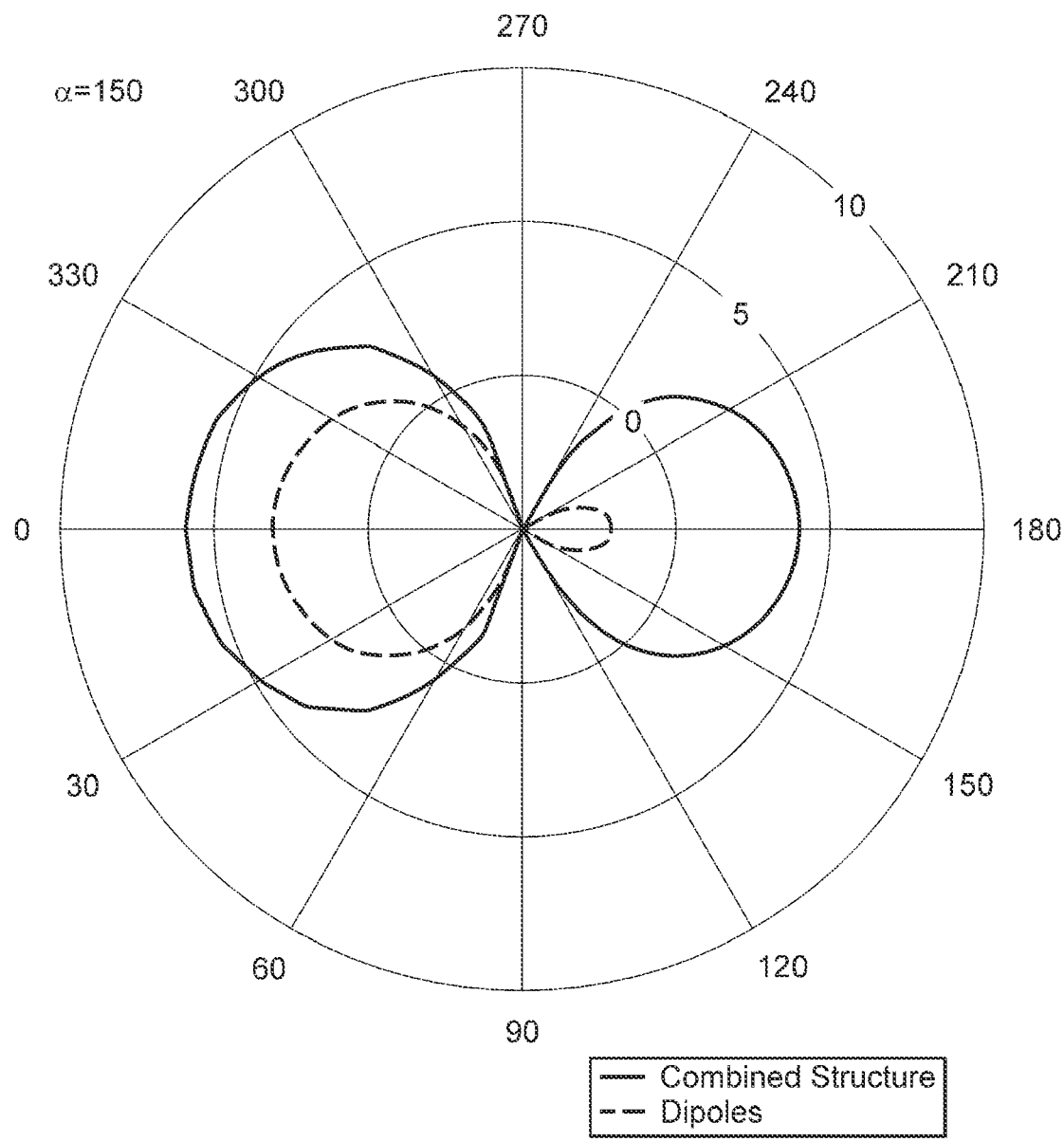

As shown in FIG. 25F, the combined dipole in accordance with various embodiments shows greater peak gain (at $\phi=0$) with a shifted azimuthal pattern ($\theta=90$ plot), even greater backlobe (at $\phi=180$) for $\alpha=150$ (150 degrees phase difference between feedpoints).

Figure 25G:
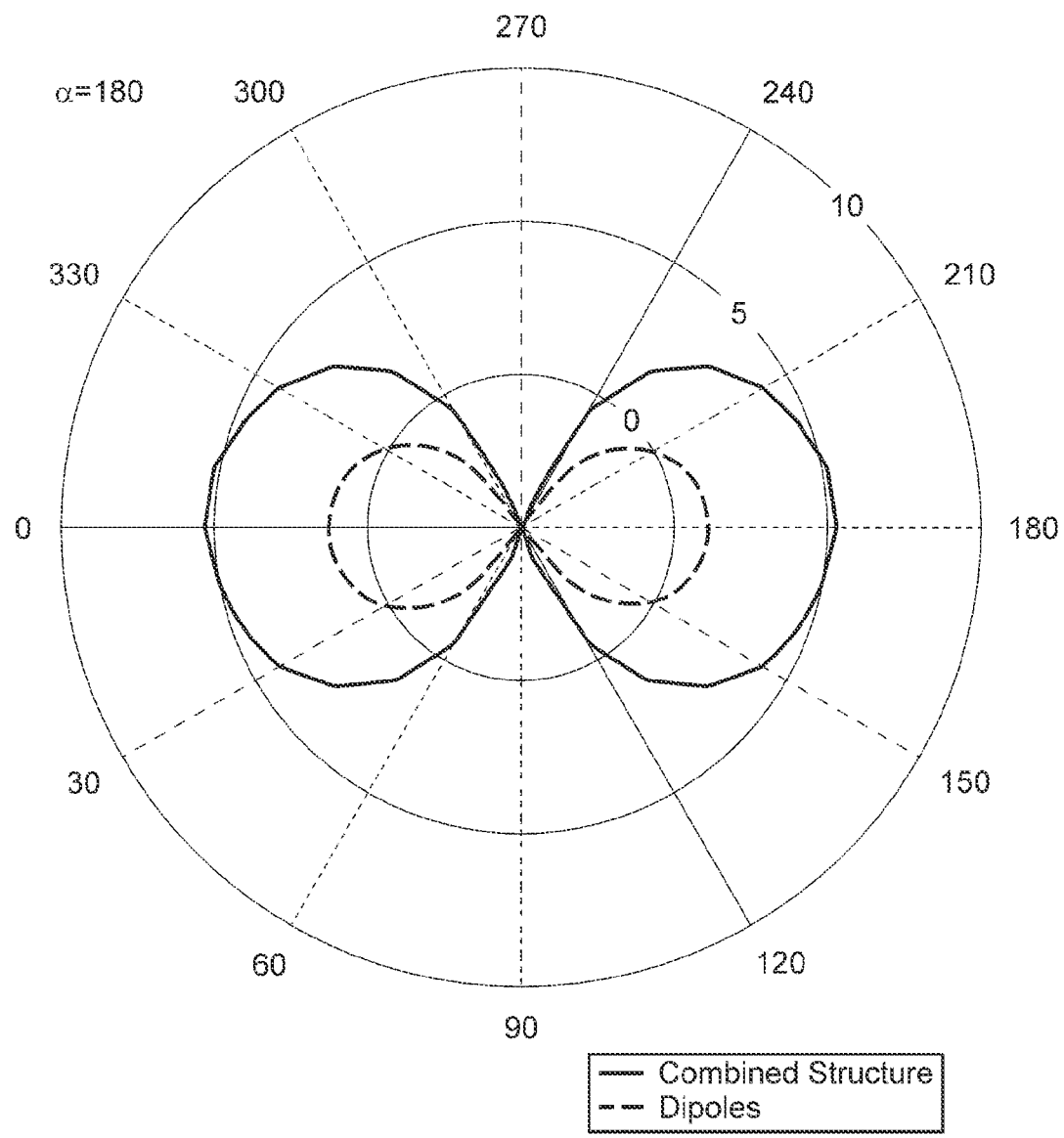

As shown in FIG. 25G, the combined dipole in accordance with various embodiments shows greater peak gain (at φ=0 & 180) with a double lobed azimuthal pattern (θ=90 plot) for α=180 (180 degrees phase difference between feedpoints).

Figure 26:
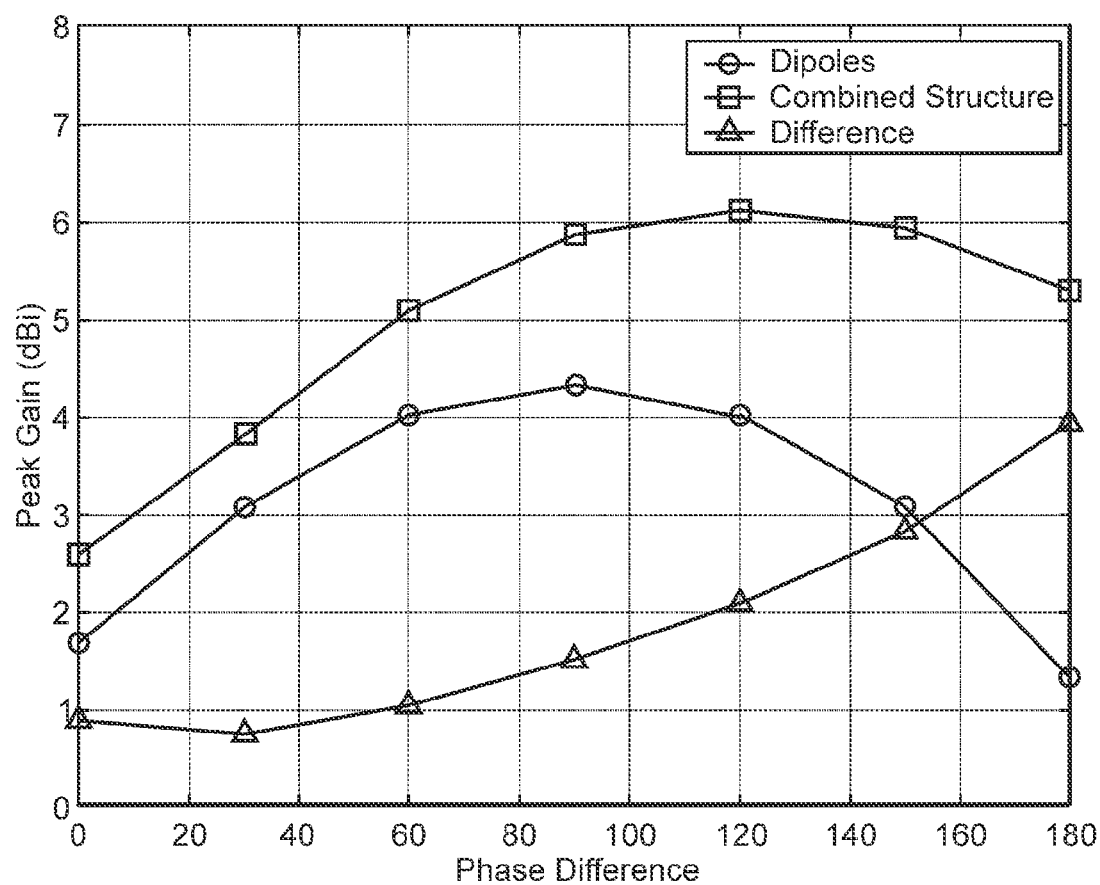
FIG. 26 illustrates the gain advantage of an antenna structure in accordance with one or more embodiments of the invention as a function of the phase angle difference between feedpoints.

FIG. 26 illustrates the ideal gain advantage if the combined high isolation antenna in accordance with one or more embodiments over two separate dipoles as a function of the phase angle difference between the feedpoints for a two feedpoint antenna array.

The increased gain obtained by pattern control using an antenna structure with two parallel dipoles connected by meandered connecting elements in accordance with one or more embodiments of the invention may be utilized to improve the range or reliability of a wireless link. Alternately, the increased gain may allow for a portable or other device to obtain equivalent wireless link performance with reduced transmit power. For example, an average transmit gain improvement of 3 dB obtained from pattern control would allow for the transmit power to be reduced by 3 dB while maintaining the same link performance. Reduction of transmit power is advantageous in several ways. First, portable wireless devices are typically required to meet a specific absorption rate (SAR) regulatory limit, which can be difficult to meet without some performance compromise. A reduction in transmit power can provide a corresponding reduction in the peak SAR value without performance compromise. In addition, lower transmit power reduces the burden on the output PA, allowing design for lower power and higher linearity. Furthermore, reduced transmit power is beneficial for longer battery life and lower heat dissipation requirements for portable or other devices.

While the use of phase control produces a desired increase in far-field gain, changes in phase excitation may also alter the near-fields and affect SAR values. To realize a net SAR value reduction, the antenna far-field gain increase should be greater than any increase in peak SAR value. Through experimentation, Applicants have found that in fact the change in SAR value is relatively small over phase in comparison to the far-field gain.

Figure 30:
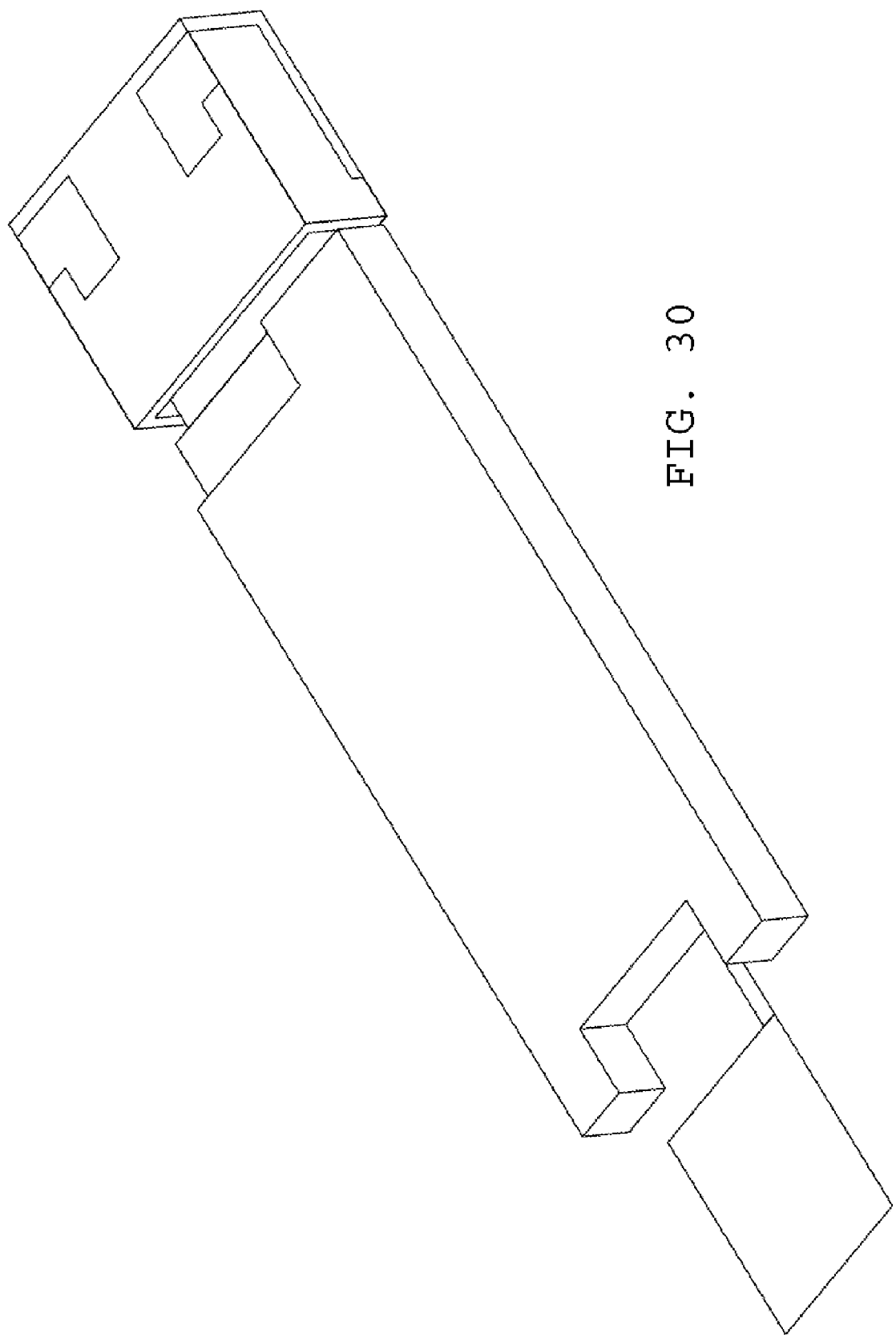
FIG. 30 illustrates an exemplary USB dongle with two port antenna structure for pattern control application in the 1900 MHz band.
Figure 31:
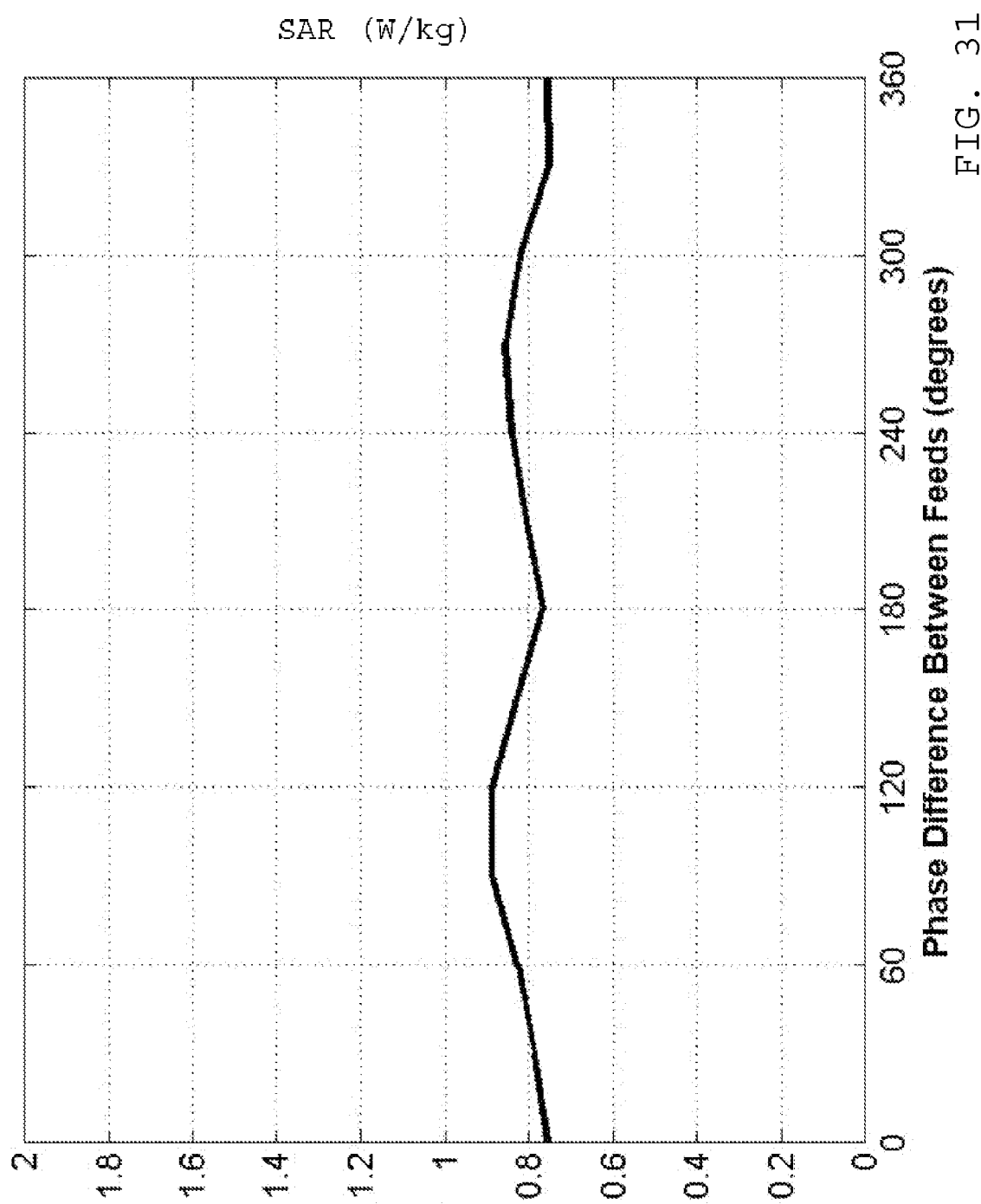
FIG. 31 illustrates SAR values as determined by simulation for the device of FIG. 30.

An exemplary USB dongle with two port antenna structure for pattern control application in the 1900 MHz band is shown on FIG. 30. As shown in FIG. 31, the SAR value, as determined by simulation for the configuration of FIG. 30, is relatively independent of the relative phase between the drivepoint signals used for pattern control, so that the benefit of the reduction in measured peak SAR value is achievable for all relative phase values, while providing full azimuthal control of the beam pattern.

The techniques described herein for reducing near-field radiation levels and SAR values are preferably used with the high isolation multimode antenna structures described above having connecting elements electrically connecting the antenna elements. However, the techniques can also be more generally used with antenna arrays comprising a plurality of radiating elements that are phase steerable to provide antenna pattern control and to increase gain in a selected direction.

Further embodiments of the invention are directed to multimode antenna structures that provide increased high isolation between multi-band antenna ports operating in close proximity to each other at a given frequency range. In these embodiments, a band-rejection slot is incorporated in one of the antenna elements of the antenna structure to provide reduced coupling at the frequency to which the slot is tuned.

Figure 27A:
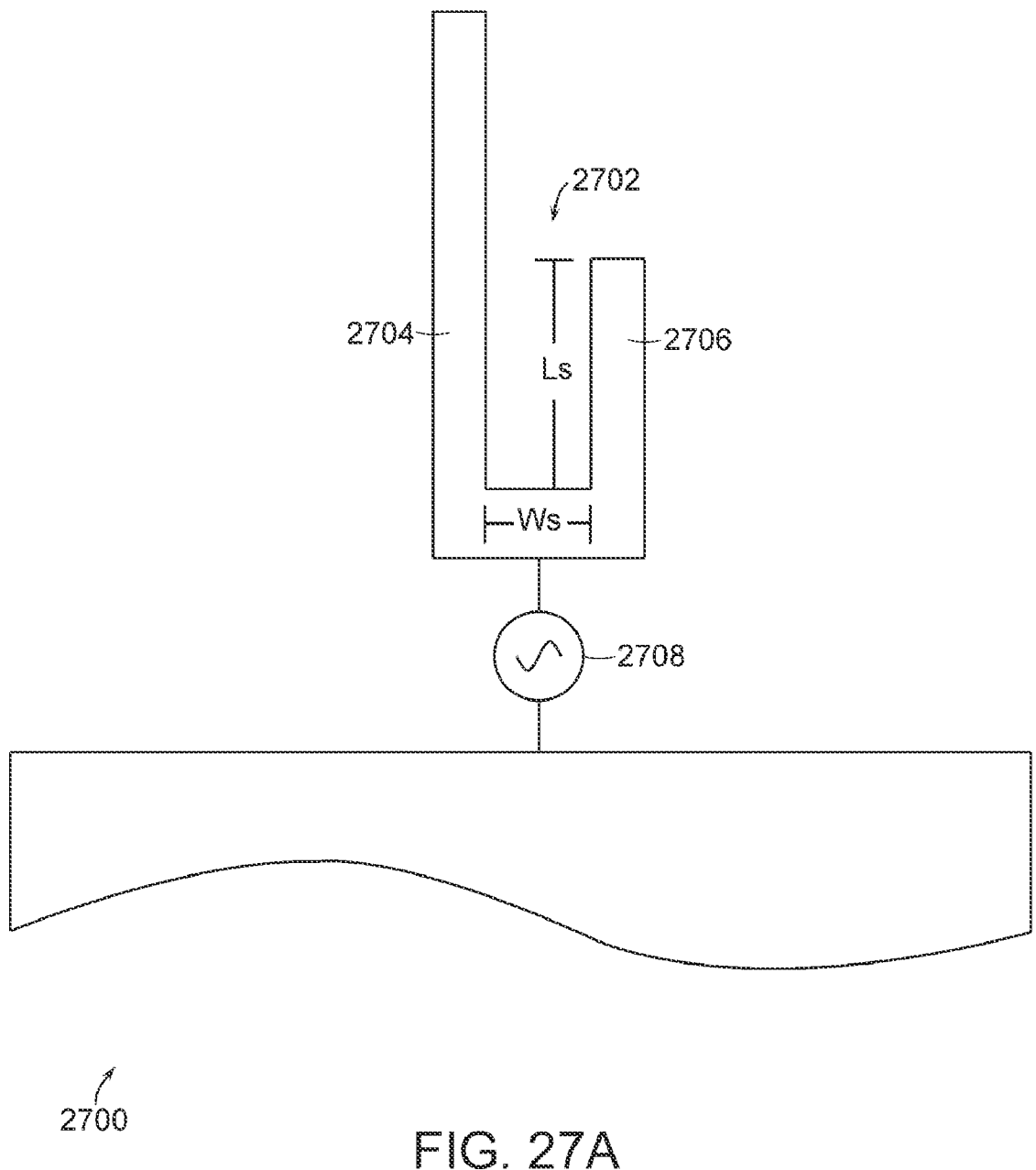
FIG. 27A is a schematic diagram illustrating a simple dual-band branch line monopole antenna structure.

FIG. 27A schematically illustrates a simple dual-band branch line monopole antenna 2700. The antenna 2700 includes a band-rejection slot 2702, which defines two branch resonators 2704, 2706. The antenna is driven by signal generator 2708. Depending on the frequency at which the antenna 2700 is driven, various current distributions are realized on the two branch resonators 2704, 2706.

Figure 27B:
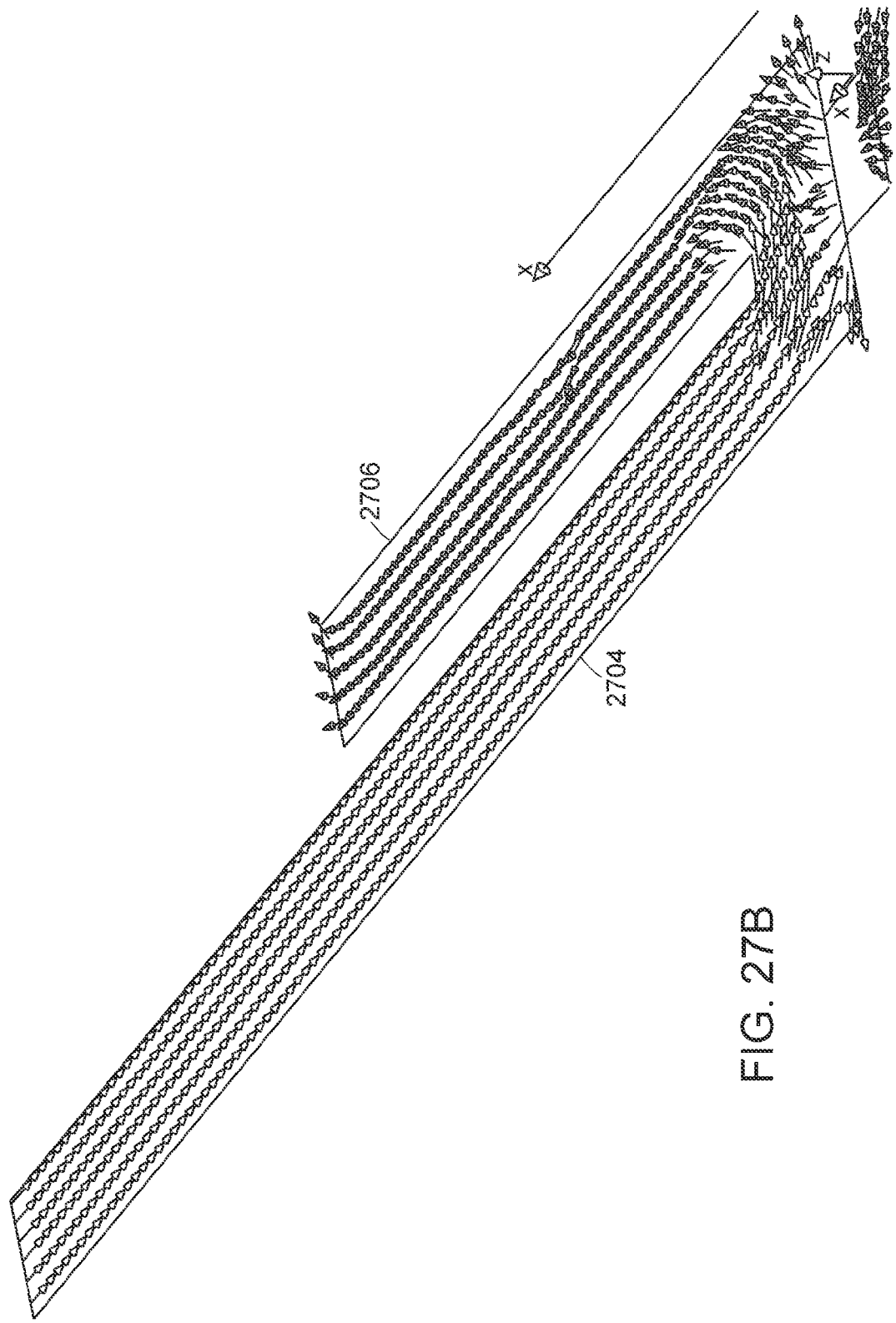
FIG. 27B illustrates current distribution in the FIG. 27A antenna structure.

The physical dimensions of the slot 2702 are defined by the width Ws and the length Ls as shown in FIG. 27A. When the excitation frequency satisfies the condition of Ls=lo/4, the slot feature becomes resonant. At this point the current distribution is concentrated around the shorted section of the slot, as shown in FIG. 27B.

Figure 27C:
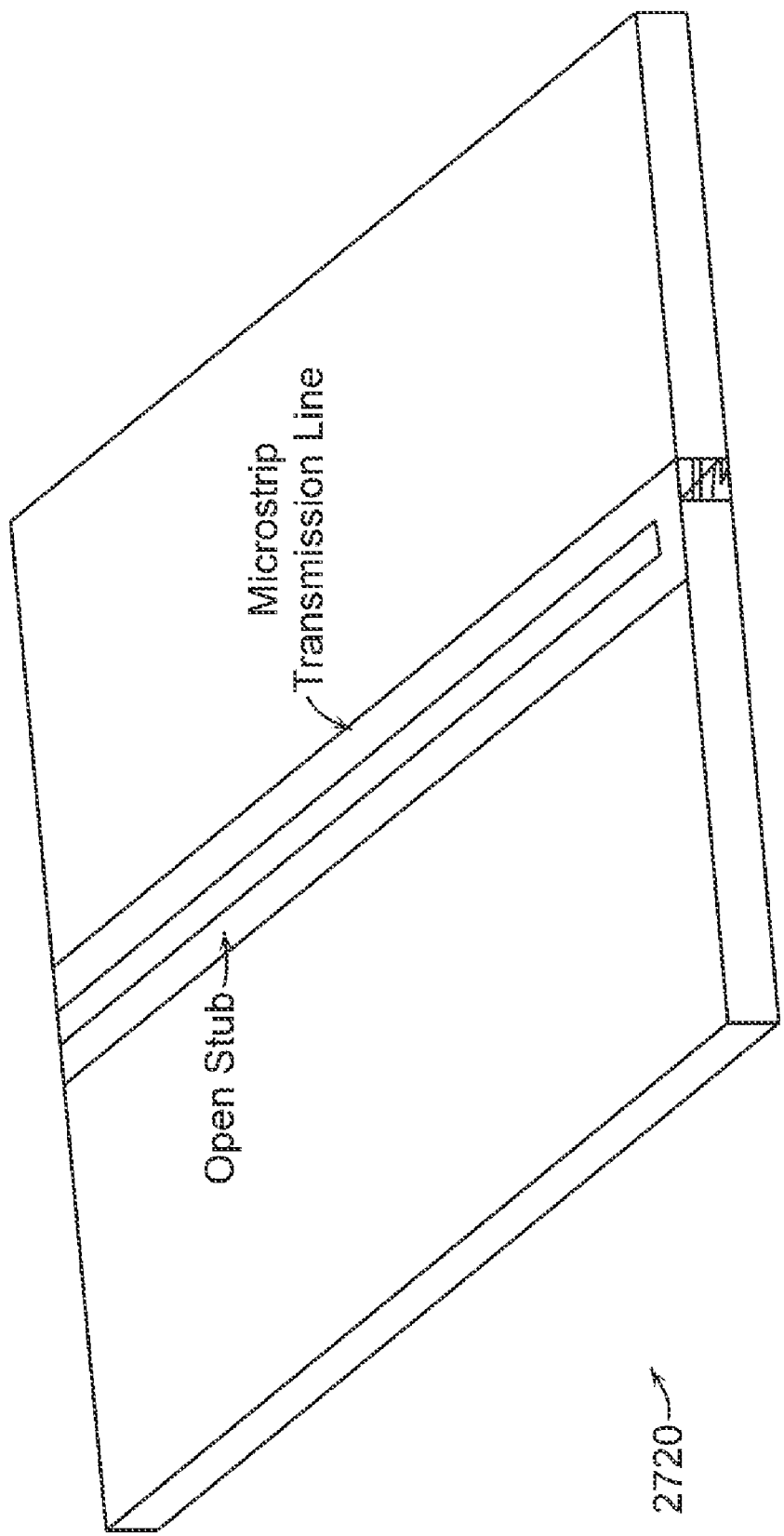
FIG. 27C is a schematic diagram illustrating a spurline band stop filter.
Figure 27D:
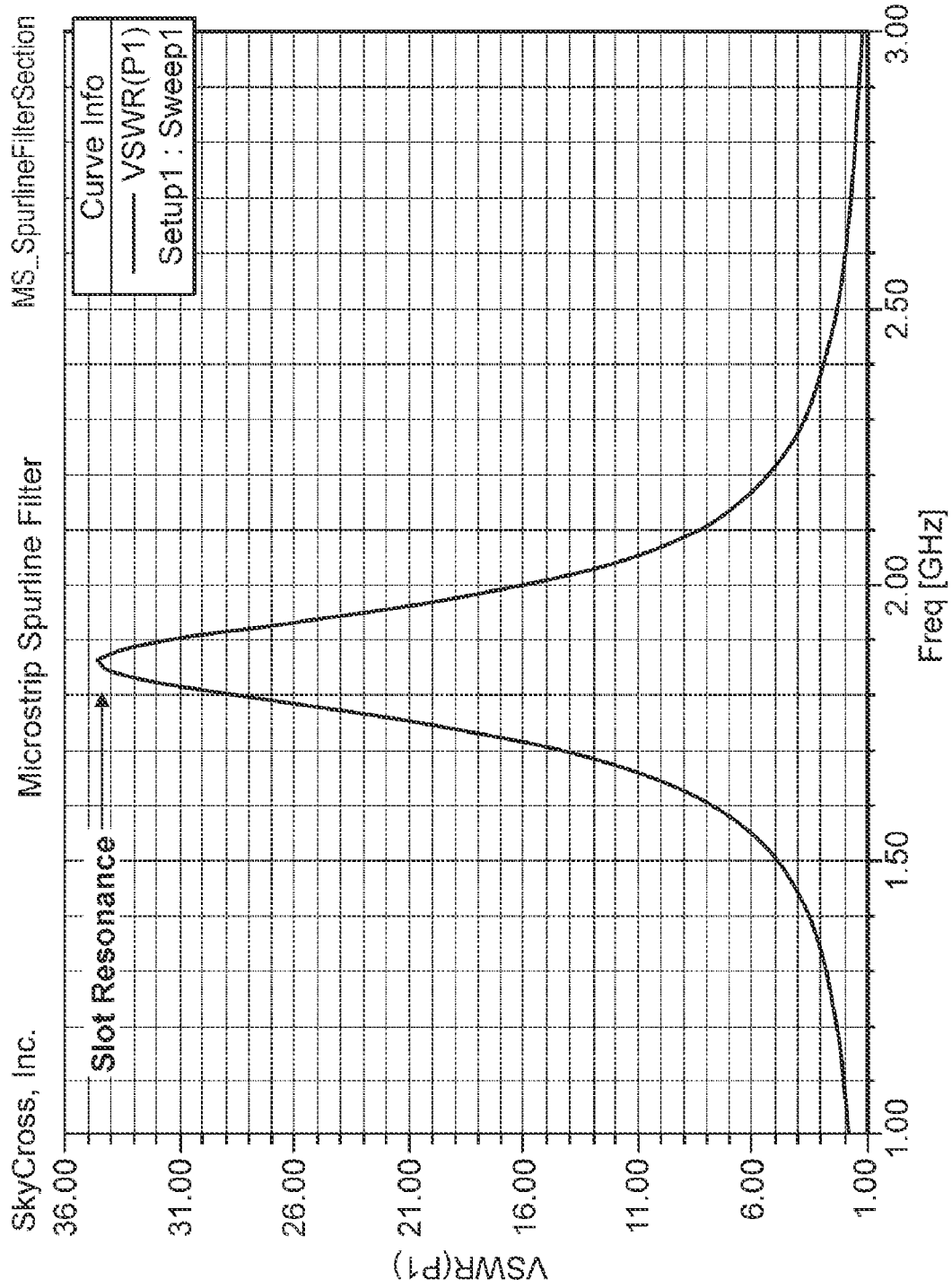
FIGS. 27D and 27E are test results illustrating frequency rejection in the FIG. 27A antenna structure.
Figure 27E:
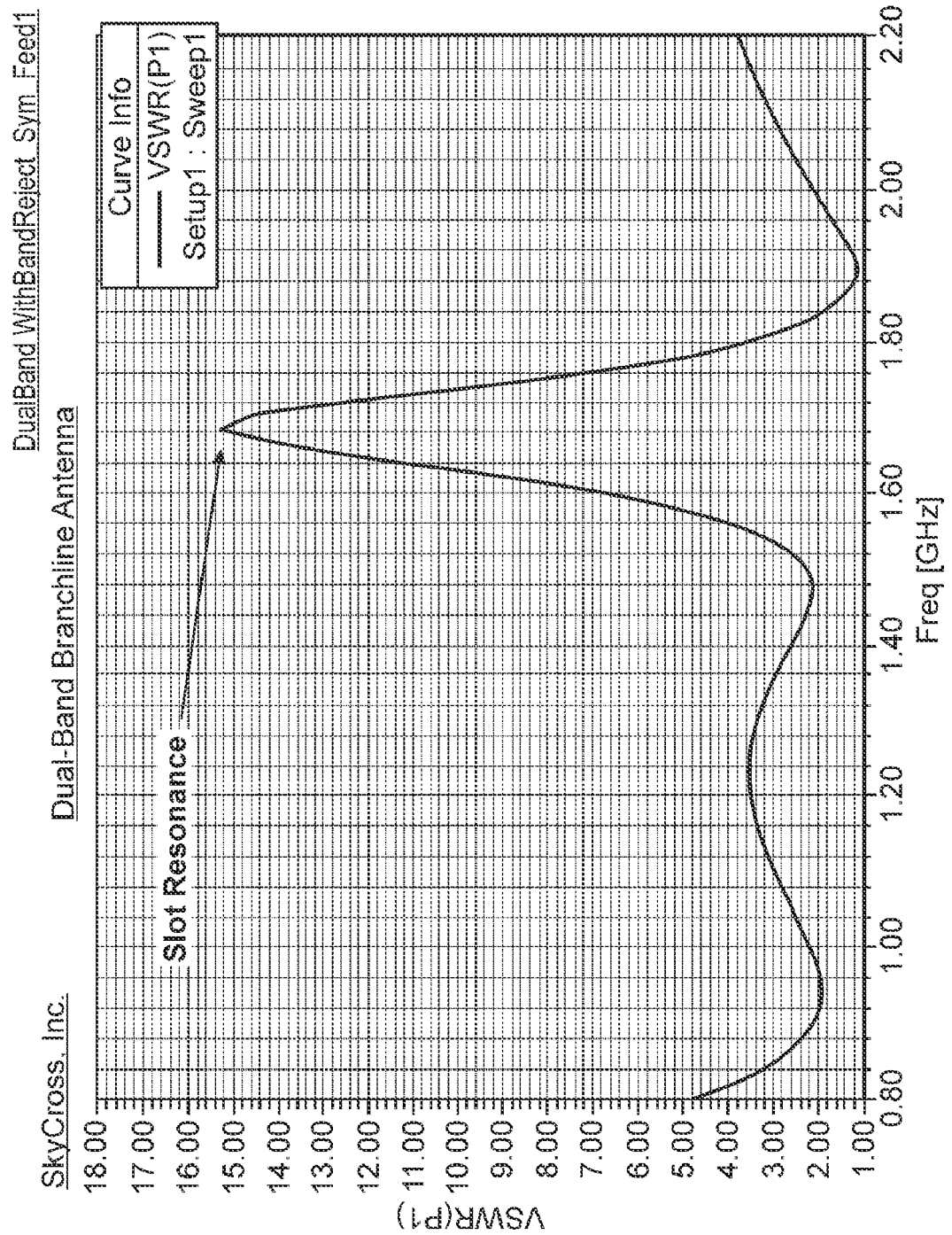

The currents flowing through the branch resonators 2704, 2706 are approximately equal and oppositely directed along the sides of the slot 2702. This causes the antenna structure 2700 to behave in a similar manner to a spurline band stop filter 2720 (shown schematically in FIG. 27C), which transforms the antenna input impedance down significantly lower than the nominal source impedance. This large impedance mismatch results in a very high VSWR, shown in FIGS. 27D and 27E, and as a result leads to the desired frequency rejection.

Figure 28:
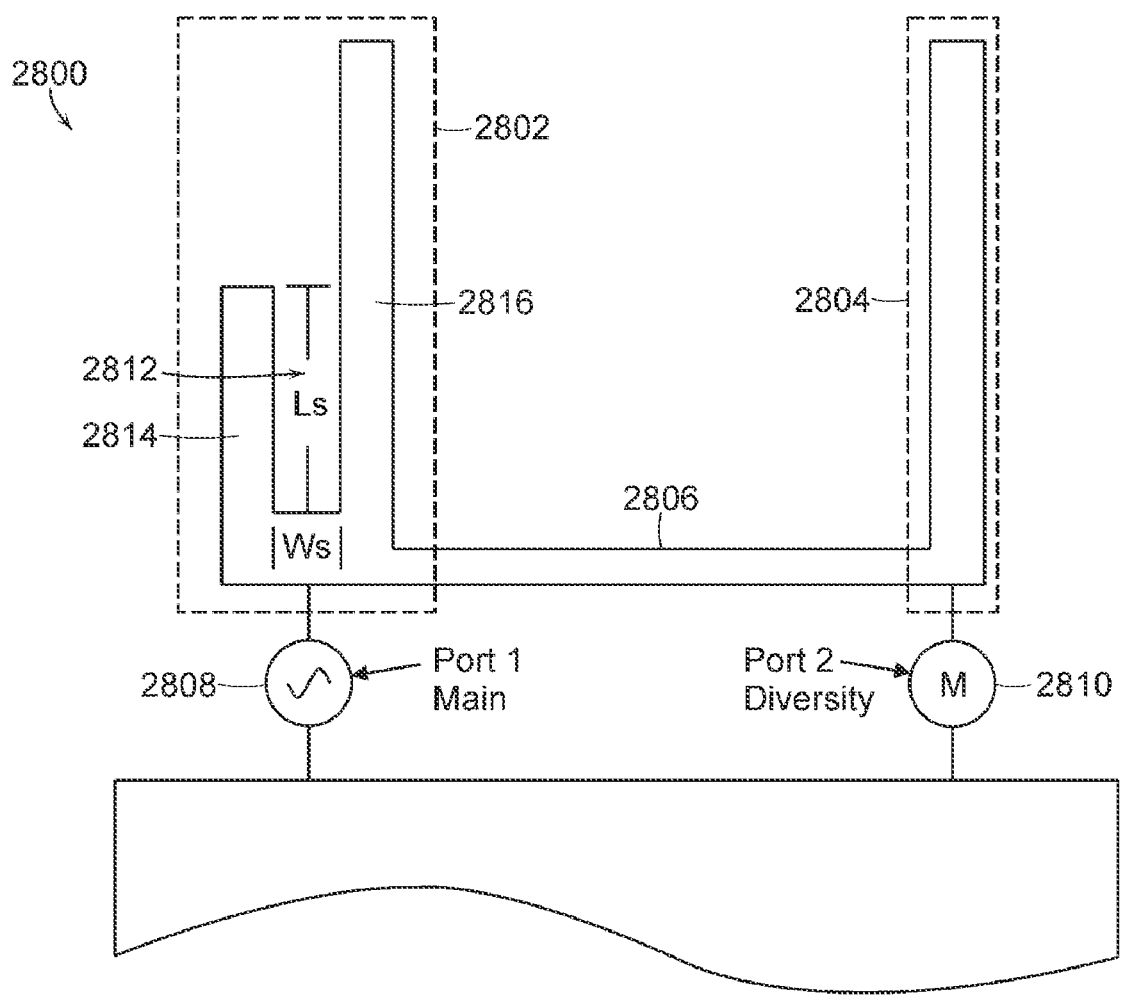
FIG. 28 is a schematic diagram illustrating an antenna structure with a band-rejection slot in accordance with one or more embodiments of the invention.

This band-rejection slot technique can be applied to an antenna system with two (or more) antennas elements operating in close proximity to each other where one antenna element needs to pass signals of a desired frequency and the other does not. In one or more embodiments, one of the two antenna elements includes a band-rejection slot, and the other does not. FIG. 28 schematically illustrates an antenna structure 2800, which includes a first antenna element 2802, a second antenna element 2804, and a connecting element 2806. The antenna structure 2800 includes ports 2808 and 2810 at antenna elements 2802 and 2804, respectively. In this example, a signal generator drives the antenna structure 2802 at port 2808, while a meter is coupled to the port 2810 to measure current at port 2810. It should be understood, however, that either or both ports can be driven by signal generators. The antenna element 2802 includes a band-rejection slot 2812, which defines two branch resonators 2814, 2816. In this embodiment, the branch resonators comprise the main transmit section of the antenna structure, while the antenna element 2804 comprises a diversity receive portion of the antenna structure.

Due to the large mismatch at the port of the antenna element 2802 with the band-reject slot 2812, the mutual coupling between it and the diversity receive antenna element 2804, which is actually matched at the slot resonant frequency will be quite small and will result in relatively high isolation.

Figure 29A:
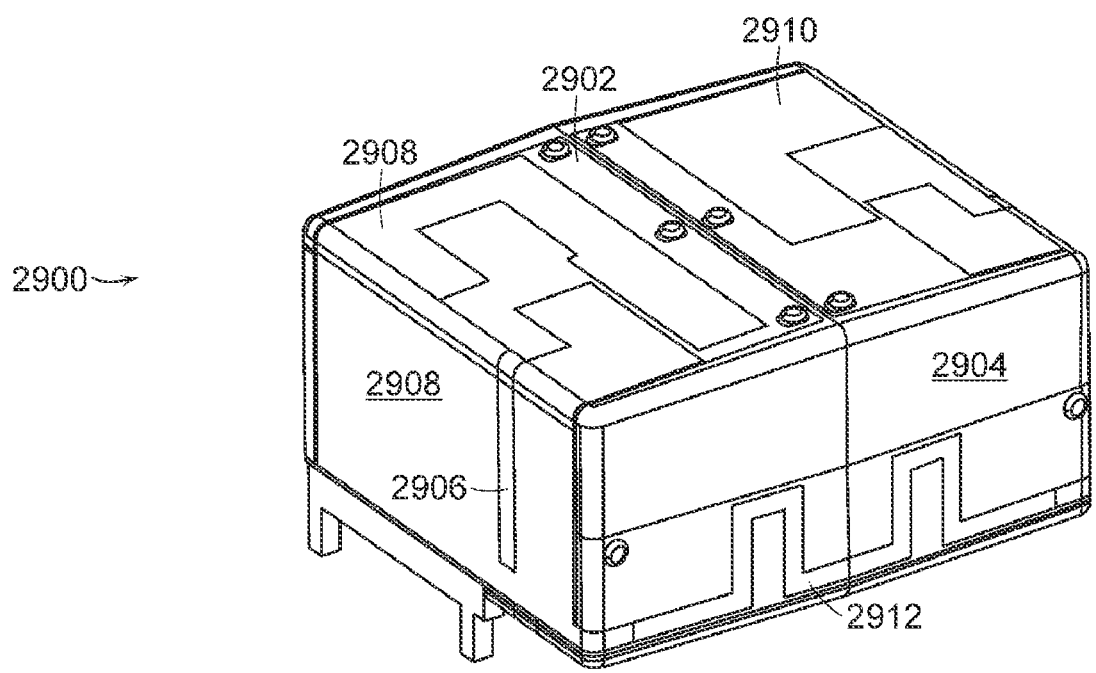
FIG. 29A illustrates an alternate antenna structure with a band-rejection slot in accordance with one or more embodiments of the invention.
Figure 29B:
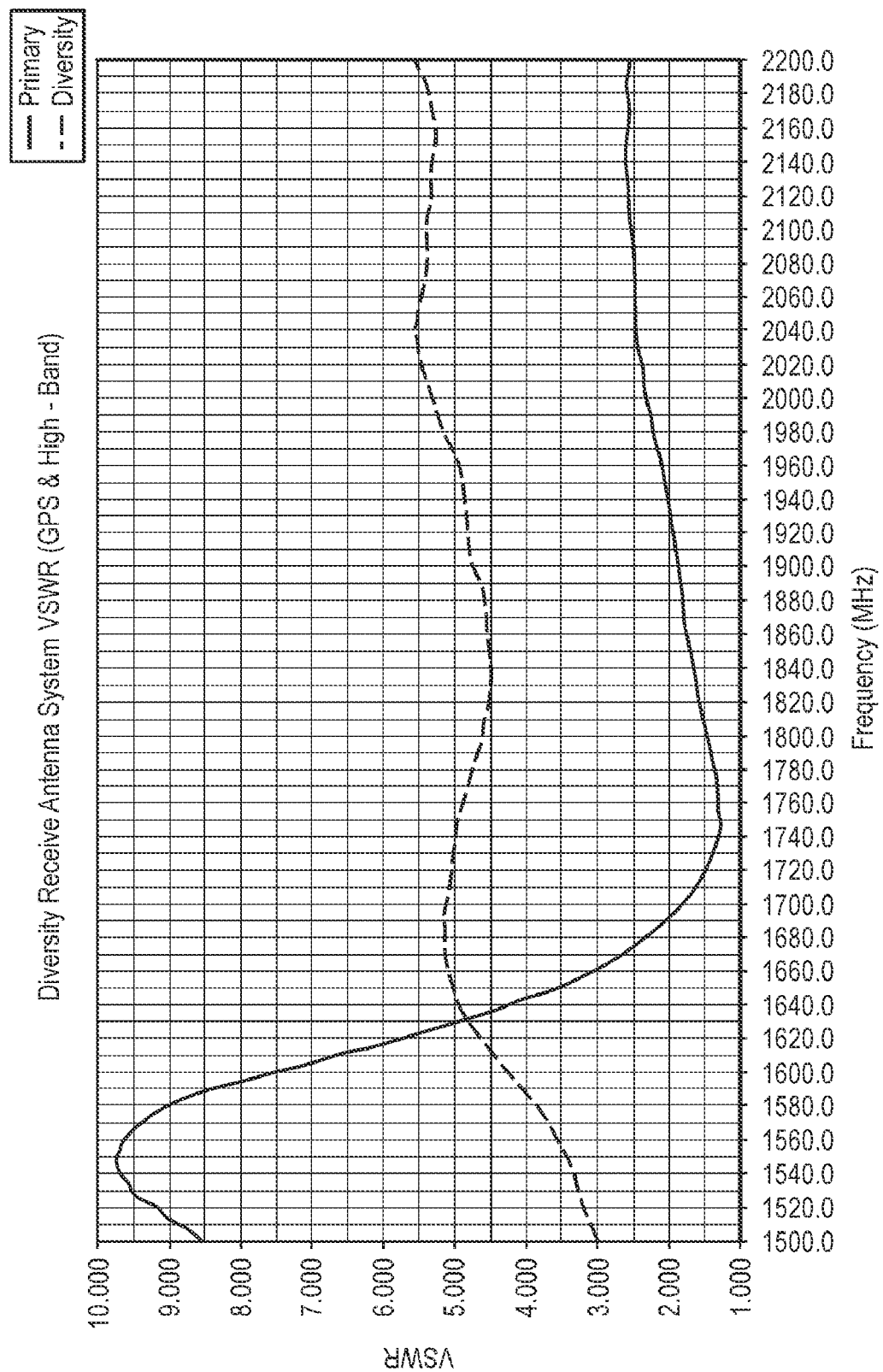
FIGS. 29B and 29C illustrate test measurement results for the FIG. 29A antenna structure.
Figure 29C:
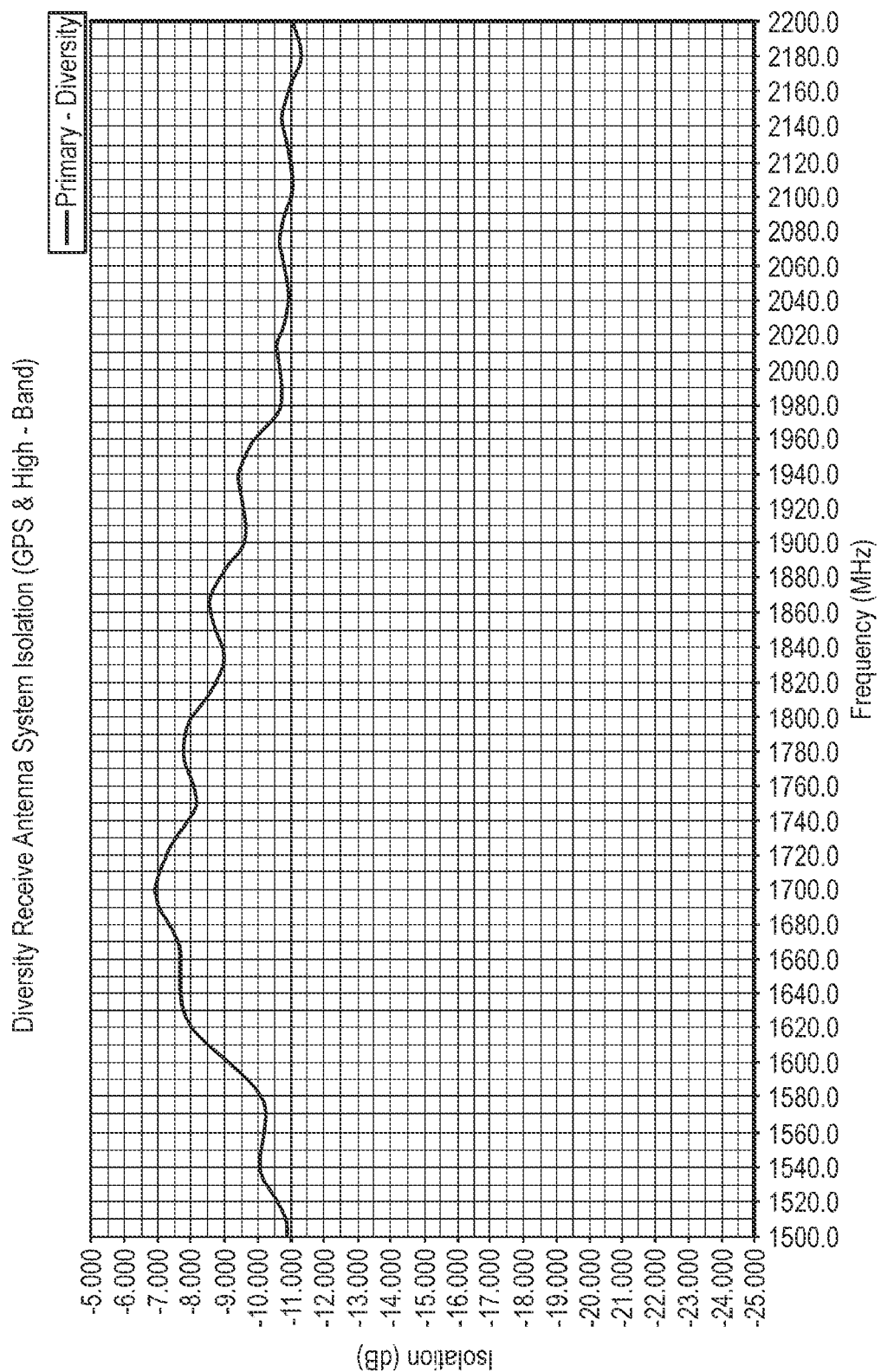

FIG. 29A is a perspective view of a multimode antenna structure 2900 comprising a multi-band diversity receive antenna system that utilizes the band-rejection slot technique in the GPS band in accordance with one or more further embodiments of the invention. (The GPS band is 1575.42 MHz with 20 MHz bandwidth.) The antenna structure 2900 is formed on a flex film dielectric substrate 2902, which is formed as a layer on a dielectric carrier 2904. The antenna structure 2900 includes a GPS band rejection slot 2906 on the primary transmit antenna element 2908 of the antenna structure 2900. The antenna structure 2900 also includes a diversity receive antenna element 2910, and a connecting element 2912 connecting the diversity receive antenna element 2910 and the primary transmit antenna element 2908. A GPS receiver (not shown) is connected to the diversity receive antenna element 2910. In order to generally minimize the antenna coupling from the primary transmit antenna element 2908 and to generally maximize the diversity antenna radiation efficiency at these frequencies, the primary antenna element 2908 includes the band-rejection slot 2906 and is tuned to an electrical quarter wave length near the center of the GPS band. The diversity receive antenna element 2910 does not contain such a band rejection slot, but comprises a GPS antenna element that is properly matched to the main antenna source impedance so that there will be generally maximum power transfer between it and the GPS receiver. Although both antenna elements 2908, 2910 co-exist in close proximity, the high VSWR due to the slot 2906 at the primary transmit antenna element 2908 reduces the coupling to the primary antenna element source resistance at the frequency to which the slot 2906 is tuned, and therefore provides isolation at the GPS frequency between both antenna elements 2908, 2910. The resultant mismatch between the two antenna elements 2908, 2910 within the GPS band is large enough to decouple the antenna elements in order to meet the isolation requirements for the system design as shown in FIGS. 29B and 29C.

In the antenna structures described herein in accordance with various embodiments of the invention, the antenna elements and the connecting elements preferably form a single integrated radiating structure such that a signal fed to either port excites the entire antenna structure to radiate as a whole, rather than separate radiating structures. As such, the techniques described herein provide isolation of the antenna ports without the use of decoupling networks at the antenna feed points It is to be understood that although the invention has been described above in terms of particular embodiments, the foregoing embodiments are provided as illustrative only, and do not limit or define the scope of the invention.

Various other embodiments, including but not limited to the following, are also within the scope of the claims. For example, the elements or components of the various multimode antenna structures described herein may be further divided into additional components or joined together to form fewer components for performing the same functions.

Having described preferred embodiments of the present invention, it should be apparent that modifications can be made without departing from the spirit and scope of the invention.

The invention claimed is:

1. A method of reducing near-field radiation and specific absorption rate (SAR) values in a communications device, said communications device including a multimode antenna structure transmitting and receiving electromagnetic signals and circuitry for processing signals communicated to and from the antenna structure, said antenna structure comprising: a plurality of antenna ports operatively coupled to the circuitry; a plurality of antenna elements, each operatively coupled to a different one of the antenna ports; and one or more connecting elements electrically connecting the antenna elements at a location on each antenna element that is spaced apart from an antenna port coupled thereto to form a single radiating structure and such that electrical currents on one antenna element flow to a connected neighboring antenna element and generally bypass the antenna port coupled to the neighboring antenna element, the electrical currents flowing through the one antenna element and the neighboring antenna element being generally equal in magnitude, such that an antenna mode excited by one antenna port is generally electrically isolated from a mode excited by another antenna port at a given desired signal frequency range and the antenna structure generates diverse antenna patterns; the method comprising:

adjusting the relative phase between signals fed to neighboring antenna ports of the antenna structure such that a signal fed to the one antenna port has a different phase than a signal fed to the neighboring antenna port to provide antenna pattern control and to increase gain in a selected direction toward a receive point; and using a transmit power lower than the transmit power used in a non-pattern control operation of the antenna structure such that the communications device obtains generally equivalent wireless link performance with the receive point using reduced transmit power compared to the non-pattern control operation, thereby reducing the specific absorption rate.

2. The method of claim 1 wherein adjusting the relative phase between signals comprises adjusting the relative phase between the signals using an electrically controlled phase shift device.

3. The method of claim 1 wherein adjusting the relative phase between signals comprises adjusting the relative phase between the signals using a phase shift network.

4. The method of claim 1 wherein adjusting the relative phase between signals comprises adjusting the relative phase between the signals by controlling the phase of a carrier signal provided at each of said plurality of antenna ports.

5. The method of claim 1 wherein the communications device is a cellular handset, PDA, wireless networking device, or a data card for PC.

6. The method of claim 1 wherein the antenna elements comprise helical coils, wideband planer shapes, chip antennas, meandered shapes, loops, or inductively shunted forms.

7. The method of claim 1 wherein the multimode antenna structure comprises a planar structure fabricated on a printed circuit board substrate.

8. The method of claim 1 wherein the multimode antenna structure comprises stamped metal part including a pickup feature at the center of mass of the part for use in an automated pick and place assembly process.

9. The method of claim 1 wherein the multimode antenna structure comprises a flexible printed circuit mounted on a plastic carrier or on a plastic housing of a device.

10. The method of claim 1 wherein the receive point is a base station, a mobile terminal, or a router.

11. The method of claim 1 wherein adjusting the relative phase between signals comprises dynamically adjusting the relative phase between signals fed to neighboring antenna ports to maintain a generally optimized communications link to the receive point.

12. A method of reducing near-field radiation and specific absorption rate (SAR) values in a communications device, said communications device including an antenna array for transmitting and receiving electromagnetic signals and circuitry for processing signals communicated to and from the antenna array, said antenna array comprising a plurality of radiating elements each having an antenna port operatively coupled to the circuitry; the method comprising:

adjusting the relative phase between signals fed to the antenna ports of the antenna array such that a signal fed to one antenna port has a different phase than a signal fed to another antenna port to provide antenna pattern control and to increase gain in a selected direction toward a receive point; and using a transmit power lower than the transmit power used in a non-pattern control operation of the antenna array such that the communications device obtains generally equivalent wireless link performance with the receive point using reduced transmit power compared to the non-pattern control operation, thereby reducing the specific absorption rate.

13. The method of claim 12 wherein adjusting the relative phase between signals comprises adjusting the relative phase between the signals using an electrically controlled phase shift device.

14. The method of claim 12 wherein adjusting the relative phase between signals comprises adjusting the relative phase between the signals using a phase shift network.

15. The method of claim 12 wherein adjusting the relative phase between signals comprises adjusting the relative phase between the signals by controlling the phase of a carrier signal provided at each of said plurality of antenna ports.

16. The method of claim 12 wherein the communications device is a cellular handset, PDA, wireless networking device, or a data card for PC.

17. The method of claim 12 wherein the radiating elements comprise helical coils, wideband planer shapes, chip antennas, meandered shapes, loops, or inductively shunted forms.

18. The method of claim 12 wherein the antenna array comprises a planar structure fabricated on a printed circuit board substrate.

19. The method of claim 12 wherein the antenna array comprises stamped metal part including a pickup feature at the center of mass of the part for use in an automated pick and place assembly process.

20. The method of claim 12 wherein the antenna array comprises a flexible printed circuit mounted on a plastic carrier or on a plastic housing of a device.

21. The method of claim 12 wherein the receive point is a base station, a mobile terminal, or a router.

22. The method of claim 12 wherein adjusting the relative phase between signals comprises dynamically adjusting the relative phase between signals fed to the antenna ports to maintain a generally optimized communications link to the receive point.

* * * * *